(12) United States Patent
Denboer et al.

(10) Patent No.: US 10,911,184 B2
(45) Date of Patent: Feb. 2, 2021

(54) ERROR CORRECTION FOR DATA PACKETS IN SHORT-RANGE WIRELESS COMMUNICATIONS SYSTEMS

(71) Applicant: QUALCOMM Incorporated, San Diego, CA (US)

(72) Inventors: Huibert Denboer, Escondido, CA (US); Joel Linsky, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/268,395

(22) Filed: Feb. 5, 2019

(65) Prior Publication Data
US 2020/0252162 A1  Aug. 6, 2020

(51) Int. Cl.
| | |
|---|---|
| *H04L 1/08* | (2006.01) |
| *H04L 1/00* | (2006.01) |
| *H04W 4/80* | (2018.01) |
| *H04L 29/08* | (2006.01) |

(52) U.S. Cl.
CPC ............. *H04L 1/08* (2013.01); *H04L 1/0061* (2013.01); *H04L 69/324* (2013.01); *H04W 4/80* (2018.02)

(58) Field of Classification Search
None
See application file for complete search history.

(56) References Cited

U.S. PATENT DOCUMENTS

| | | | | |
|---|---|---|---|---|
| 7,855,973 | B2 * | 12/2010 | Bloebaum | H04L 1/0009 370/252 |
| 9,712,951 | B2 * | 7/2017 | Kirshenberg | H04W 28/18 |
| 10,015,720 | B2 | 7/2018 | Perdomo et al. | |
| 2006/0013130 | A1 * | 1/2006 | Bloebaum | H04L 1/0009 370/229 |
| 2011/0022916 | A1 | 1/2011 | Desai et al. | |
| 2016/0210189 | A1 | 7/2016 | Xhafa et al. | |
| 2018/0048433 | A1 | 2/2018 | Martin et al. | |
| 2018/0115395 | A1 | 4/2018 | Jung et al. | |
| 2018/0219937 | A1 | 8/2018 | Seyedmehdi et al. | |
| 2019/0089490 | A1 * | 3/2019 | Linsky | H04L 1/1809 |

FOREIGN PATENT DOCUMENTS

| | | |
|---|---|---|
| JP | 2018125861 A | 8/2018 |
| WO | 2011090680 A1 | 7/2011 |

OTHER PUBLICATIONS

International Search Report and Written Opinion—PCT/US2020/014543—ISAEPO—dated May 14, 2020.

* cited by examiner

*Primary Examiner* — Justin R Knapp
(74) *Attorney, Agent, or Firm* — Arent Fox, LLP and Qualcomm Incorporated

(57) ABSTRACT

A first device may establish, with a second device, a logical link associated with short-range communications. The first device may receive a first packet carried on the logical link. When the first PDU data fails the decoding check, the first device may determine, based on the logical link, a first operational mode from a plurality of operational modes for error correction, the first device may receive a set of retransmission packets on the logical link, each of the set of retransmission packets including respective PDU data that is a retransmission of the first PDU data, and the first device may apply, based on the first PDU data included in the first packet and the respective PDU data included in each of the set of retransmission packets, the first operational mode for error correction.

61 Claims, 17 Drawing Sheets

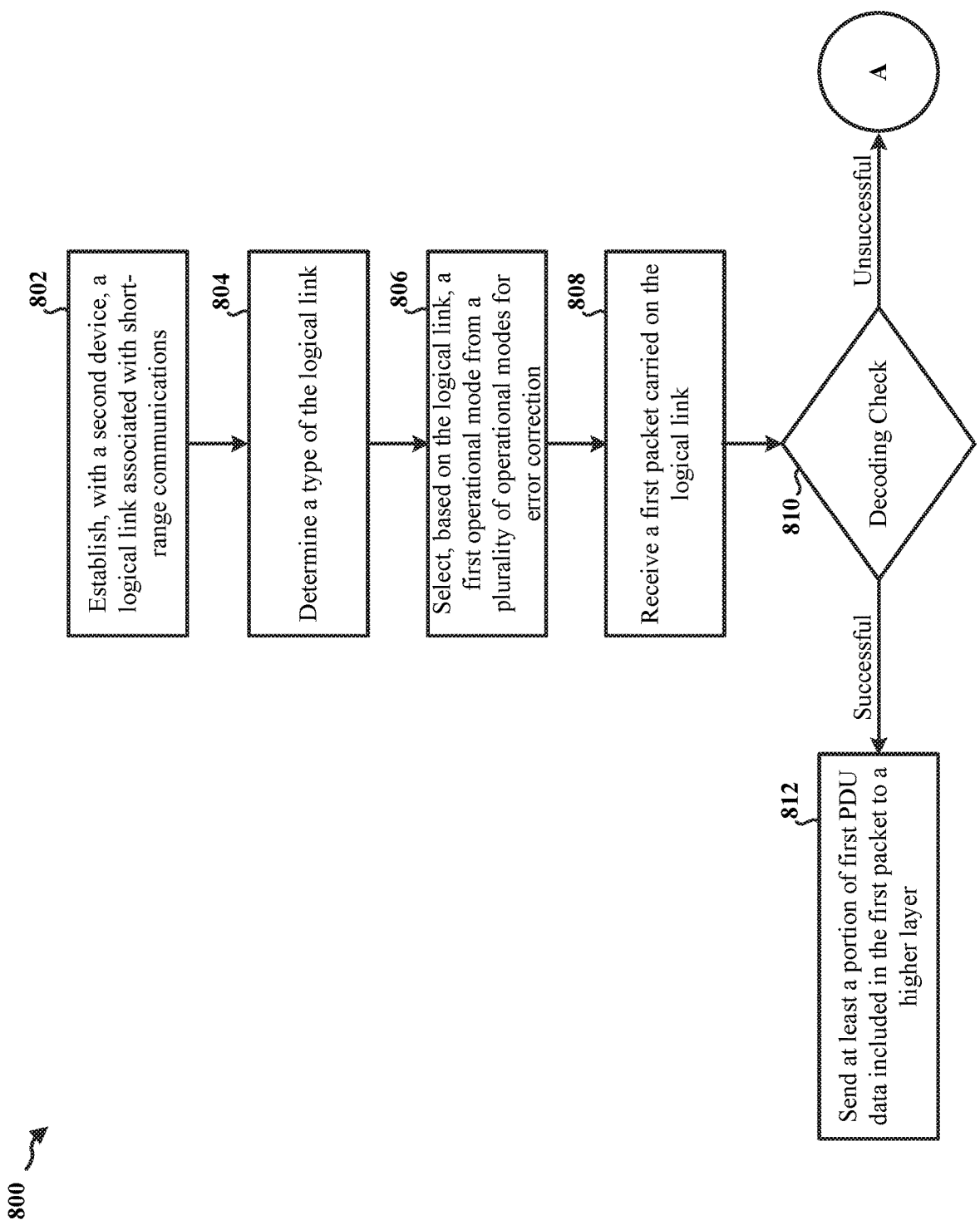

ERROR CORRECTION FOR DATA PACKETS IN SHORT-RANGE WIRELESS COMMUNICATIONS SYSTEMS

BACKGROUND

Field

The present disclosure relates generally to communication systems, and more particularly, to error correction of data packets that are received via logical link.

Background

A wireless personal area network (WPAN) is a personal, short-range wireless network for interconnecting devices centered around a specific distance from a user. WPANs have gained popularity because of the flexibility and convenience in connectivity that WPANs provide. WPANs, such as those based on short-range wireless communications protocols, provide wireless connectivity to devices by providing wireless links that allow connectivity within a specific distance (e.g., 5 meters, 10 meter, 20 meters, 100 meters, etc.).

Short-range wireless communications protocols may include the Bluetooth® (BT) protocol, the Bluetooth® Low Energy (BLE) protocol, the Zigbee® protocol, and so forth. BT is a wireless technology standard that enables radio frequency communication with ultra-high frequency (UHF) radio waves in the globally accepted Industrial, Scientific & Medical (ISM) band (e.g., from 2.400 gigahertz (GHz) to 2.485 GHz). Similarly, BLE defines a standard that enables radio frequency communication operating within the 2.4 GHz ISM band.

A short-range wireless communications protocol may be used to connect devices over a WPAN. Examples of devices that may communicate over a WPAN may include laptop computers, tablet computers, smart phones, personal data assistants, audio systems (e.g., headsets, headphones, speakers, etc.), wearable devices (e.g., smart watches, fitness trackers), battery-operated sensors and actuators in various medical, industrial, consumer, and fitness applications, and so forth.

In some scenarios, WPANs may offer advantages and conveniences over other network types, such as a wireless local area network (WLAN). However, short-range wireless communications in a WPAN may be susceptible to the same or similar issues as communication in other wireless networks. For example, short-range wireless communications may experience errors due to noisy and/or congested transmission mediums. Such issues experienced with short-range wireless communications may degrade the performance of devices, may degrade a user experience, and so forth. Thus, a need exists for an approach for error correction in short-range wireless communications.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Various standards and protocols for use with a wireless personal area network (WPAN), such as the Bluetooth® (BT) and/or Bluetooth® Low Energy (BLE), may provide for retransmission of a message, such as when the message is received with one or more errors and/or unsuccessfully decoded. The message (e.g., the payload of the message) may be protected with a cyclic redundancy check (CRC) value that must match a value calculated by a receiving device in order for the message to be successfully decoded. If the message is encrypted, the message (e.g., the payload) may be protected with a message integrity code (MIC). Similar to CRC validation, a MIC value must match a value calculated by the receiving device in order for the message to be successfully decoded. If the CRC validation and/or the MIC validation (if present) fails at the receiving device, then the receiving device may drop the message, the transmitting device may retransmit the message, etc.

Various conditions (e.g., over-the-air, channel conditions) may cause errors (e.g., bit errors) in receiving the message, which may prevent the message from being correctly decoded by the receiving device. Therefore, the transmitting device may send one or more retransmissions of a message, e.g., when the receiving device does not send an acknowledgement (ACK) message responsive to the message (e.g., within a predetermined time period). The transmitting device may retransmit the message numerous times (e.g., twelve times) before the receiving device is able to successfully decode the message without any errors. Each retransmission of the message by the transmitting device (as well as each non-ACK (NACK) transmitted by the receiving device, (if present) may consume additional power of the devices and, further, may occupy a frequency band that may be shared with other devices (e.g., Wi-Fi devices).

In view of the foregoing, devices communicating over a WPAN may benefit from a mechanism for error correction. With such a mechanism for error correction, the number of retransmissions may be reduced. Because individually decoding each transmitted/retransmitted message and sending an ACK/NACK message responsive to each individual message may incur an appreciable overhead (e.g., power consumption and/or bandwidth usage), reducing the number of retransmissions from which an error-free message may be obtained may reduce overhead. For example, using bits from each transmission/retransmission of a message may allow the message to be successfully decoded while reducing the number of retransmissions.

In an aspect of the disclosure, a method, a computer-readable medium, and an apparatus are provided. The apparatus may be a first device. The first device may establish, with a second device, a logical link associated with short-range communications. The first device may receive a first packet carried on the logical link. The first device may send at least a portion of first protocol data unit (PDU) data included in the first packet to a higher layer of the first device when the first PDU data passes a decoding check. When the first PDU data fails the decoding check, the first device may determine, based on the logical link, a first operational mode from a plurality of operational modes for error correction, the first device may receive a set of retransmission packets on the logical link, each of the set of retransmission packets including respective PDU data that is a retransmission of the first PDU data, and the first device may apply, based on the first PDU data included in the first packet and the respective PDU data included in each of the set of retransmission packets, the first operational mode for error correction.

In some aspects, the first device may determine a type of the logical link, wherein the first operational mode for error correction is determined based on the type of the logical link. In one aspect, the type of logical link is determined based on at least one of an access address or a logical transport address (LT_ADDR) indicated by at least one header of at least one packet received on the logical link.

In one aspect, the logical link comprises one of an asynchronous connection-less link (ACL) link or an advanced audio distribution profile (A2DP) link, and the first operational mode comprises a soft-combining mode based on the ACL link or the A2DP link. In one aspect, when the first packet is associated with a first nonce for decryption that matches a respective nonce for decryption of each of the retransmission packets and when the first operational mode for error correction comprises the soft-combining mode, the first operational mode for error correction is applied based on the first PDU data of the first packet that includes first payload data and a first message integrity code (MIC) value and further based on the respective PDU data of each of the set of retransmission packets that includes respective payload data and a respective MIC value. In one such aspect, the first PDU data of the first packet and the respective PDU data of each of the set of retransmission packets are decrypted when the first operational mode for error correction is applied. In another aspect, the first PDU data of the first packet and the respective PDU data of each of the set of retransmission packets remain encrypted when the first operational mode for error correction is applied.

In one aspect, when the first packet is associated with a first nonce for decryption that is different from a respective nonce associated with decryption of at least one of the set of retransmission packets and when the first operational mode for error correction comprises the soft-combining mode, the first operational mode for error correction is applied based on first payload data included in the first PDU data of the first packet and further based on respective payload data included in the respective PDU data of each of the set of retransmission packets. In one such aspect, when the first PDU data of the first packet includes a first MIC value and when the respective PDU data of each of the set of retransmission packets includes a respective MIC value, the first operational mode for error correction is applied without the first MIC value and without each of the respective MIC values. In one aspect, the first PDU data of the first packet and the respective PDU data of each of the set of retransmission packets are decrypted when the first operational mode for error correction is applied.

In one aspect, when the first operational mode for error correction comprises the soft-combining mode, the first device is to apply the first operational mode for error correction by: storing each of a set of soft values in each of a set of buffers, each of the set of soft values being a three-bit signed soft value that is based on a respective bit of the first PDU data of the first packet; accumulating, for each of the set of retransmission packets, each of the set of soft values with a signed value in each of the set of buffers, each of the signed values being based on a corresponding bit of the respective PDU data of the each retransmission packet of the set of retransmission packets; mapping each accumulated soft value of the set of soft values accumulated in each of the set of buffers to a one bit value of a set of estimated bit values; and determining whether the set of estimated bit values passes the decoding check. In one such aspect, each of the set of buffers is bound with a minimum threshold and a maximum threshold, and each accumulated soft value of the set of soft values accumulated in each of the set of buffers does not exceed the minimum threshold and does not exceed the maximum threshold.

In another aspect, the logical link comprises an extended synchronous connection oriented (eSCO) link, and the first operational mode comprises a quality bit mask (QBm) mode based on the eSCO link. When the first operational mode for error correction comprises the QBm mode, the first device is to apply the first operational mode for error correction by: performing a bitwise majority function based on a first set of bits of the first PDU data of the first packet, a second set of bits of one respective PDU data of one retransmission packet of the set of retransmission packets, and a third set of bits of another respective PDU data of another retransmission packet of the set of retransmission packets; determining a set of estimated bit values based on the performing the bitwise majority function; and determining a set of bit error quality metrics based on the set of estimated bit values.

In another aspect, the logical link comprises an isochronous (ISO) link, and the first operational mode for error correction comprises a quality bit mask hybrid (QBm-H) mode based on the ISO link. In one such aspect, when the first operational mode for error correction comprises the QBm-H mode, the first device is to apply the first operational mode for error correction by: performing a bitwise majority function based on a first set of bits of the first PDU data of the first packet, a second set of bits of one respective PDU data of one retransmission packet of the set of retransmission packets, and a third set of bits of another respective PDU data of another retransmission packet of the set of retransmission packets; determining a set of estimated bit values based on the performing the bitwise majority function; determining a set of bit error quality metrics based on the set of estimated bit values; and discarding one or more additional retransmission packets received after the one retransmission packet and the other retransmission packets of the set of retransmission packets when the one or more additional retransmission packets comprise a retransmission of the first PDU data of the first packet. In one such aspect, when the first operational mode for error correction comprises the QBm-H mode, and when the set of retransmission packets includes three or more retransmission packets, the first device is to apply the first operational mode for error correction by: storing each of a set of soft values in each of a set of buffers, each of the set of soft values being a three-bit signed soft value that is based on a respective bit of the first PDU data of the first packet; accumulating, for each of the set of retransmission packets, each of the set of soft values with a signed value in each of the set of buffers, each of the signed values being based on a corresponding bit of the respective PDU data of the each retransmission packet of the set of retransmission packets; mapping each accumulated soft value of the set of soft values accumulated in each of the set of buffers to a one bit value of a set of estimated bit values; and determining whether the set of estimated bit values passes the decoding check.

In some aspects, the first device may generate an estimated cyclic redundancy check (CRC) value based on a set of estimated bit values obtained based on the application of the first operational mode for error correction, the set of estimated bit values estimated to be included in the first PDU data, and the first device may compare the estimated CRC value with a first CRC value included in a most recently received retransmission packet of the set of retransmission packets, and the set of estimated bit values passes the decoding check based on the comparison of the estimated CRC value with the first CRC value, and wherein the set of estimated bit values fails the decoding check when the generated CRC value is different from the first CRC value.

In some aspect, the first device may generate an estimated MIC value based on the set of estimated bit values, and the first device may compare the estimated MIC value with a first MIC value included in the a most recently received retransmission packet of the set of retransmission packets, and the set of estimated bit values passes the decoding check when the estimated CRC value matches the first CRC value and the estimated MIC value matches the first MIC value, and wherein the set of estimated bit values fails the decoding check when the estimated CRC value is different from the first CRC value or when the estimated MIC value is different from the first MIC value.

In one aspect, the first device may send, to the higher layer of the first device, a set of estimated bit values obtained based on the application of the first operational mode for error correction, the set of estimated bit values estimated to be the at least the portion of first PDU data. In one aspect, the first device may determine, based on the application of the first operational mode for error correction, a set of bit errors associated with the set of estimated bit values, and the first device may send, to the higher layer of the first device, at least one bit error quality metric indicating at least one of a set of locations of the set of bit errors or a number of the set of bit errors.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 8A-8B are flowcharts of a method of error correction in a short-range wireless communications system in accordance with certain aspects of the disclosure.

DETAILED DESCRIPTION

Figure 1:
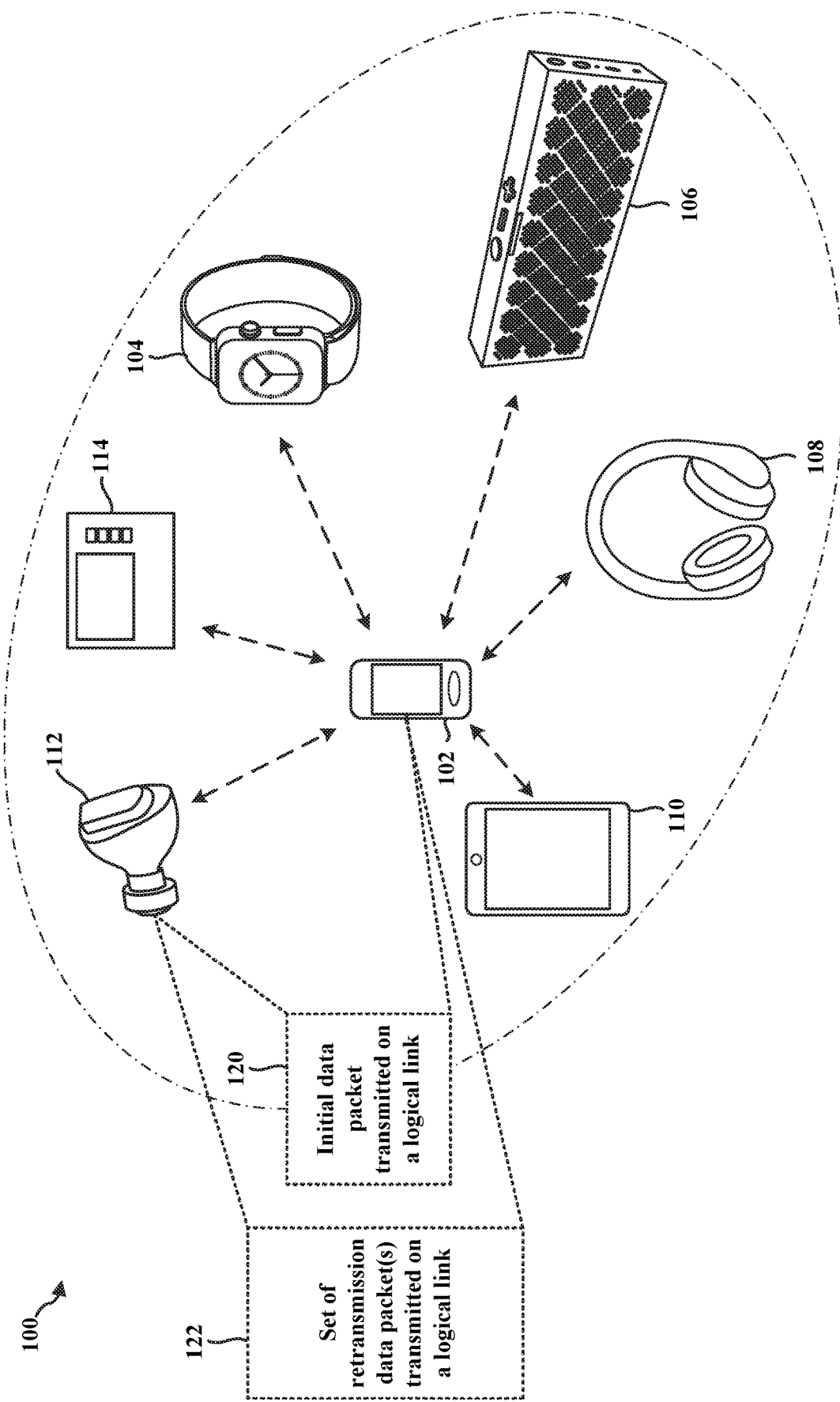
FIG. 1 is a diagram illustrating an example of a short-range wireless communications system in accordance with certain aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EE-PROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 illustrates an example WPAN 100 in accordance with certain aspects of the disclosure. Within the WPAN 100, a central wireless device 102 may use a logical link 116 to communicate with one or more peripheral devices 104, 106, 108, 110, 112, 114 using a short-range wireless communications protocol. The short-range wireless communications protocol may include a Bluetooth® (BT) protocol or a BT Low Energy (BLE) protocol.

Examples of the wireless device 102 include a cellular phone, a smart phone, a session initiation protocol (SIP) phone, a mobile station (STA), a laptop, a personal computer (PC), a desktop computer, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, a thermostat, a hearing aid, a wireless headset, a blood glucose on-body unit, an Internet-of-Things (IoT) device, or any other similarly functioning device.

Examples of the one or more peripheral devices 104, 106, 108, 110, 112, 114 include a cellular phone, a smart phone, a SIP phone, a STA, a laptop, a PC, a desktop computer, a PDA, a satellite radio, a global positioning system, a multimedia device, a video device, a digital audio player (e.g., MP3 player), a camera, a game console, a tablet, a smart device, a wearable device, a vehicle, an electric meter, a gas pump, a toaster, a thermostat, a hearing aid, a wireless headset, a blood glucose on-body unit, an IoT device, or any other similarly functioning device. Although the central wireless device 102 is illustrated in communication with six peripheral devices 104, 106, 108, 110, 112, 114 in the WPAN 100, the wireless device 102 may communicate with more or fewer than six peripheral devices within the WPAN 100 without departing from the scope of the present disclosure.

A device (e.g., the wireless device 102) implementing the BT protocol may operate according to one radio mode, such as basic rate (BR)/enhanced data rate (EDR), and a device implementing the BLE protocol may operation according to a BLE radio mode. In some aspects, a device (e.g., the wireless device 102) may be configured with dual radio modes, and therefore may be able to operate according to the BR/EDR mode or the BLE mode, e.g., based on the type of short-rage wireless communication in which the device may engage.

For example, the device may operate according to the BR/EDR mode for continuous streaming of data (e.g., audio data), for broadcast networks, for mesh networks, and/or for some other applications in which a relatively higher data rate may be more suitable. However, the device may operate according to the BLE mode for short burst data transmissions and/or for some other applications in which power conservation may be desirable (e.g., and a relatively lower data rate may be acceptable). In other aspects, a device may operate according to one or more other radio modes, including proprietary radio mode (e.g., high speed radio modes, low energy radio modes, isochronous radio modes, etc.).

A short-range wireless communications protocol (e.g., BT and/or BLE) may include and/or may use one or more other communications protocols, e.g., for establishing and maintaining communications links. As illustrated, the wireless device 102 may establish a logical link 116 with at least one other device, such as the headset 112, according to at least one communications protocol for short-range wireless communications.

The logical link 116 may include a communications link that adheres to a protocol included and/or for use with BT or BLE. In one aspect, the logical link 116 may include an asynchronous connection-less (ACL) link. With ACL, the wireless device 102 may connect (or "pair" in the terminology of the BT specification) with a second device (e.g., the headset 112). The connection is asynchronous in that the two devices may not need to synchronize, time-wise, data communications between each other to permit communication of data packets via the logical link 116.

In one aspect, the logical link 116 may include an Advanced Audio Distribution Profile (A2DP) link. An A2DP link provide for a point-to-point link between a source device (e.g., the wireless device 102) and a sink device (e.g., the headset 112). With an A2DP link, data packets including audio may be transmitted over an ACL data channel, and other information (e.g., for controlling the audio stream) may be transmitted over a separate control channel. The data packets (e.g., including audio) may occur non-periodically.

In another aspect, the logical link 116 may support synchronous logical transport mechanisms between a "master device" and a "slave device." For example, the logical link 116 may include a synchronous connection oriented (SCO) link. An SCO link may provide a symmetric point-to-point link between a master device (e.g., the wireless device 102) and a slave device (e.g., the headset 112) using time slots reserved for BT communications. However, an SCO link may not support retransmission of data packets, which may be unsatisfactory in audio streaming and/or voice use cases in which a dropped audio or voice packet may reduce the quality of the user experience.

In a further aspect, then, the logical link 116 may include an extended SCO (eSCO) link. An eSCO link may provide a symmetric or asymmetric point-to-point link between a master device (e.g., the wireless device 102) and a slave device (e.g., the headset 112) using time slots reserved for BT communications, and may also provide for a retransmission window following the reserved time slots. Because retransmissions may be facilitated using the retransmission window, an eSCO link may be suitable for audio streaming and/or voice use cases because a dropped audio or voice packet may be retransmitted, and therefore the probability of successfully receiving a data packet may be increased.

In one aspect, the logical link 116 may include an isochronous (ISO) link. With an ISO link, the logical link 116 may combine some features of both synchronous and asynchronous links. For example, a stream on an ISO link may begin with a start packet, and then data packets may be asynchronously transmitted. On an ISO link, the number of retransmission attempts by a transmitting device (e.g., the wireless device 102) may be limited. Thus, if a receiving device (e.g., the headset 112) is unable to decode a data packet within the limited number of retransmission attempts, then the data packet may be dropped and the receiving device may continue to receive the stream without data from the dropped data packet.

Due to various factors (e.g., increasing numbers of wireless devices being used), wireless devices may cause congestion on the frequencies used for wireless channels, such as a wireless channel on which the logical link 116 is carried. Consequently, wireless communication channels (e.g., the wireless communications channel on which the logical link 116 is carried) may be "noisy" in that static, congestion, and/or other interference may introduce random signals on the same frequency bands as those reserved to communicate over established the logical link 116. Such static, congestion, interference, and/or other random signals may cause errors to initial packets transmitted on the logical link 116. By providing for retransmissions of initial packets on the logical link 116, the probability of receiving an error-free packet may be increased.

In some standards and protocols, such as BLE, the wireless device 102 may detect errors in a protocol data unit (PDU) of a data packet through the use of cyclic redundancy check (CRC) validation and, optionally, through the use of message integrity code (MIC) validation (e.g., MIC validation may be used when the data packet is encrypted). Accordingly, retransmission of data packets provides an approach to error correction of PDU data by repeatedly providing the same PDU data to a receiving device so that the receiving device may replace erroneous PDU data with PDU data of a retransmission packet that may pass CRC validation (and MIC validation, if present).

For example, the wireless device 102 may transmit an initial data packet 120 to the headset 112 on the logical link 116. The headset 112 may receive the initial data packet 120 on the logical link 116, and the headset 112 may attempt to validate PDU data of the initial data packet 120 using CRC validation and, if applicable, using MIC validation. If one of the CRC and the MIC validation fails, then the headset 112 may determine that the PDU data of the initial data packet 120 includes an error. In some aspects, the headset 112 may respond to the initial data packet 120 by transmitting an acknowledgement (ACK)/non-ACK (NACK) message that indicates a NACK because the PDU data of the initial data packet 120 includes at least one error.

The wireless device 102 may transmit at least a first retransmission data packet of the set of retransmission data packets 122 to the headset 112 on the logical link 116. For example, the wireless device 102 may transmit the first retransmission data packet of the set of retransmission data packets 122 based on receiving a NACK message from the headset 112. Like the initial data packet 120, the headset 112 may attempt to validate PDU data of one of the first retransmission data packet of the set of retransmission data packets 122 using CRC validation and, if applicable, using MIC validation. While the set of retransmission data packets 122 may increase the probability that the PDU data of the initial data packet 120 will be received without any errors, the first retransmission data packet of the set of retransmission data packets 122 nonetheless may be subjected to suboptimal conditions on the wireless channel on which the logical link 116 is carried.

Consequently, the first retransmission data packet of the set of retransmission data packets 122 may still experience degradation due to static, congestion, interference, and/or other random signals. Similar to the initial data packet 120, the degradation due to wireless channel conditions may introduce errors to the first retransmission data packet of the set of retransmission data packets 122 when received by the headset 112. Thus, the headset 112 may send another NACK message to the wireless device 102 when the first retransmission data packet of the set of retransmission data packets 122 fails CRC validation or fails MIC validation (if MIC validation is applicable). The wireless device 102, then, may transmit a second retransmission data packet of the set of retransmission data packets 122 on the logical link 116, e.g., responsive to the other NACK message transmitted by the headset 112.

According to some standards and/or protocols, the set of retransmission data packets 122 may reach a relatively large number (e.g., twelve retransmission data packets) because the wireless device 102 may be configured to repeatedly transmit retransmission data packets of the set of retransmission data packets 122 until the headset 112 is able to validate the PDU data of one of the set of retransmission data packets 122. For example, the wireless device 102 may repeatedly transmit retransmission data packets of the set of retransmission data packets 122 until an ACK message is received from the headset 112 indicating that the headset 112 is able to validate the PDU data of one of the set of retransmission data packets 122.

While transmission of the set of retransmission data packets 122 may allow the headset 112 to receive and validate PDU data (and obtain payload data included therein) originally intended in the initial data packet 120, each transmission of each of the set of retransmission data packets 122 and each transmission of a corresponding NACK message may incur overhead at both the wireless device 102 and the headset. Specifically, each occurrence of the transmission/reception of one of the set of retransmission data packets 122 and the reception/transmission of a corresponding NACK message by the wireless device 102 and the headset 112, respectively, may cause the wireless device 102 and the headset 112 to consume some amount of additional power and, additionally, some amount of time, which may have been otherwise allocated to continuing a data stream. Furthermore, each occurrence of the transmission of one of the set of retransmission data packets 122 by the wireless device 102 and the transmission of a corresponding NACK message by the headset 112 may occupy the wireless channel on which the logical link 116 is carried for an additional duration. During the additional duration of wireless channel occupation, other systems and devices that share the wireless channel (e.g., Wi-Fi systems and devices) may experience delays or interference.

In view of the overhead incurred due to error correction using the set of retransmission data packets, short-range wireless communications may benefit from a mechanism to reduce the amount of the set of retransmission data packets 122 needed to successfully pass CRC validation. For example, PDU data from the initial data packet 120 may be combined with PDU data from each of the set of retransmission packets 122. In combining PDU data across multiple different data packets 120, 122, the PDU data originally intended to be transmitted in the initial data packet 120 may be estimated or recovered.

Additionally or alternatively, combining PDU data across multiple different data packets 120, 122 may facilitate the generation of one or more bit metrics associated with PDU data that is ultimately sent to a higher layer of the headset 112, such as a coder-decoder (CODEC). One or more quality bit metrics may include information about one or more erroneous bits of those PDU bits sent to the higher layer, such as a number of bit errors, a location of the bit errors, and other bit-error information. For example, a CODEC of the headset 112 may be able to recover erroneous bits of a stream, attempt seamless streaming of data including a relatively small amount of bit errors, conceal bit errors within a stream, and so forth based on the one or more bit metrics.

Toward the reduction of the amount of retransmission data packets, a wireless device may be configured with a plurality of different operational modes for error reduction. The wireless device configured with the plurality of different operational modes for error reduction may be any wireless device that may be receiving packets over the logical link 116, including the wireless device 102, the headset 112, and/or another illustrated device 104, 106, 108, 110, 114. By way of example, the headset 112 may receive data packets (e.g., the initial packet 120) over the logical link 116. The headset 112 may select a first operational mode for error reduction from the plurality of different operational modes. Because the logical link 116 may have different characteristics depending upon the type of logical link 116 that is implemented, the headset 112 may select the first operational mode from among the plurality of operational modes for error reduction based on the logical link 116. For example, the headset 112 may select the first operational mode from among the plurality of operational modes based on whether the logical link 116 includes an ACL link, an A2DP link, an eSCO link, or an ISO link because the selected first operational mode may be better suited for the characteristics of a particular type of the logical link 116 than the other operational modes.

In accordance with one aspect of the techniques of the disclosure, a first device, such as a headset 112, may establish, with a second device (e.g., the wireless device 102), a logical link associated with short-range communications. The first device may receive a first packet carried on the logical link. The first device may send at least a portion of first PDU data included in the first packet to a higher layer of the first device when the first PDU data passes a decoding check. When the first PDU data fails the decoding check, the first device may determine, based on the logical link, a first operational mode from a plurality of operational modes for error correction, the first device may receive a set of retransmission packets on the logical link, each of the set of retransmission packets including respective PDU data that is a retransmission of the first PDU data, and the first device may apply, based on the first PDU data included in the first packet and the respective PDU data included in each of the set of retransmission packets, the first operational mode for error correction.

In some aspects, the first device may determine a type of the logical link, wherein the first operational mode for error correction is determined based on the type of the logical link. In one aspect, the type of logical link is determined based on at least one of an access address or a logical transport address (LT_ADDR) indicated by at least one header of at least one packet received on the logical link.

In one aspect, the logical link comprises one of an ACL link or an A2DP link, and the first operational mode comprises a soft-combining mode based on the ACL link or the A2DP link. In one aspect, when the first packet is associated with a first nonce for decryption that matches a respective nonce for decryption of each of the retransmission packets and when the first operational mode for error correction comprises the soft-combining mode, the first operational mode for error correction is applied based on the first PDU data of the first packet that includes first payload data and a first MIC value and further based on the respective PDU data of each of the set of retransmission packets that includes respective payload data and a respective MIC value. In one such aspect, the first PDU data of the first packet and the respective PDU data of each of the set of retransmission packets are decrypted when the first operational mode for error correction is applied. In another aspect, the first PDU data of the first packet and the respective PDU data of each of the set of retransmission packets remain encrypted when the first operational mode for error correction is applied.

In one aspect, when the first packet is associated with a first nonce for decryption that is different from a respective nonce associated with decryption of at least one of the set of retransmission packets and when the first operational mode for error correction comprises the soft-combining mode, the first operational mode for error correction is applied based on first payload data included in the first PDU data of the first packet and further based on respective payload data included in the respective PDU data of each of the set of retransmission packets. In one such aspect, when the first PDU data of the first packet includes a first MIC value and when the respective PDU data of each of the set of retransmission packets includes a respective MIC value, the first operational mode for error correction is applied without the first MIC value and without each of the respective MIC values. In one aspect, the first PDU data of the first packet and the respective PDU data of each of the set of retransmission packets are decrypted when the first operational mode for error correction is applied.

In one aspect, when the first operational mode for error correction comprises the soft-combining mode, the first device is to apply the first operational mode for error correction by: storing each of a set of soft values in each of a set of buffers, each of the set of soft values being a three-bit signed soft value that is based on a respective bit of the first PDU data of the first packet; accumulating, for each of the set of retransmission packets, each of the set of soft values with a signed value in each of the set of buffers, each of the signed values being based on a corresponding bit of the respective PDU data of the each retransmission packet of the set of retransmission packets; mapping each accumulated soft value of the set of soft values accumulated in each of the set of buffers to a one bit value of a set of estimated bit values; and determining whether the set of estimated bit values passes the decoding check. In one such aspect, each of the set of buffers is bound with a minimum threshold and a maximum threshold, and each accumulated soft value of the set of soft values accumulated in each of the set of buffers does not exceed the minimum threshold and does not exceed the maximum threshold.

In another aspect, the logical link comprises an eSCO link, and the first operational mode comprises a quality bit mask (QBm) mode based on the eSCO link. When the first operational mode for error correction comprises the QBm mode, the first device is to apply the first operational mode for error correction by: performing a bitwise majority function based on a first set of bits of the first PDU data of the first packet, a second set of bits of one respective PDU data of one retransmission packet of the set of retransmission packets, and a third set of bits of another respective PDU data of another retransmission packet of the set of retransmission packets; determining a set of estimated bit values based on the performing the bitwise majority function; and determining a set of bit error quality metrics based on the set of estimated bit values.

In another aspect, the logical link comprises an ISO link, and the first operational mode for error correction comprises a quality bit mask hybrid (QBm-H) mode based on the ISO link. In one such aspect, when the first operational mode for error correction comprises the QBm-H mode, the first device is to apply the first operational mode for error correction by: performing a bitwise majority function based on a first set of bits of the first PDU data of the first packet, a second set of bits of one respective PDU data of one retransmission packet of the set of retransmission packets, and a third set of bits of another respective PDU data of another retransmission packet of the set of retransmission packets; determining a set of estimated bit values based on the performing the bitwise majority function; determining a set of bit error quality metrics based on the set of estimated bit values; and discarding one or more additional retransmission packets received after the one retransmission packet and the other retransmission packets of the set of retransmission packets when the one or more additional retransmission packets comprise a retransmission of the first PDU data of the first packet. In one such aspect, when the first operational mode for error correction comprises the QBm-H mode, and when the set of retransmission packets includes three or more retransmission packets, the first device is to apply the first operational mode for error correction by: storing each of a set of soft values in each of a set of buffers, each of the set of soft values being a three-bit signed soft value that is based on a respective bit of the first PDU data of the first packet; accumulating, for each of the set of retransmission packets, each of the set of soft values with a signed value in each of the set of buffers, each of the signed values being based on a corresponding bit of the respective PDU data of the each retransmission packet of the set of retransmission packets; mapping each accumulated soft value of the set of soft values accumulated in each of the set of buffers to a one bit value of a set of estimated bit values; and determining whether the set of estimated bit values passes the decoding check.

In some aspects, the first device may generate an estimated CRC value based on a set of estimated bit values obtained based on the application of the first operational mode for error correction, the set of estimated bit values estimated to be included in the first PDU data, and the first device may compare the estimated CRC value with a first CRC value included in a most recently received retransmission packet of the set of retransmission packets, and the set of estimated bit values passes the decoding check based on the comparison of the estimated CRC value with the first CRC value, and wherein the set of estimated bit values fails the decoding check when the generated CRC value is different from the first CRC value.

In some aspect, the first device may generate an estimated MIC value based on the set of estimated bit values, and the first device may compare the estimated MIC value with a first MIC value included in the a most recently received retransmission packet of the set of retransmission packets, and the set of estimated bit values passes the decoding check when the estimated CRC value matches the first CRC value and the estimated MIC value matches the first MIC value, and wherein the set of estimated bit values fails the decoding check when the estimated CRC value is different from the first CRC value or when the estimated MIC value is different from the first MIC value.

In one aspect, the first device may send, to the higher layer of the first device, a set of estimated bit values obtained based on the application of the first operational mode for error correction, the set of estimated bit values estimated to be at least the portion of first PDU data. In one aspect, the first device may determine, based on the application of the first operational mode for error correction, a set of bit errors associated with the set of estimated bit values, and the first device may send, to the higher layer of the first device, at least one bit error quality metric indicating at least one of a set of locations of the set of bit errors or a number of the set of bit errors.

One or more of the illustrated wireless devices (e.g., the central wireless device 102, the headset 112) may include suitable logic, circuitry, interfaces, processors, and/or code that may be used for the error correction techniques as described herein when communicating with another device (e.g., the central wireless device 102 or one or more peripheral devices 104, 106, 108, 110, 112, 114). The wireless device 102 may operate to establish a short-range wireless communications connection with at least one of the peripheral devices 104, 106, 108, 110, 112, 114, and the wireless device 102 may establish the logical link 116 with at least one of the peripheral devices 104, 106, 108, 110, 112, 114. With respect to BT, for example, the wireless device 102 may establish the logical link 116 through a link manager (LM) with an intended peripheral device 104, 106, 108, 110, 112, 114. With respect to BLE, for example, the wireless device 102 may establish the logical link 116 through a link layer (LL) with an intended peripheral device 104, 106, 108, 110, 112, 114.

Referring again to FIG. 1, in certain aspects, the central wireless device 102 and/or a peripheral device (e.g., headset 112) may be configured to establish a logical link 116, and select an operational mode from a plurality of operational modes for error correction based on the logical link, as described herein.

Figure 2:
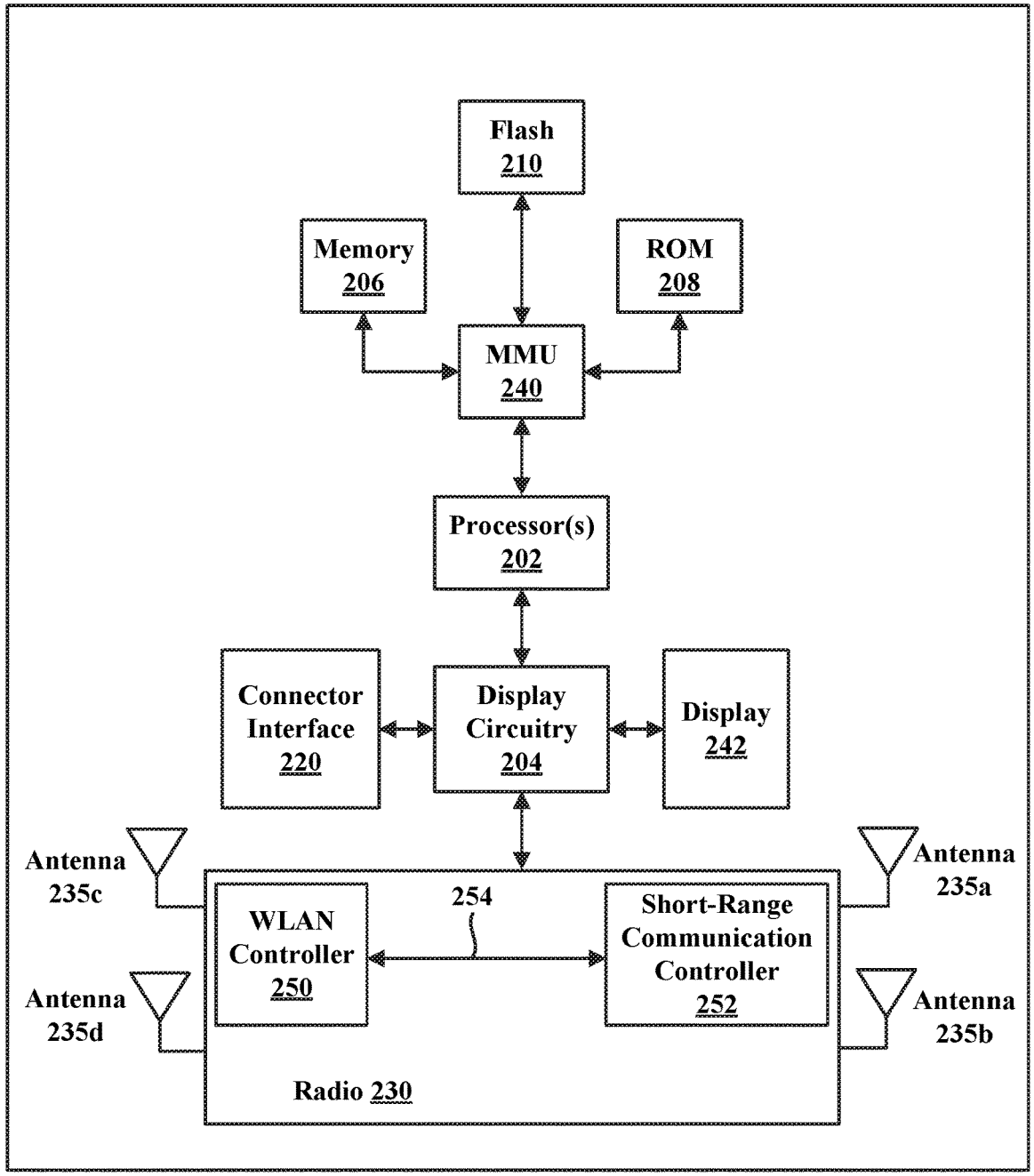
FIG. 2 is block diagram of a short-range wireless communications device in accordance with certain aspects of the disclosure.

FIG. 2 is block diagram of a wireless device 200 in accordance with certain aspects of the disclosure. The wireless device 200 may correspond to, e.g., the wireless device 102, and/or one of the peripheral devices 104, 106, 108, 110, 112, 114 in FIG. 1. In certain configurations, the wireless device 200 may be, e.g., a BT and/or BLE device that is configured to apply a first operational mode for error correction that is selected from a plurality of operational modes for error correction based on a logical link established with another wireless device.

As shown in FIG. 2, the wireless device 200 may include a processing element, such as a processor(s) 202, which may execute program instructions for the wireless device 200. The wireless device 200 may also include display circuitry 204, which may perform graphics processing and provide display signals to a display 242. The processor(s) 202 may also be coupled to a memory management unit (MMU) 240, which may be configured to receive addresses from the processor(s) 202 and translate those addresses to locations in memory (e.g., memory 206, ROM 208, Flash memory 210) and/or to other circuits or devices, such as the display circuitry 204, a radio 230, a connector interface 220, and/or the display 242. The MMU 240 may be configured to perform memory protection and page table translation or set up. In some embodiments, the MMU 240 may be included as a portion of the processor(s) 202.

As shown, the processor 202 may be coupled to various other circuits of the wireless device 200. For example, the wireless device 200 may include various types of memory, the connector interface 220 (e.g., for coupling to the computer system), the display 242, and/or wireless communications circuitry (e.g., for Wi-Fi, BT, BLE, etc.). The wireless device 200 may include a plurality of antennas 235a, 235b, 235c, 235d, for performing wireless communication with other short-range wireless communications devices (e.g., BT devices, BLE devices, etc.).

In certain aspects, the wireless device 200 may include hardware and software components (a processing element) configured to separately check the header of the data packet for errors and perform majority voting of a data packet, e.g., using the techniques described herein. The wireless device 200 may also include firmware or other hardware/software for controlling short-range wireless communications operations (e.g., BT operations, BLE operations, etc.). In addition, the wireless device 200 may store and execute a WLAN software driver for controlling WLAN operations.

The wireless device 200 may be configured to implement part or all of the error correction techniques described herein, e.g., by executing program instructions stored on a memory medium (e.g., a non-transitory computer-readable memory medium) and/or through hardware or firmware operation. In other embodiments, the error correction techniques described herein may be at least partially implemented by a programmable hardware element, such as an field programmable gate array (FPGA), and/or as an application specific integrated circuit (ASIC).

In certain aspects, the radio 230 may include separate controllers configured to control communications for various respective radio access technology (RAT) protocols. For example, as shown in FIG. 2, radio 230 may include a wireless local area network (WLAN) controller 250 configured to control WLAN communications and a short-range communications controller 252 configured to control short-range communications (e.g., BT communications, BLE communications, etc.). A coexistence interface 254 (e.g., a wired interface) may be used for sending information between the WLAN controller 250 and the short-range communications controller 252.

In some aspects, one or more of the WLAN controller 250 and/or the short-range communications controller 252 may be implemented as hardware, software, firmware or some combination thereof.

In certain aspects, the WLAN controller 250 may be configured to communicate with a second device using a WLAN link using all of the antennas 235a, 235b, 235c, 235d. In certain configurations, the short-range communications controller 252 may be configured to implement a short-range wireless communications protocol stack, such as a BT stack (see, e.g., FIG. 3A, infra) and/or a BLE stack (see, e.g., FIG. 3B, infra), and communicate with at least one second wireless device using one or more of the antennas 235a, 235b, 235c, 235d. The short-range communications controller 252 may be configured to apply a first operational mode for error correction that is selected from a plurality of operational modes for error correction based on a logical link established with another wireless device.

Figure 3A:
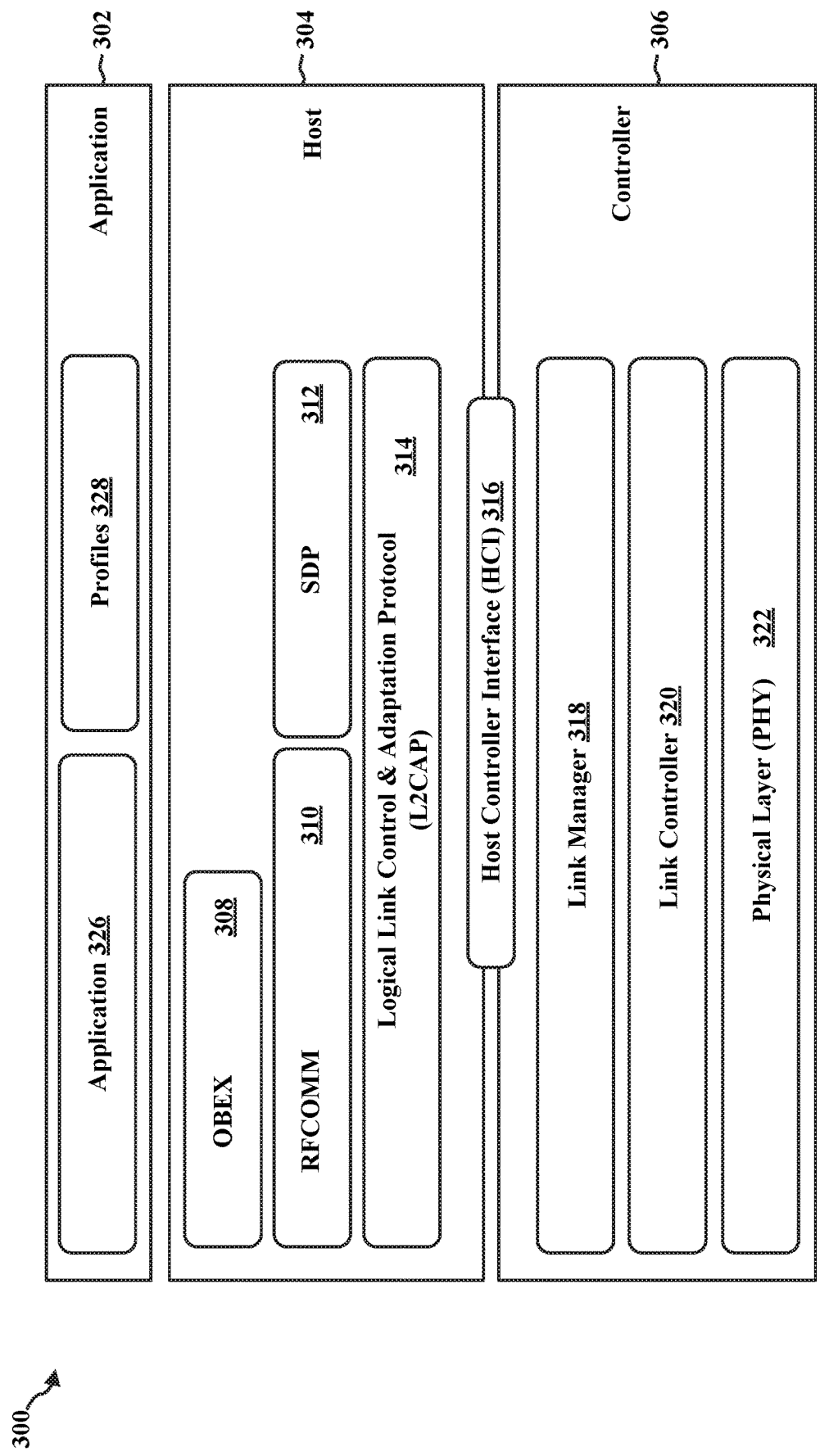
FIG. 3A is a diagram illustrating a Bluetooth (BT) protocol stack that may be implemented by a BT device in accordance with certain aspects of the disclosure.

FIG. 3A illustrates a BT protocol stack 300 that may be implemented in a wireless device in accordance with certain aspects of the disclosure. For example, the BT protocol stack 300 may be implemented by, e.g., one or more of processor(s) 202, memory 206, Flash memory 210, ROM 208, the radio 230, and/or the short-range communication controller 252 illustrated in FIG. 2.

Referring to FIG. 3A, the BT protocol stack 300 may be organized into lower layer(s), a middle layer(s), and upper layer(s). The lower layer(s) of the BT protocol stack 300 may include a controller stack 306, which may be used for, inter alia, hardware interface management, link establishment, and link management. The middle layer(s) of the BT protocol stack 300 may include a host stack 304, which may be used for, inter alia, application (layer) interface management to allow an application (layer) to access short-range wireless communications. The higher layer(s) of the BT protocol stack 300 may include an application layer 302, which may include one or more applications and one or more profiles that allow the one or more applications to use BT communications.

The controller stack 306 may include a physical (PHY) layer 322. The PHY layer 322 may include, for example, a radio and/or a baseband processor. In some aspects, the PHY layer 322 may define the mechanism for transmitting a bit stream over a physical link or channel that connects BT devices. The bit stream may be grouped into code words or symbols, and converted to a data packet that is transmitted over a wireless transmission medium. The PHY layer 322 may provide an electrical, mechanical, and/or procedural interface to the wireless transmission medium. The PHY layer 322 may be responsible for modulation and demodulation of data into radio frequency (RF) signals for transmission over the air. The PHY layer 322 may describe the physical characteristics of a wireless device's receiver/transmitter. The physical characteristics may include modulation characteristics, radio frequency tolerance, sensitivity level, etc.

The controller stack 306 may further include a link controller 320. The link controller 320 may be responsible for properly formatting data for providing to and obtaining from the PHY layer 322. Further, the link controller 320 may perform synchronization of links (e.g., logical links including ACL links, A2DP links, SCO links, eSCO links, ISO links, etc.). The link controller 320 may be responsible for executing commands and instructions issued by a link manager 318, including establishing and maintaining links instructed by the link manager 318.

The link manager 318 may translate host controller interface (HCI) 316 commands into controller-level operations (e.g., baseband-level operations). The link manager 318 may be responsible for establishing and configuring links and managing power-change requests, among other tasks. Each type of logical link (e.g., ACL links, A2DP links, SCO links, eSCO links, ISO links, etc.) may be associated with a specific packet type. For example, an SCO link may provide reserved channel bandwidth for communication between a master device and a slave device, and support regular, periodic exchange of data packets with no retransmissions. An eSCO link may provide reserved channel bandwidth for communication between a master device and a slave device, and support regular, periodic exchange of data packets with retransmissions. An ACL link may exist between a master device and a slave device from the beginning of establishment of a connection between the master device and the slave device, and the data packets for ACL links may include encoding information in addition to a payload.

The link manager 318 may communicate with the host stack 304 through a host controller interface (HCI) 316— e.g., the link manager 318 may translate HCI 316 commands into controller-level operations (e.g., baseband-level operations). The HCI 316 may act as a boundary between the lower layers (e.g., the controller stack 306) of the BT protocol stack 300 and the other layers of the BT protocol stack (e.g., the host stack 304 and the application layer 302). The BT specification may define a standard HCI to support BT systems that are implemented across two separate processors. For example, a BT system on a computer might use the BT system's own processor to implement the lower layers of the stack (e.g., the PHY layer 322, the link controller 320, and/or the link manager 318). The BT system might use a processor of a BT component to implement the other layers (e.g., the host stack 304 and the application layer 302). In some aspects, however, the BT system may be implemented on a same processor, and such a BT system may be referred to as "hostless."

The host stack 304 may include at least a Logical Link Control and Adaptation Protocol (L2CAP) layer 314, a service discovery protocol (SDP) layer 312, a radio frequency communication (RFCOMM) layer 310, and an object exchange (OBEX) layer 316. The L2CAP layer 314 is implemented above the HCI 316, and may communicate through the HCI 316. The L2CAP layer 314 may be primarily responsible for establishing connections across some existing links (e.g., logical links, including ACL links) and/or requesting some links (e.g., logical links, including ACL links) if those do not already exist. Further, the L2CAP layer 314 may implement multiplexing between different higher-layer protocols, such as SDP protocols and RFCOMM protocols, which may to allow different applications to use a single link (e.g., a logical link, including an ACL link). In addition, the L2CAP layer 314 may repackage data packets received from higher layers into a format expected by lower layers. The L2CAP layer 314 may employ the concept of channels to keep track of where data packets come from and where data packets should go. A channel may be a logical representation of the data flow or stream between the L2CAP layer 314 at a transmitting device (e.g., a master device) and another L2CAP layer 314 at a receiving device (e.g., a slave device).

The SDP layer 312 may define actions for both servers and clients of BT services. The BT specification defines a service as any feature that may be usable by another (remote) BT device. An SDP client may communicate with an SDP server using a reserved channel on an L2CAP link to discover what services are available. When the SDP client finds the desired service, the SDP client may request a separate connection to use the service. The reserved channel may be dedicated to SDP communication so that a device knows how to connect to the SDP service on any other device. An SDP server may maintain an SDP database, which may include a set of service records that describe the services the SDP server offers. Along with information describing how an SDP client can connect to the service, the service records may contain a universally unique identifier (UUID) of the service.

The RFCOMM layer 310 may emulate the serial cable line settings and status of an RS-232 serial port. The RFCOMM layer 310 may connect to the lower layers of the BT protocol stack 300 through the L2CAP layer 314. By providing serial-port emulation, the RFCOMM layer 310 may support legacy serial-port applications. The RFCOMM layer 310 may also support the Object Exchange (OBEX) layer 308.

The OBEX layer 308 may define a communication protocol that may be used by devices to exchange data objects, and the data objects may also be defined by the OBEX layer 308. A BT device that wants to set up an OBEX communication session with another device may be considered the client device. The client initially may send one or more SDP requests to ensure that the other device can act as a server of OBEX services. If the server device can provide OBEX services, the server device may respond with the OBEX service record of the server device. The OBEX service record may contain an RFCOMM channel number that the client device may use to establish an RFCOMM channel. Further communication between the two devices may be conveyed in packets, which may contain requests, responses, and/or data. The format of the packet may be defined by the OBEX session protocol.

The application layer 302 may include at least one application 326, with which a user may interact and which may access BT communications for various functionality. The application 326 may access BT communications through one or more profiles 328, which may describe a variety of different types of tasks. By following procedures of one or more profiles 328, the application 326 may use BT communications according to a BT specification.

Figure 3B:
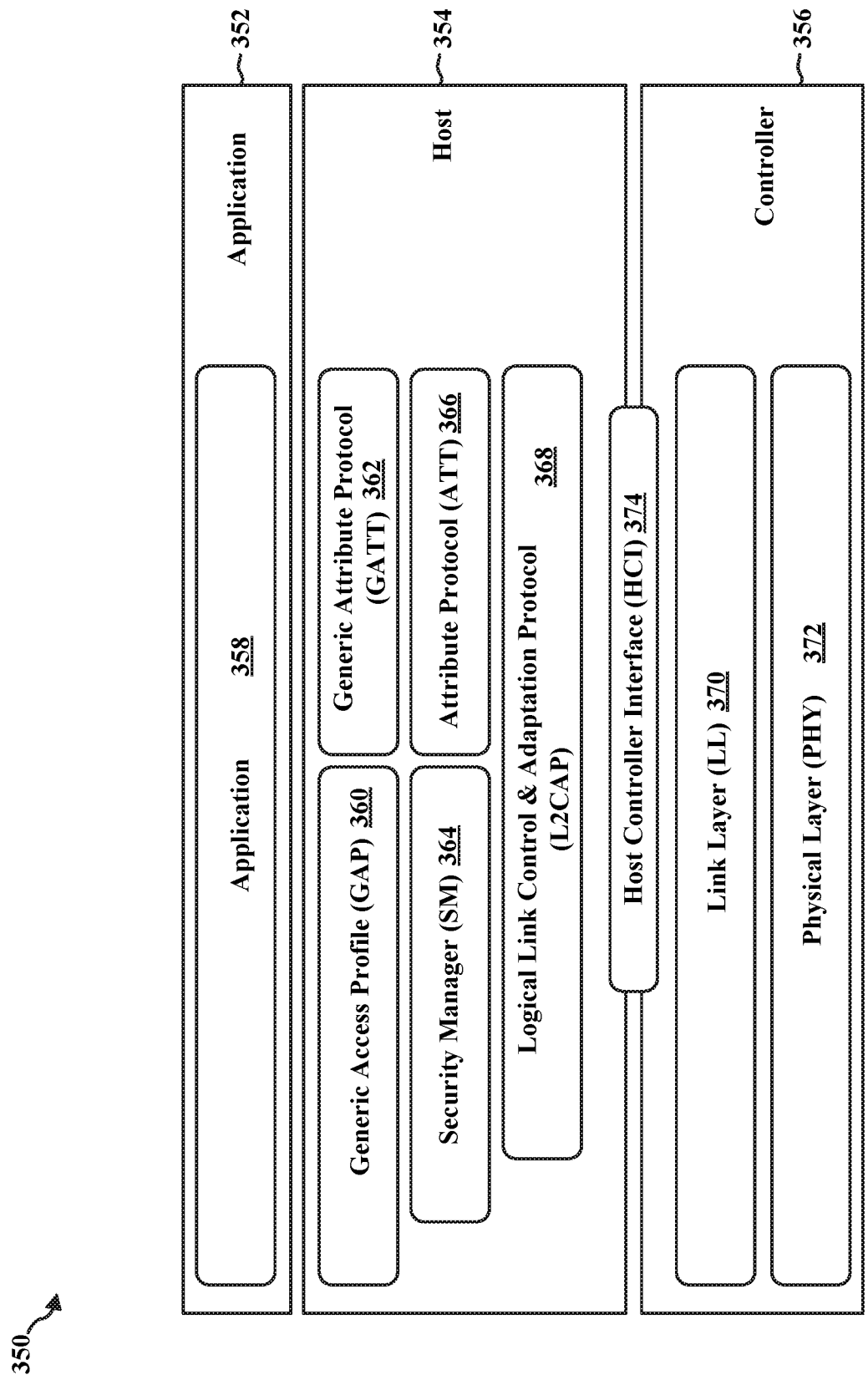
FIG. 3B is a diagram illustrating a BT Low Energy (BLE) protocol stack that may be implemented by a BLE device in accordance with certain aspects of the disclosure.

FIG. 3B illustrates a BLE protocol stack 350 that may be implemented in a BLE device. For example, the BLE protocol stack 350 may be implemented by, e.g., one or more of processor(s) 202, memory 206, Flash memory 210, ROM 208, the radio 230, and/or the short-range communications controller 252 illustrated in FIG. 2.

The BLE protocol stack 350 may be organized into three layers, which may include, an application layer 352, a host stack 354, and a controller stack 356. The controller stack 356 may be below the host stack 354 and the application layer 352 in the BLE protocol stack 350. The controller stack 356 may include a PHY layer 372 and a LL 370.

The PHY layer 372 may define the mechanism for transmitting a bit stream over a physical link that connects BLE devices. The bit stream may be grouped into code words or symbols, and converted to a data packet that is transmitted over a transmission medium. The PHY layer 372 may provide an electrical, mechanical, and procedural interface to the transmission medium. The shapes and properties of the electrical connectors, the frequency band used for transmission, the modulation scheme, and similar low-level parameters may be specified by the PHY layer 372.

The LL 370 is responsible for low-level communication over the PHY layer 372. The LL 370 manages the sequence and timing for transmitting and receiving data packets, and using a LL protocol, communicates with other devices regarding connection parameters and data flow control. The LL 370 also provides gatekeeping functionality to limit exposure and data exchange with other devices. If filtering is configured, the LL 370 maintains a list of allowed devices and will ignore all requests for data exchange from devices not on the list. The LL 370 may also reduce power consumption. In some aspects, the LL 370 may include a company's proprietary LL that may be used to discover peer devices (e.g., other devices associated with the company), and establish a secure communication channel therewith. In certain aspects, the LL 370 may be responsible for transporting data packets between devices in a WPAN. Each data packet may include an access address, which specifies the type of logical transport used to carry the data packet. Logical transports may exist between a master device and slave devices. Additionally, some logical transports may carry multiple logical links.

The BLE protocol stack 350 may include an HCI 374, which may act as a boundary between the lower layers (e.g., the controller stack 356) of the BLE protocol stack 350 and the other layers of the BLE protocol stack (e.g., the host stack 354 and the application layer 352). In addition, the host stack 354 may communicate with a BLE controller (e.g., short-range communications controller 252 in FIG. 2) in a wireless device using the HCI 374. The LL 370 may use the HCI 374 to communicate with the host stack 354 of the BLE protocol stack 350. While some BLE systems may be "hostless," in that the host stack 354 and the controller stack 356 may be implemented on a same processor, the HCI 374 may also allow the host stack 354 to communicate with different controller stacks 356, such as when the controller stack 356 is implemented on a second processor.

The host stack 354 may include a generic access profile (GAP) 360, a generic attribute protocol (GATT) 362, a security manager (SM) 364, an attribute protocol (ATT) 366, and an L2CAP layer 368. The L2CAP layer 368 may encapsulate multiple protocols from the upper layers into a data packet format (and vice versa). The L2CAP layer 368 may also break packets with a large data payload from the upper layers into multiple packets with the data payload segmented into smaller size data payloads that fit into a maximum payload size (e.g., twenty-seven bytes) on the transmit side. Similarly, the L2CAP layer 368 may receive multiple data packets carrying a data payload that has been segmented, and the L2CAP layer 368 may combine the segmented data payload into a single data packet carrying the data payload that will be sent to the upper layers (e.g., the application layer 352).

The ATT 366 includes a client/server protocol based on attributes associated with a BLE device configured for a particular purpose (e.g., monitoring heart rate, temperature, broadcasting advertisements, etc.). The attributes may be discovered, read, and written by peer devices. The set of operations which are executed over ATT 366 may include, but are not limited to, error handling, server configuration, find information, read operations, write operations, queued writes, etc. The ATT 366 may form the basis of data exchange between BLE devices.

The SM 364 may be responsible for device pairing and key distribution. A security manager protocol implemented by the SM 364 may define how communications with the SM of a counterpart BLE device are performed. The SM 364 provides additional cryptographic functions that may be used by other components of the BLE protocol stack 350. The architecture of the SM 364 used in BLE is designed to minimize recourse requirements for peripheral devices by shifting work to an assumingly more powerful central device. BLE uses a pairing mechanism for key distribution. The SM 364 provides a mechanism to not only encrypt the data but also to provide data authentication.

Above the host stack 354 in the BLE protocol stack 350, the application layer 352 may include an application 358, such as a user application which interfaces with the host stack 354 of the BLE protocol stack 350 for various functionality through BLE communications.

Referring back to the host stack 354, the GATT 362 may provide a service framework using the attribute protocol for discovering services, and for reading and writing characteristic values on a peer device. The GATT 362 may interface with the application 358, e.g., through a profile, which may define a collection of attributes and any permission needed for the attributes to be used in BLE communications. The GAP 360 may provide an interface for the application 358 to initiate, establish, and manage connections with other BLE devices.

In some aspects, a wireless device (e.g., the wireless device 102, the wireless device 200, etc.) may be configured to communicate according to different standards and/or protocols. For example, the wireless device may be configured with both BT and BLE for short-range wireless communications. Accordingly, the wireless device may be configured with both the BT protocol stack 300 and the BLE protocol stack 350. In some aspects, one or more layers may be configured for use in both the BT protocol stack 300 and the BLE protocol stack 350—e.g., the L2CAP layers 314, 368 of the protocol stacks 300, 350 may be configured for dual mode short-range wireless communications using either BT or BLE.

Figure 4A:
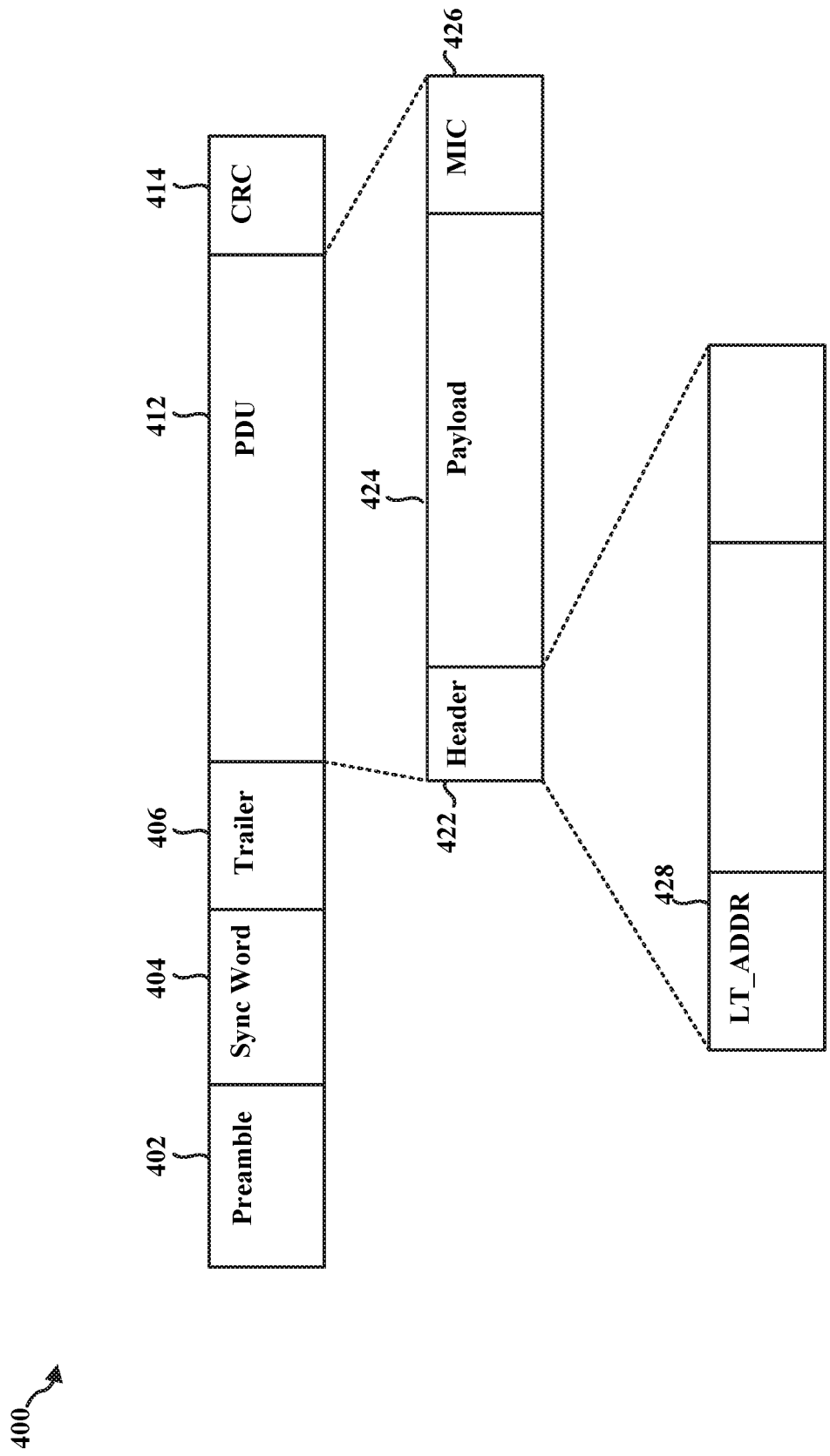
FIG. 4A is a diagram illustrating a BT data packet in accordance with certain aspects of the disclosure.

FIG. 4A is a diagram illustrating a data packet 400 in accordance with certain aspects of the present disclosure. The data packet may be used with various short range wireless communications technologies, such as BT. The data packet 400 may include a preamble 402, a sync word 404, a trailer 406, a PDU 412, and a CRC 414. In certain configurations, the data packet 400 may not include the CRC 414.

In certain configurations, the PDU 412 may include a header 422, a payload 424, and a MIC 426. The MIC includes information that may be used to authenticate a data packet, e.g., when the data packet is encrypted. In other words, the MIC may be used by the receiving device to confirm that the message came from the stated transmitting device (e.g., data packet authenticity), and to confirm that the payload 424 has not been changed (e.g., data packet integrity). The MIC protects both payload integrity and the authenticity of the data packet 400 by enabling a receiving device who also possess the secret key to detect any changes to the payload 424.

In some aspects, the header 422 of the PDU 412 may include a plurality of fields, including at least an LT_ADDR 428. The LT_ADDR may indicate a logical transport address. The LT_ADDR 428 may be associated with a logical link. For example, a logical transport address included in the LT_ADDR 428 may indicate a type of logical link (e.g., ACL, A2DP, eSCO, ISO, etc.).

Figure 4B:
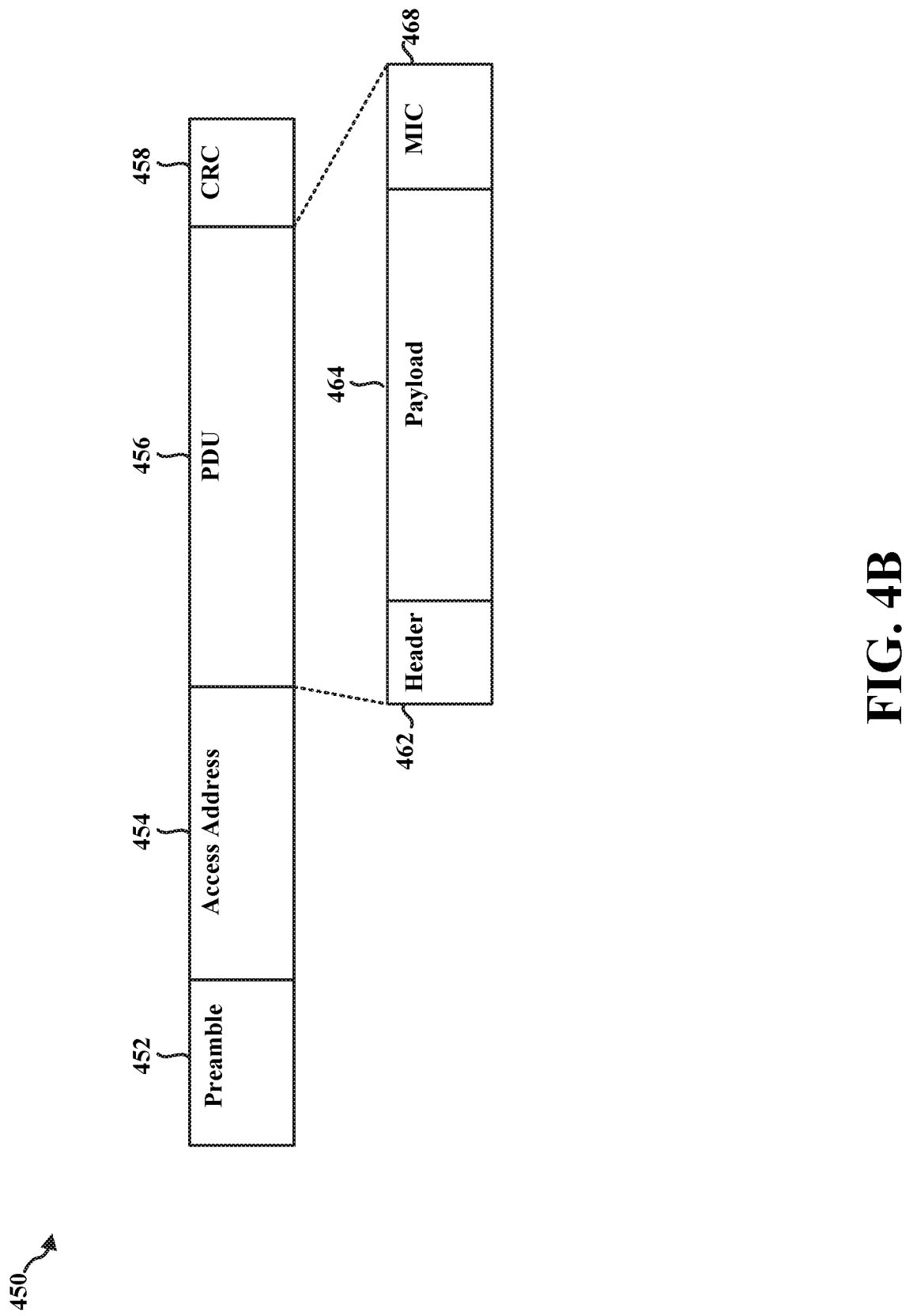
FIG. 4B is a diagram illustrating a BLE data packet in accordance with certain aspects of the disclosure.

FIG. 4B is a diagram illustrating a data packet 450 in accordance with certain aspects of the present disclosure. The data packet may be used with various short range wireless communications technologies, such as BLE. The data packet 450 may include a preamble 452, an access address 454, a PDU 456, and a CRC 458. In certain configurations, the data packet 450 may not include the CRC 458.

In some aspects, the access address 454 may set the address of a link layer (e.g., the link layer 370) connection. For example, the access address 454 may include an address that indicates a type of logical link (e.g., ACL, A2DP, eSCO, ISO, etc.).

In certain configurations, the PDU 456 may include a header 462, a payload 464, and a MIC 468. The MIC includes information that may be used by to authenticate a data packet, e.g., when the data packet is encrypted. In some aspects, the header 462 of the PDU 456 may include a plurality of fields, including at least an logical link identifier (LLID).

Figure 5:
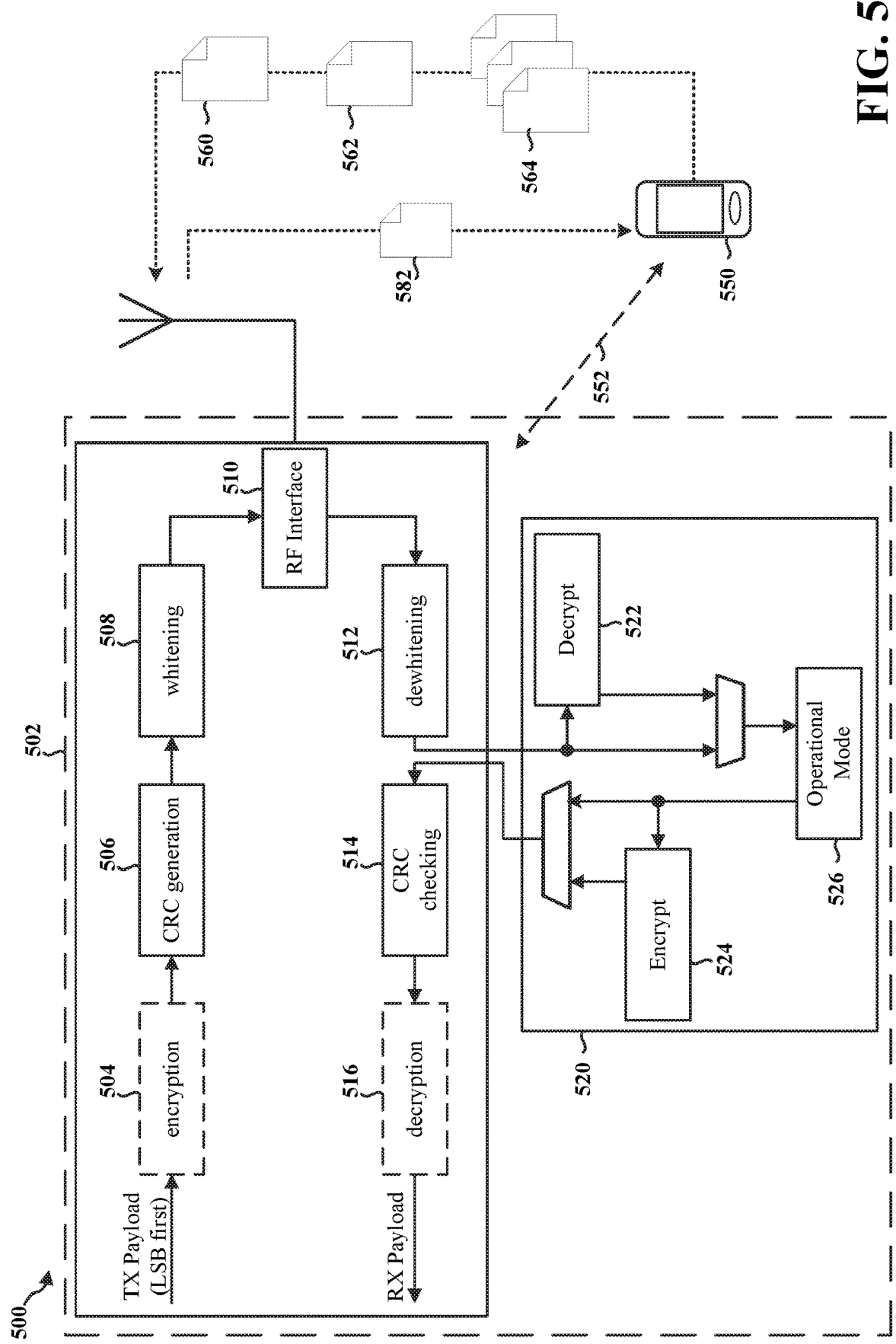
FIG. 5 is a diagram illustrating a short-range wireless communications system in accordance with certain aspects of the disclosure.

FIG. 5 illustrates a wireless communications system 500, in accordance with various aspects of the present disclosure. The wireless communications system 500 may include two devices 502, 550. In some aspects, one device 550 may be a source device. For example, the device 550 may be the device 102 of FIG. 1. The other device 502 may be a sink device. For example, the device 502 may be the headset 112 of FIG. 1. Herein, the device 502 may be referred to as the sink device 502 and the device 550 may be referred to as the source device; however, these labels are not intended to limit the scope of the present disclosure.

The sink device 502 may be configured to transmit packets with one or more mechanisms for security and/or integrity. Accordingly, the sink device 502 may include an encryption component 504, a CRC generation component 506, and a whitening component 508. The encryption component 504 may encrypt packets according to any one of a number of different encryption algorithms or protocols, such as the Advanced Encryption Standard (AES), or AES-counter with cipher block chaining message authentication code (CBC-MAC) (CCM) (AES-CCM). In one aspect, the encryption component 504 may generate a MIC value based on data that is to be transmitted, and the encryption component 504 may append the MIC value on the data that is to be included in a payload of a packet.

The CRC generation component 506 may be configured to generate a CRC value based on the data, which may include the appended MIC value. In some aspects, the CRC generation component 506 may generate a CRC value based on a PDU (e.g., a PDU including a header, a payload, and a MIC value). The CRC value may be appended to the packet after the PDU. The whitening component 508 may be configured to whiten the data, such as by applying a whitening transform to the data. The packet may then be provided to the RF interface, which may provide the data to the RF frontend circuitry for transmission via a transmit chain of the sink device 502.

According to different aspects, the sink device 502 may include more or fewer components. For example, the sink device 502 may include a component for forward error correction (FEC) encoding, which may encode a packet with FEC (e.g., using error-correcting code to encode the packet with redundancy). A component for FEC encoding may logical occur after the whitening component 508, e.g., so that the packet is encoded with FEC after data whitening. In another example, the sink device 502 may include a component for pattern mapping. For pattern mapping, a bit code of the packet may be mapped to input bits, resulting in a spreading of data in connection with the FEC encoding to facilitate recovery of the data by the receiver. Thus, the component for pattern mapping may logically occur after a component for FEC encoding.

In still another aspect, the sink device 502 may include a component for encoding, which may encode at least a portion of the packet before transmission. A component for encoding may logical occur after the whitening component 508, e.g., so that the packet is encoded after data whitening.

When the sink device 502 receives a packet, the packet may be received by the RF frontend circuitry via a receive chain of the sink device 502, and the RF interface 510 may provide the packet a dewhitening component 512. The dewhitening component 512 may dewhiten data included in a PDU of the received packet, which may include applying an inverse of a whitening transform used to whiten the data.

In some aspects, the sink device 502 may include a component for FEC decoding, which may decode a packet with FEC (e.g., using error-correcting code to decode redundancy in the packet). A component for FEC decoding may logical occur before the dewhitening component 512, e.g., so that the packet is decoded with FEC before data dewhitening. In another example, the sink device 502 may include a component for pattern demapping. For pattern mapping, a bit code of the packet may be demapped to data bits, e.g., to facilitate recovery of the data by the sink device 502. Thus, the component for pattern demapping may logically occur before a component for FEC decoding.

In still another aspect, the sink device 502 may include a component for decoding, which may decode at least a portion of the packet after reception. A component for decoding may logical occur before the dewhitening component 512, e.g., so that the packet is decoded before data dewhitening.

Received packets, including an initial data packet and one or more retransmissions of the initial data packet, may be provided to an error correction component 520. The error correction component 520 may be configured to detect errors in the retransmission packet, as described in the present disclosure. The error correction component 520 may attempt to correct any errors detected in the retransmission packet and, if the error correction component 520 is unable to generate an error-free packet to correct the errors, the error correction component 520 may generate a set of bit error quality metrics.

The error correction component 520 may provide a packet (e.g., estimated based on an initial packet and a retransmission packet) and, if applicable, the set of bit error quality metrics, to a CRC checking component 514. The CRC checking component 514 may generate a CRC value based on the packet from the error correction component 520, and compare the generated CRC value with a CRC value indicated in the packet. If the CRC checking component 514 determines that the generated CRC value matches the CRC value indicted in the packet, then the packet may pass at least a portion of a decoding check, and the CRC checking component 514 may provide the packet to a decryption component 516.

If the CRC checking component 514 determines that the generated CRC value does not match the CRC value indicted in the packet, then the packet may fail the decoding check. In which case, the packet may still be provided to a higher layer (e.g., a CODEC) with the set of bit error quality metrics in an attempt to reconstruct the data even with the error(s), or the sink device 502 may transmit a NACK message to the source device 550 to indicate that the packet was not successfully decoded.

When the decryption component 516 obtains the packet, the decryption component 516 may apply at least one of any number of decryption algorithms or protocols, such as AES-CCM, EO, and so forth, in order to decrypt the packet. The packet may then be provided to a higher layer (e.g., a CODEC) in order to be output by the sink device 502, e.g., for streaming audio or video.

The decryption component 516 of the sink device 502 and the source device 550 may agree on at least one nonce to be used for decryption of data packets. In one aspect, one nonce may be agreed upon between the decryption component 516 and the source device 550 for at least a set of packets, such as the initial data packet 562 and the set of retransmission data packets 564. In another aspect, the decryption component 516 and the source device 550 may agree on a first nonce for decryption of one set of data packets (e.g., the initial data packet 562) and at least one other nonce for decryption of another set of data packets (e.g., the set of retransmission data packets 564).

For the communication of packets, the source device 550 may establish a short-range wireless communications link with the sink device 502. The short-range wireless communications link may be, for example, a BT link or a BLE link. In connection therewith, the source device 550 and the sink device 502 may establish a logical link 552. In various aspects, the logical link 552 may be one of an ACL link, an A2DP link, an eSCO link, or an ISO link. The source device 550 may transmit data packets over the logical link 552 to the sink device 502. In some configurations, the sink device 502 may respond to a received data packet with feedback, such as an ACK message when a data packet is successfully decoded by the sink device 502 or a NACK message when a data packet is unsuccessfully decoded.

The source device 550 may transmit a first packet 560, which may be received by the sink device 502. The first packet 560 may be associated with establishment of the logical link 552. The first packet 560 may include a header portion. In one aspect, the header portion may be included in a PDU of the first packet 560 (e.g., the header 422 of the PDU 412 of the packet 400). In another aspect, the first packet 560 may include an access address (e.g., the access address 454) that is separate from a PDU (e.g., the PDU 456).

The packet may include an address that indicates the type of the logical link 552. For example, the first packet 560 may include a header portion that includes an LT_ADDR (e.g., for BT communications) or the first packet 560 may include an access address (e.g., for BLE communications). The sink device 502 may determine the type of the logical link 552 based on the access address or the LT_ADDR indicated in the header portion of the first packet 560. For example, the sink device 502 may determine whether the logical link 552 is an ACL link, an A2DP link, an eSCO link, or an ISO link.

When the logical link 552 is established, the sink device 502 may be configured to receive data packets over the established logical link 552. For example, the source device 550 may transmit an initial data packet 562 over the logical link 552. The initial data packet 562 may include data, e.g., to be output by the sink device 502. For example, the initial data packet 562 may include audio data, video data, and the like.

The sink device 502 may receive the initial data packet 562 at the RF interface 510. The dewhitening component 512 may obtain the initial data packet 562 provided by the RF interface 510, and the dewhitening component 512 may dewhiten the data (e.g., the PDU) of the initial data packet 562.

The sink device 502 may then apply a decoding check to the initial data packet 562. When the initial data packet 562 is received, the error correction component 520 may obtain the initial data packet 562 but may refrain from applying error correction until the decoding check is applied, e.g., to determine if the initial data packet 562 includes one or more errors. The decoding check may include CRC validation and, if applicable, MIC validation (e.g., when the initial data packet is encrypted).

The CRC checking component 514 may obtain the initial data packet 562. The CRC checking component 514 may generate a CRC value based on the initial data packet 562 (e.g., based on a payload and, if applicable, a MIC value included in a PDU of the initial data packet 562). The CRC checking component 514 may compare the generated CRC value with a CRC value indicated in the initial data packet 562 (e.g., after the PDU of the initial data packet 562). If the generated CRC value matches the CRC value indicated in the initial data packet 562, then the initial data packet 562 may be validated for CRC and may at least partially pass the decoding check. The CRC-validated initial data packet 562 may be provided to the decryption component 516. If the generated CRC value does not match the CRC value indicated in the initial data packet 562, then the CRC checking component 514 may determine that the initial data packet 562 is not CRC validated and fails the decoding check.

If the initial data packet is encrypted, the decryption component 516 may decrypt the initial data packet 562 and obtain a decrypted payload and a decrypted MIC value. The decryption component 516 may generate a MIC value based on the decrypted payload, and compared the generated MIC value with the decrypted MIC value. If the generated MIC value matches the decrypted MIC value (and the CRC checking component 514 has already validated the initial data packet 562), then the initial data packet 562 may pass the decoding check.

When the initial data packet passes the decoding check, the payload of the PDU of the initial data packet 562 may be passed to a higher layer (e.g., a receiver buffer, a CODEC, etc.). In some aspects, the sink device 502 may transmit a feedback message indicating an ACK to the source device 550 to indicate that the initial data packet 562 was successfully received and decoded.

If the generated MIC value does not match the decrypted MIC value, then the initial data packet 562 may fail the decoding check (even though the initial data packet 562 may be CRC validated). When the initial data packet 562 fails the decoding checking, then the error correction component 520 may obtain a set of retransmission packets for error correction of the initial data packet 562. In some aspects, the sink device 502 may transmit a feedback message 582 indicating a NACK to the source device to indicate that the initial data packet 562 was unsuccessfully decoded.

The source device 550 may transmit a set of retransmission data packets 564. For example, the source device may transmit a first retransmission data packet of the set of retransmission data packets 564 in response to a feedback message 582 indicating a NACK received from the sink device 502. The sink device 502 may receive the first retransmission data packet of the set of retransmission data packets 564, and the error correction component 520 may obtain the first retransmission data packet of the set of retransmission data packets 564 from the dewhitening component 512.

The error correction component 520 may be configured with a plurality of operational modes for error correction of data packets. The plurality of operational modes for error correction may include at least a soft-combining mode, a quality bit mask (QBm) mode, and a quality bit mask hybrid (QBm-H) mode. Illustrative aspects of the operational modes may be described herein.

The error correction component 520 may select and apply one of the plurality of operational modes for error correction. To select the one operational mode, the error correction component 520 may first determine the type of the logical link 552. The error correction component 520 may determine the type of the logical link 552 based on at least one of an access address or an LT_ADDR, which may be included in the first packet 560 and/or the initial data packet 562. The access address or the LT_ADDR may indicate, to the error correction component 520, the type of the logical link 552.

Each of the plurality of operational modes may be associated with at least one of the types of logical links. For example, when the logical link 552 includes an ACL link or an A2DP link, the error correction component 520 may select the soft-combining mode. When the logical link 552 includes an eSCO link, the error correction component 520 may select the QBm mode. When the logical link 552 includes an ISO link, the error correction component 520 may select the QBm-H mode. The error correction component 520 may apply the selected operational mode 526 when the initial data packet 562 fails the decoding check (e.g., fails CRC validation and/or fails MIC validation).

In various aspects of the operational mode 526, if the initial data packet 562 and the set of retransmission data packets 564 are encrypted, then the selected operational mode 526 may be applied to either the encrypted PDUs of the data packets 562, 564 or the decrypted PDUs of the data packets 562, 564. In addition, the selected soft-combining operational mode 526 may be applied to the payload of the PDUs (without the MIC) of data packets 562, 564 or both the payload and the MIC of the PDUs of the data packets 562, 564.

When the first nonce agreed upon for decryption of the initial data packet 562 matches the one or more respective nonces agreed upon for decryption of each of the set of retransmission data packets 564, then the selected soft-combining operational mode 526 may be applied to both the payloads and the MIC values of the initial data packet 562 and the set of retransmission data packets 564. When the first nonce agreed upon for decryption of the initial data packet 562 is different from at least one nonce agreed upon for decryption of at least one of the set of retransmission data packets 564, then the selected soft-combining operational mode 526 may be applied to only the payloads of the PDU data of the initial data packet 562 and the set of retransmission data packets 564. In other words, the MIC values included in the PDU data of the initial data packet 562 and the set of retransmission data packets 564 may be excluded from application of the selected soft-combining operational mode 526.

In application of the selected soft-combining operational mode 526, the error correction component 520 may store each of the set of soft values in each of a set of buffers. For example, each bit of the initial data packet 562 may be mapped to a three-bit signed soft value. That is, each bit of the array of bits of which the PDU data (e.g., payload and, if applicable, MIC value) of the initial data packet 562 is comprised may be stored as a three-bit signed soft value in each buffer of an array of buffers. In other words, bit i of the PDU data of the initial data packet 562 may be stored in a buffer index i as a three-bit signed soft value. A 1 bit of the PDU data of the initial data packet 562 may be stored as a −1 soft value (e.g., −'3sd1), and a 0 bit of the PDU data of the initial data packet 562 may be stored as a 0 soft value (e.g., +'3sd0, and a 0 soft value may be considered a positive signed soft value).

Further to the application of the selected soft-combining operational mode 526, for each of the set of retransmission data packets 564, each of the set of soft values stored in each of the buffers may be accumulated with another three-bit signed soft value based on a corresponding bit of PDU data of each of the set of retransmission data packets 564. For example, bit i of the PDU data of the first retransmission data packet of the set of retransmission data packets 564 may be accumulated with the three-bit signed soft value in a buffer index i. A 1 bit of the PDU data of the first retransmission data packet of the set of retransmission data packets 564 may be accumulated as a −1 soft value (e.g., −'3sd1), and a 0 bit of the PDU data of the first retransmission data packet of the set of retransmission data packets 564 may be accumulated as a +1 soft value (+3'sd1).

In some aspects, the set of buffers may be saturated at a minimum value and at a maximum value, which may prevent buffer underflow or overflow. For example, each buffer may be saturated to a maximum value of +3 (+3'sd3) and saturated to a minimum value of −4 (−3'sd4). Accordingly, buffer index i may not exceed the minimum or maximum values, and an additional bit i from additional PDU data of an additional retransmission data packet of the set of retransmission data packets 564 may cause the soft value in buffer index i to remain at the saturated minimum or maximum value.

After the bits of PDU data of a retransmission data packet of the set of retransmission data packets 564 is accumulated in the set of buffers, the three-bit signed soft values in the set of buffers may be "hard sliced" or mapped to a one bit value of a set of estimated bit values. When a buffer index i is greater than or equal to 0 (3'sd0), then a 0 may be mapped to the one bit value in the set of estimated values. When a buffer index i is less than 0 (3'sd0), then a 1 may be mapped to the one bit value in the set of estimated values. This estimated set of bit values may represent an estimation of the PDU data of the initial data packet 562 (e.g., payload and, if applicable, MIC value).

The set of estimated bit values may then be provided as a data packet to the CRC checking component 514 and the decryption component 516, which may determine whether this set of estimated bit values passes the decoding check (e.g., CRC validation and, if applicable, MIC validation). For example, the CRC checking component 514 may generate a CRC value based on the set of estimated bit values, and may compare the generated CRC value with a CRC value included in a most recently received data packet of the set of retransmission data packets 564. Similarly, the decryption component 516 may generate a MIC value based on the set of estimated bit values, and may compare the generated MIC value with a MIC value included in a most recently received data packet of the set of retransmission data packets 564.

If the set of estimated bit values causes a data packet to pass the decoding check, then the set of estimated bit values may be provided to a higher layer (e.g., receiver buffer, CODEC, etc.). In one aspect, if the set of estimated bit values causes the data packet to fail the decoding check, then the sink device 502 may transmit a feedback message 582 indicating a NACK for the most recently received retransmission data packet of the set of retransmission data packets. In another aspect, if the set of estimated bit values causes the data packet to fail the decoding check, then the sink device 502 may still provide the set of estimated bit values to the higher layer (e.g., receiver buffer, CODEC, etc.), and potentially the higher layer may recover the bit errors or may conceal the bit errors. For example, when the number of the set of retransmission data packets 564 is bound by a maximum threshold, the last retransmission data packet before the maximum threshold is received, and the set of estimated bit values still fails the decoding check, the set of estimated bit values may still be provided to the higher layer.

In some aspects, the error correction component 520 may generate a set of bit error quality metrics based on the set of estimated bit values, and the set of bit error quality metrics may indicate a location and/or a number of one or more potential bit errors—e.g., at indices of the set of estimated bit values at which the three-bit signed soft value was 0 at the hard slice. The error correction component 520 may provide the set of bit error quality metrics to the higher layer, e.g., to facilitate recovery of bit errors.

When the logical link 552 includes an eSCO link, the selected operational mode 526 may include the QBm mode. For the QBm mode, the error correction component 520 may perform a bitwise majority function based on the bits of the PDU data of the initial data packet 562, the bits of the PDU data of a first retransmission data packet of the set of retransmission data packets 564, and the bits of the PDU data of a second retransmission data packet of the set of retransmission data packets 564.

According to one aspect of a bitwise majority function, the error correction component 520 may capture the initial data packet 562 in a first buffer, and the CRC checking component 514 and the decryption component 516 (if applicable) may determine whether the initial data packet 562 passes the decoding check. When the initial data packet 562 fails the decoding check and a first retransmission data packet of the set of retransmission data packets 564 is received, the CRC checking component 514 and the decryption component 516 (if applicable) may determine whether the first retransmission data packet passes the decoding check. If so, the first retransmission data packet may be passed to the higher layer, and the error correction component 520 may refrain from any further error correction for the initial data packet 562.

When the first retransmission data packet fails the decoding check, each bit of the PDU data (e.g., payload and, if applicable, MIC value) of the initial data packet 562 may be XOR'ed (exclusive-or) with a corresponding bit of the PDU data of a first retransmission data packet of the set of retransmission data packets 564. The results of each XOR operation may be captured into a second buffer. Additionally, a set of bit error quality metrics may be calculated based on the initial data packet 562 and the first retransmission data packet. For example, the set of bit error quality metrics may indicate a number and/or a location of bit errors where a bit i in the PDU data of the initial data packet 562 does not match a corresponding bit i in the PDU data of the first retransmission data packet. In some aspects, the result of the XOR operation indicate the location of the bit errors.

Further, when the first retransmission data packet fails the decoding check, a second retransmission data packet of the set of retransmission data packets 564 may be received. The second retransmission data packet of the set of retransmission data packets 564 may be captured in a third buffer. The CRC checking component 514 and the decryption component 516 (if applicable) may determine whether the second retransmission data packet passes the decoding check. If so, the second retransmission data packet may be passed to the higher layer, and the error correction component 520 may refrain from any further error correction for the initial data packet 562.

When the second retransmission data packet fails the decoding check, each bit of the PDU data (e.g., payload and, if applicable, MIC value) of the initial data packet 562 may be XOR'ed (exclusive-or) with a corresponding bit of the PDU data of the second retransmission data packet of the set of retransmission data packets 564. The results of each XOR operation may be captured into a fourth buffer. For the first transmission data packet and the second retransmission data packet, each bit of the PDU data (e.g., payload and, if applicable, MIC value) of the first retransmission data packet may be XOR'ed (exclusive-or) with a corresponding bit of the PDU data of the second retransmission data packet of the set of retransmission data packets 564. The results of each XOR operation may be captured into a fifth buffer.

Based on the bits of the PDU data of the initial data packet 562, the first retransmission data packet, and the second retransmission data packet, the error correction component 520 may generate a set of bit error quality metrics. The set of bit error quality metrics may indicate a number and/or locations of bit errors across the PDU data of the initial data packet 562, the first retransmission data packet, and the second retransmission data packet. For example, when a bit i is the same in two data packets but different in the other data packet, then the set of bit error quality metrics may indicate that bit i may be erroneous in a set of estimated bit values.

Based on the results of the XOR operations in the second, fourth, and fifth buffers, a bitwise majority vote may be performed by the error correction component 520. The error correction component 520 may generate a set of estimated bit values based on the bitwise majority vote by determining that a bit i of the set of estimated bit values is equal to the bit value at bit i in at least two of the data packets. For example, if the initial data packet 562 and the second retransmission data packet each include a 0 bit value at bit i, but the first retransmission data packet includes a 1 bit value at bit i, then the error correction component 520 may insert a 0 at bit i of the set of estimated bit values.

The set of estimated bit values may be passed to the CRC checking component 514 and the decryption component 516 in a data packet for the decoding check. If the set of estimated bit values passes the decoding check, then the set of estimated bit values may be passed to the higher layer. If the set of estimated bit values fails the decoding check, then the packet may be dropped or the set of estimated bit values may be passed to the higher layer with the set of bit error quality metrics (e.g., so that the higher layer may recover the bit errors or conceal the erroneous data).

When the logical link 552 includes an ISO link, the selected operational mode 526 may include the QBm-H mode. The QBm-H mode may depend on the number of the set of retransmission data packets 564. For example, for the first three data packets, the error correction component 520 may perform a bitwise majority function based on the bits of the PDU data of the initial data packet 562, the bits of the PDU data of a first retransmission data packet of the set of retransmission data packets 564, and the bits of the PDU data of a second retransmission data packet of the set of retransmission data packets 564. If the error correction component 520 is able to generate a set of estimated bit values from the bitwise majority function that passes the decoding checking, then the set of estimated bit values may be passed to the higher layer. In some aspects, the error correction component 520 may determine that a threshold amount of time or a threshold number of retransmission data packets is reached and, therefore, the error correction component 520 may still pass the set of estimated bit values to the higher layer (and, potentially, the set of bit error quality metrics). In such an aspect, additional retransmission data packets (beyond the first and second retransmission data packets) may be discarded.

In another aspect, when the error correction component 520 is unable to generate a set of estimated bit values that passes the decoding check, then more than two retransmission data packets of the set of retransmission data packets 564 may be received. In such an aspect, the error correction component 520 may switch to the soft-combining operational mode to accumulate a set of three-bit signed soft values in a set of buffers for the initial data packet 562 and each data packet of the set of retransmission data packets 564. As described herein, the error correction component 520 may generate a set of estimated bit values by hard slicing or mapping each of the three-bit signed soft values in the set of buffers to a bit value of the set of estimated bit values. The error correction component 520 may pass the set of estimated bit values to the higher layer (and, potentially, the set of bit error quality metrics).

Figure 6:
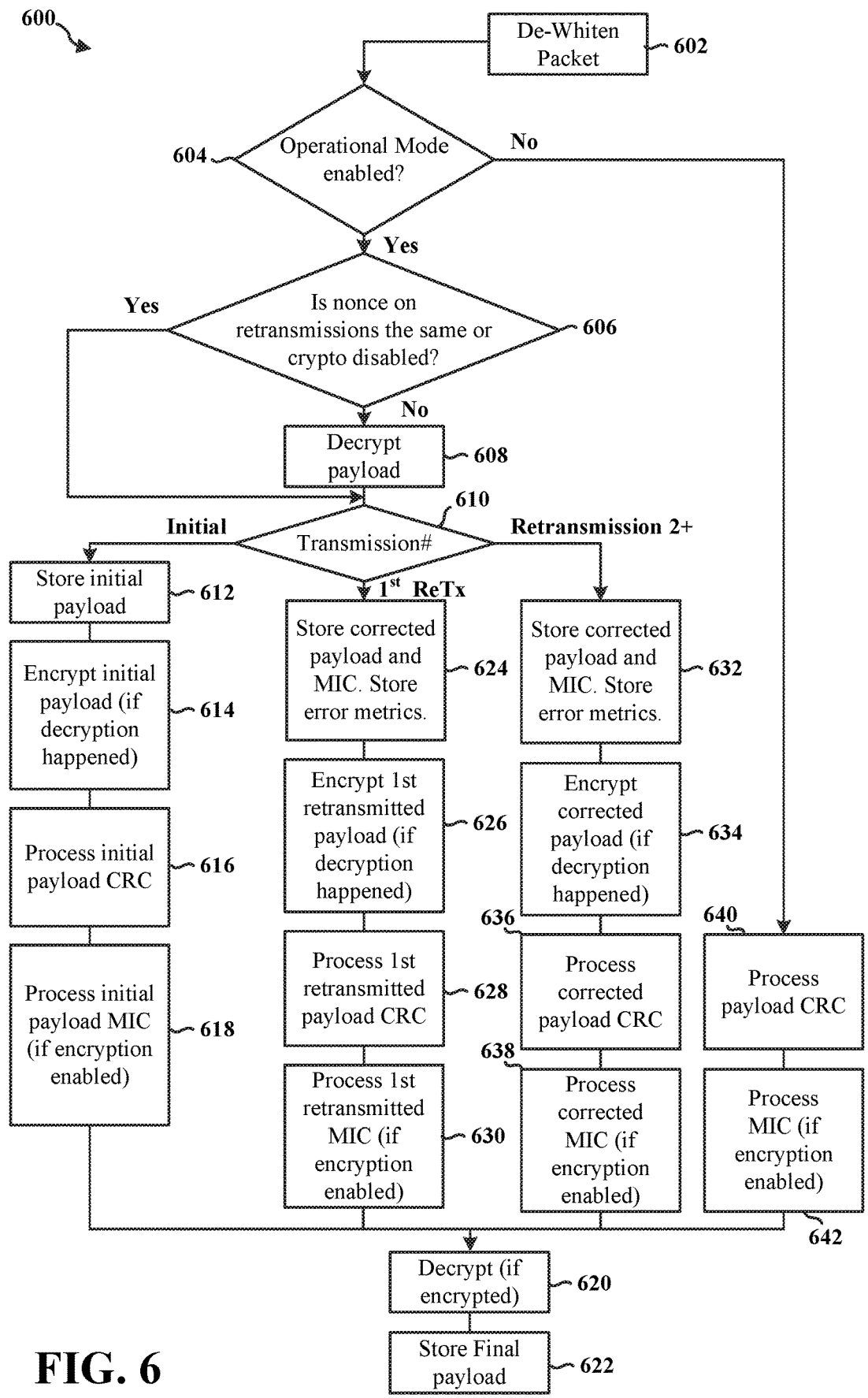
FIG. 6 is a flowchart of a method of error correction in a short-range wireless communications system in accordance with certain aspects of the disclosure.

FIG. 6 illustrates a flow chart 600 of operations that may be performed by the sink device 502 of FIG. 5, in accordance with various aspects of the present disclosure. At operation 602, the dewhitening component 512 may dewhiten the initial data packet 562. At operation 604, the error correction component 520 may determine whether at least one operational mode of a set of operational modes for error correction is enabled. For example, the error correction component 520 may determine the type of the logical link 552 based on the header of a packet (e.g., the first packet 560, the initial data packet 562, etc.). If the type of logical link 552 includes an ACL link or an AD2P link, then the error correction component 520 may enable the soft-combining operational mode 526. If the type of logical link 552 includes an eSCO link, then the error correction component 520 may enable the QBm operational mode 526. If the type of logical link 552 includes an ISO link, then the error correction component 520 may enable the QBm-H operational mode 526.

If the error correction component 520 does not enable the operational mode 526 (e.g., because the type of logical link 552 is not one of ACL, A2DP, eSCO, or ISO), then the initial data packet 562 may be validated with the decoding check. At operation 640, the CRC checking component 514 may process the CRC corresponding to the payload of the initial data packet 562. If the CRC checking component 514 validates the CRC value of the initial data packet 562, then the decryption component 516 may validate a MIC value of the initial data packet 562 (if a MIC value is included). If the decryption component 516 validates the MIC value of the initial data packet 562, then the decryption component 516 may decrypt the payload of the initial data packet 562. At operation 622, the decrypted payload of the initial data packet 562 may be stored, and may be provided to a higher layer (e.g., receiver buffer, CODEC, etc.). In some aspects, the sink device 502 may transmit a feedback message 582 that indicates an ACK.

If the error correction component 520 does enable the operational mode 526, the error correction component 520 may determine the first nonce for the initial data packet 562 or determine whether encryption is disabled for the initial data packet 562, according to operation 606. At operation 608, when the initial data packet 562 is encrypted, the error correction component 520 optionally may decrypt 522 the payload of the initial data packet 562. At operation 610, the error correction component 520 may determine whether the initial data packet 562 is an initial data packet or whether the initial data packet 562 is a retransmission data packet of a set of retransmission data packets 564.

When the initial data packet 562 is not a retransmission of another data packet, the error correction component 520 may store the initial payload of the initial data packet 562 (e.g., in a buffer), as shown at operation 612. At operation 614, the error correction component 520 optionally may encrypt 524 the initial payload of the initial data packet 562 (e.g., if the payload of the initial data packet 562 is decrypted, according to operation 608).

The initial data packet 562 may be validated with the decoding check. At operation 616, the CRC checking component 514 may process the CRC corresponding to the payload of the initial data packet 562. If the CRC checking component 514 validates the CRC value of the initial data packet 562, then the decryption component 516 may validate a MIC value of the initial data packet 562 (if a MIC value is included). If the decryption component 516 validates the MIC value of the initial data packet 562, then At operation 620, when the initial data packet 562 passes the decoding checking, the decryption component 516 may decrypt the payload of the initial data packet 562. At operation 622, the decrypted payload of the initial data packet 562 may be stored, and may be provided to a higher layer (e.g., receiver buffer, CODEC, etc.).

If the initial data packet 562 fails the decoding checking (e.g., CRC validation or MIC validation), then a first retransmission data packet of the set of retransmission data packets 564 may be received (e.g., the sink device may transmit a feedback message 582 indicating a NACK to solicit at least one of the set of retransmission data packets 564). Returning to operation 602, the dewhitening component 512 may dewhiten the first retransmission data packet. If the operational mode 526 is not enabled, then the first retransmission data packet may validated with the decoding check.

At operation 640, the CRC checking component 514 may process the payload of the first retransmission data packet to generate a CRC value and determine whether the included CRC value of the first retransmission data packet matches the generated CRC value. At operation 642, the decryption component 516 may process the MIC of the first retransmission data packet to generate a MIC value and determine whether the included MIC value of the first retransmission data packet matches the generated MIC value.

If both the generated CRC value and the generated MIC value match the CRC value and the MIC value, respectively, included in the first retransmission data packet, then the first retransmission data packet may pass the decoding check. The sink device 502 may transmit a feedback message 582 indicating an ACK. At operation 620, the decryption component 516 may decrypt the first retransmission data packet (if encrypted). At operation 622, the payload of the first retransmission data packet may be stored (e.g., to be provided to the higher layer).

If either the generated CRC value or the generated MIC value does not match the CRC value or the MIC value, respectively, included in the first retransmission data packet, then the first retransmission data packet may fail the decoding check. The sink device 502 may transmit a feedback message 582 indicating a NACK. The sink device 502 may receive a second retransmission data packet of the set of retransmission data packets 564.

Returning to operation 604 with the first retransmission data packet, when the operational mode 526 is enabled, the error correction component 520 may determine whether a respective nonce agreed upon for the first retransmission data packet matches the first nonce agreed upon for the initial data packet 562, or may determine whether first retransmission data packet is encrypted. When the first nonce does not match the respective nonce, then the error correction component 520 optionally may decrypt 522 the payload of the first retransmission data packet, according to operation 608. When the first nonce matches the respective nonce or encryption is disabled, then the error correction component 520 may determine which transmission/retransmission sequentially corresponds with the first retransmission data packet, as shown at operation 610.

Because the first retransmission data packet is the first of the set of retransmission data packets 564, the error correction component may apply the selected operational mode 526, which may be one of the soft-combining mode, the QBm mode, or the QBm-H mode. Accordingly, at operation 624, the error correction component 520 may generate and store the corrected payload (e.g., a set of estimated bit values) and, if applicable, MIC value. Further to operation 624, the error correction component 520 may generate and store a set of bit error quality metrics based on the application of the selected operational mode 526.

At operation 626, the error correction component 520 may encrypt 524 the payload of the first retransmission data packet if the payload of the first retransmission data packet is decrypted according to operation 608. At operation 628, the CRC checking component 514 may process the payload of the first retransmission data packet to generate a CRC value and determine whether the included CRC value of the first retransmission data packet matches the generated CRC value. At operation 630, if encryption is enabled, the decryption component 516 may process the MIC of the first retransmission data packet to generate a MIC value and determine whether the included MIC value of the first retransmission data packet matches the generated MIC value.

If both the generated CRC value and the generated MIC value match the CRC value and the MIC value, respectively, included in the first retransmission data packet, then the first retransmission data packet may pass the decoding check. The sink device 502 may transmit a feedback message 582 indicating an ACK. At operation 620, the decryption component 516 may decrypt the first transmission data packet (if encrypted). At operation 622, the payload of the first retransmission data packet may be stored (e.g., to be provided to the higher layer).

If either the generated CRC value or the generated MIC value does not match the CRC value or the MIC value, respectively, included in the first retransmission data packet, then the first retransmission data packet may fail the decoding check. The sink device 502 may transmit a feedback message 582 indicating a NACK. The sink device 502 may receive a second retransmission data packet of the set of retransmission data packets 564.

The sink device 502 may receive the second retransmission data packet and, as shown at operation 602, the dewhitening component 512 may dewhiten the second retransmission data packet. At operation 604, if the operational mode 526 is disabled, then the second retransmission data packet may be processed for the decoding check, as described herein with respect to operation 640 and operation 642.

Returning to operation 604 with the second retransmission data packet, when the operational mode 526 is enabled, the error correction component 520 may determine whether a respective nonce agreed upon for the second retransmission data packet matches the first nonce agreed upon for the initial data packet 562, or may determine whether second retransmission data packet is encrypted. When the first nonce does not match the respective nonce, then the error correction component 520 optionally may decrypt 522 the payload of the second retransmission data packet, according to operation 608. When the first nonce matches the respective nonce or encryption is disabled, then the error correction component 520 may determine which transmission/retransmission sequentially corresponds with the second retransmission data packet, as shown at operation 610.

Because the second retransmission data packet is the second of the set of retransmission data packets 564, the error correction component may apply the selected operational mode 526, which may be one of the soft-combining mode, the QBm mode, or the QBm-H mode. Accordingly, at operation 632, the error correction component 520 may generate and store the corrected payload and, if applicable, MIC value with the second retransmission data packet. For example, the error correction component 520 may generate a set of estimated bit values based on the initial data packet 562 and the set of retransmission data packets 564, as described herein.

The set of estimated bit values may include bits estimated to be correct for the PDU data of the initial data packet 562 and, therefore, the set of estimated bit values may include each bit estimated to be correct for the payload and, if applicable, each bit estimated to be correct for the MIC value of the most recently received of the set of retransmission data packets 564 (because the MIC value may be validated according to the most recently received of the set of retransmission data packets 564). Further to operation 632, the error correction component 520 may generate and store a set of bit error quality metrics based on the application of the selected operational mode 526 with the second retransmission data packet.

At operation 634, the error correction component 520 may encrypt 524 the corrected payload (e.g., the set of estimated bit values) generated by the error correction component 520 if the payload of the second retransmission data packet is decrypted according to operation 608. At operation 636, the CRC checking component 514 may process the corrected payload (e.g., the set of estimated bit values). The error correction component 520 may provide a data packet that includes the set of estimated bit values to the CRC checking component 514, and the CRC checking component 514 may generate a CRC value and determine whether the included CRC value of the most recently received of the set of retransmission data packets 564 (e.g., the second retransmission data packet) matches the generated CRC value. At operation 638, if encryption is enabled, the decryption component 516 may process the MIC of the second retransmission data packet to generate a MIC value and determine whether the included MIC value of the most recently received of the set of retransmission data packets 564 (e.g., the second retransmission data packet) matches the generated MIC value.

If both the generated CRC value and the generated MIC value match the CRC value and the MIC value, respectively, included in most recently received of the set of retransmission data packets 564 (e.g., the second retransmission data packet), then the set of estimated bit values may pass the decoding check. The sink device 502 may transmit a feedback message 582 indicating an ACK. At operation 620, the decryption component 516 may decrypt the set of estimated bit values (if encrypted). At operation 622, the set of estimated bit values may be stored (e.g., to be provided to the higher layer).

As illustrated in the method 600, a subset of the operations, including one or more of operations 602, 604, 606, 608, 610, 620, 622, 632, 634, 636, 638, may be performed when the set of retransmission data packets 564 includes more than two retransmission data packets. Thus, the sink device 502 may iterate through the method 600 until either a corrected payload is determined by applying the selected operational mode 526 until the corrected payload passes the decoding check (e.g., CRC validation and, if applicable, MIC validation) or until a threshold number of retransmission data packets is reached and the corrected payload is passed to the higher layer with the set of bit error quality metrics.

Figure 7:
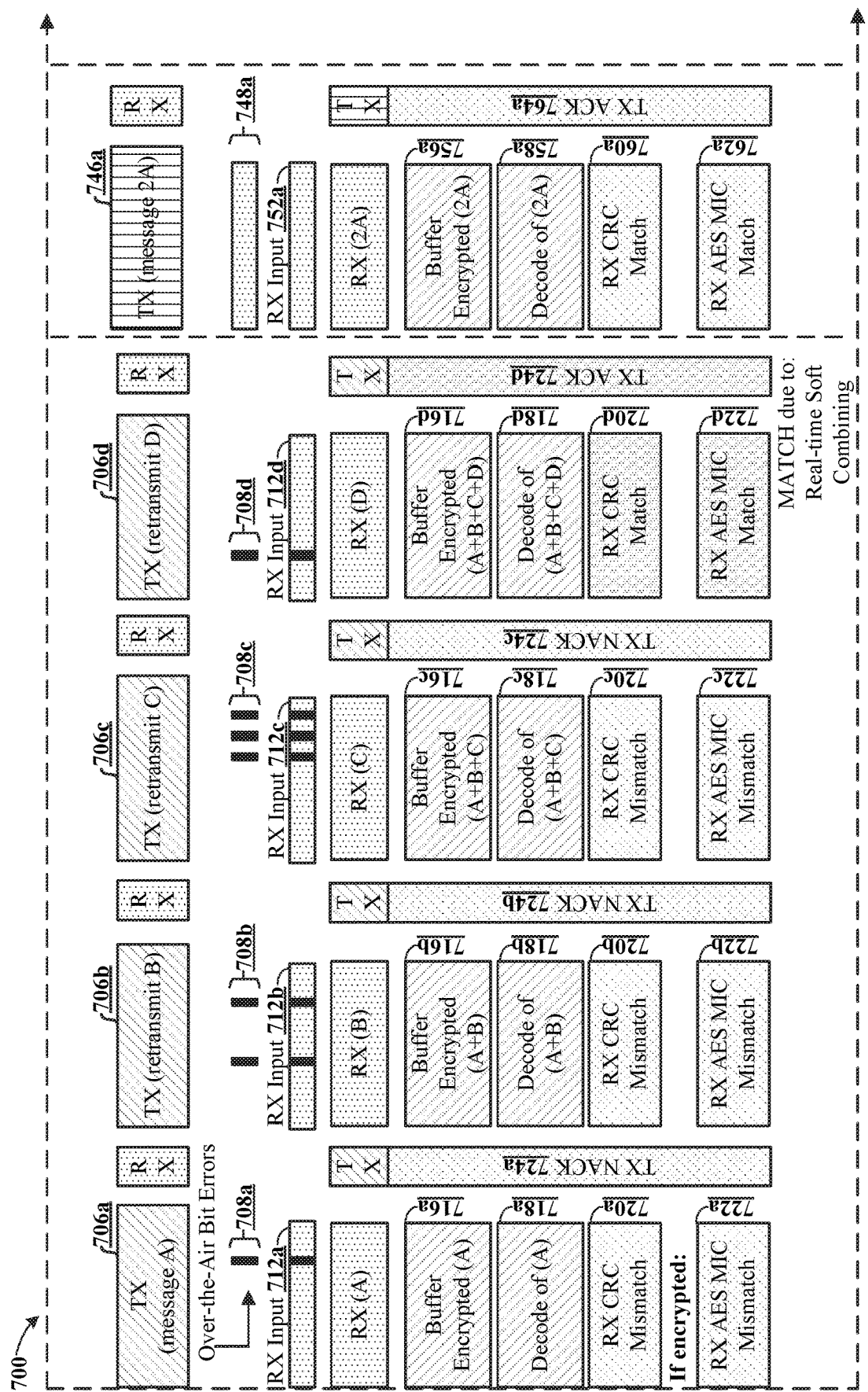
FIG. 7 is a diagram of error correction in a short-range wireless communications system in accordance with certain aspects of the disclosure.

FIG. 7 illustrates an aspect of the soft-combining operational mode 700, in accordance with various aspects of the present disclosure. For example, in the context of FIG. 5, the sink device 502 may perform the soft-combining operational mode when the logical link 552 includes an ACL link or an A2DP link. In the context of FIG. 6, the sink device 502 may apply the soft-combining operational mode to generate the corrected payload (e.g., the set of estimated bit values), as described with respect to operations 632, 634, 636, and 638.

When a source device and a sink device establish a logical link that includes an ACL link or an A2DP link and the sink device accordingly selects the soft-combining operational mode, the source device may transmit an initial data packet having a TX message A 706a (that is, the intended set of bits). TX message A 706a may include PDU data and, therefore, TX message A 706a may include payload data and, in some aspects, may include an MIC value.

During transmission of TX message A 706a, one or more bit errors 708a may occur in TX message A 706a, e.g., due to interference or other channel conditions. Thus, the TX message A 706a may be received by the sink device as RX message A 712a, which may include a set of bits having the one or more bit errors 708a.

The sink device may buffer 716a the RX message A 712a in a set of buffers (e.g., in an indexed buffer array). For example, when RX message A 712a is encrypted, the sink device may buffer 716a the RX message A 712a without first decrypting RX message A 712a. In another example, however, the sink device may first decrypt RX message A 712a.

Because the sink device may be applying the soft-combining operational mode, the sink device may buffer 716a each bit of the RX message A 712a as a soft value in a set of buffers. For example, the RX message A 712a may have n bits, and for an index i equal to 0 through n−1 (where the first bit of the PDU data is indexed at 0), bit i of the PDU data of the RX message A 712a may be buffered 716a in buffer index i as a three-bit signed soft value. A 1 bit of the PDU data of the RX message A 712a may be stored as a −1 soft value (e.g., −'3sd1), and a 0 bit of the PDU data of the RX message A 712a may be stored as a 0 soft value (e.g., +'3sd0, and a 0 soft value may be considered a positive signed soft value). The preceding example is provided as an illustration, and different values may be buffered in association with the set of bits comprising the RX message A 712a without departing from the scope of the present disclosure (e.g., bit values may be buffered as unsigned values, the soft values may be greater than or less than three bits, 0 and 1 bit values may be stored as soft values other than −1 and 0, etc.).

The sink device may decode 718a RX message A 712a and, in some aspects, the sink device may decode 718a RX message A 712a in real time while also buffering RX message A 712a. When RX message A 712a is decoded, the sink device may perform a decoding check, which may include at least CRC validation and, if RX message A 712a is encrypted, MIC validation. Accordingly, the sink device may perform CRC validation on RX message A 712a. Due to the one or more bits errors 708a, the sink device may determine that the CRC value generated based on the RX message A 712a does not match the CRC value for TX message A 706a (included in the initial data packet). Therefore, the sink device may determine that the RX message A 712a fails CRC validation 720a.

In addition, the sink device may perform MIC validation on RX message A 712a when RX message A 712a is encrypted. Due to the one or more bits errors 708a, the sink device may determine that the MIC value generated based on the RX message A 712a does not match the MIC value for TX message A 706a (included in the PDU data of the initial data packet). Therefore, the sink device may determine that the RX message A 712a fails MIC validation 722a.

When the RX message A 712a fails the decoding check (e.g., fails CRC validation 720a and, if encrypted, fails MIC validation 722a), then the sink device may transmit a NACK message 724a to the source device. Responsive to the NACK message 724a, the source device may transmit a TX message B 706b.

The TX message B 706b may be a retransmission of the TX message A 706a and, therefore, may include a duplicate of at least the payload data of the PDU data of the TX message A 706a. During transmission of TX message B 706b, one or more bit errors 708b may occur in TX message B 706b. Thus, the TX message B 706b may be received by the sink device as RX message B 712b, which may include a set of bits having the one or more bit errors 708b.

Because the sink device may be applying the soft-combining, the sink device may buffer 716b soft values corresponding to the RX message A 712a and the RX message B 712b. In aspects, each of the set of soft values buffered 716a in association with the RX message A 712a may be accumulated with a value (e.g., a signed value) that is based on a corresponding bit of PDU data of the RX message B 712b. For example, the three-bit signed soft value in a buffer index i that may be buffered 716a for the RX message A 712a may be accumulated with (e.g., added to) a signed value that is based on bit i of the PDU data of the RX message B 712b. By way of illustration, a 1 bit value at index i of the PDU data of the RX message B 712b may be accumulated as a −1 signed value (e.g., −'3sd1) with the three-bit signed soft value in buffered 716a at index i. A 0 bit value at index i of the PDU data of the RX message B 712b may be accumulated as a +1 soft value (+'3sd1) with the three-bit signed soft value in buffered 716a at index i.

Accordingly, the sink device buffers 716b the soft-combined PDU data of the RX messages A, B 712a, 712b as values based on the bits of the PDU data of the RX message B 712b accumulated with the corresponding soft values buffered 716a based on the PDU data of the RX message A 712a. The sink device may estimate the PDU data of the TX message B 706b, which may include the same payload as the TX message A 706a, based on these soft values accumulated in the set of buffers. To do so, the sink device may "hard slice" (e.g., map) each soft value at index i to a one bit value estimated to be the bit value of the TX message B 706b at index i.

For example, the sink device may map a three-bit signed soft value at index i that is greater than or equal to 0 (3'sd0) to a bit value of 0 at the index i. When a three-bit signed soft value at index i is less than 0 (3'sd0), then the sink device may map a bit value of 1 at the index i. The preceding example is provided as an illustration and, therefore, a different mapping may be used for the hard slice without departing from the scope of the present disclosure. For example, the mapping between soft values accumulated based on RX messages and estimated bit values of a TX message may depend upon the soft values respectively assigned to a 1 bit value and a 0 bit value of an initial RX message (e.g., RX message A 712a). In another example, the mapping between soft values accumulated based on RX messages and estimated bit values of a TX message may depend upon the how soft values are accumulated based on bit values of retransmission messages (e.g., RX message B 712b).

From the hard slice, the sink device may obtain an estimation of the PDU data (e.g., payload and, if applicable, MIC value) of the TX message B 706b. That is, because each bit value derived from the hard slice at index i may be estimated to be the bit value of the TX message B 706b at index i, the sink device may obtain a set of estimated bit values that represents the PDU data of the TX message B 706b. Thus, the sink device may decode 718b the set of estimated bit values that represents the PDU data of the TX message B 706b, which may include the hard slice of accumulated soft values buffered 716b for the RX messages A, B 712a, 712b.

With the set of estimated bit values decoded to represent the PDU data of the TX message B 706b, the sink device may perform the decoding check on the set of estimated bit values. First, the sink device may perform CRC validation 720b on the set of estimated bit values that represents the PDU data of the TX message B 706b. For example, the sink device may generate a CRC value based on the set of estimated bit values that represents the PDU data of the TX message B 706b. Because the CRC value may change between each transmitted message, the generated CRC value should match the CRC value associated with the most recently received RX message—here, RX message B 712b. Thus, the sink device may compare the generated CRC value with a CRC value associated with the RX message B 712b.

If the generated CRC value matches the CRC value associated with the RX message B 712b, then the set of estimated bit values that represents the PDU data of the TX message B 706b may successfully pass the CRC validation 720b of the decoding check. However, the CRC validation 720b of the set of estimated bit values that represents the PDU data of the TX message B 706b may be unsuccessful because the application of the soft-combining operational mode may still yield one or more bit errors.

In addition, the sink device may perform MIC validation 722b on the set of estimated bit values that represents the PDU data of the TX message B 706b for the decoding check. For example, the sink device may generate a MIC value based on the set of estimated bit values that represents the PDU data of the TX message B 706b. Because the MIC value may change between each transmitted message, the generated MIC value should match the MIC value associated with the most recently received RX message—here, RX message B 712b. Thus, the sink device may compare the generated MIC value with a MIC value associated with the RX message B 712b.

If the generated MIC value matches the MIC value associated with the RX message B 712b, then the set of estimated bit values that represents the PDU data of the TX message B 706b may successfully pass the MIC validation 722b of the decoding check. However, the MIC validation 722b of the set of estimated bit values that represents the PDU data of the TX message B 706b may be unsuccessful because the application of the soft-combining operational mode may still yield one or more bit errors.

Because the set of estimated bit values that represents the PDU data of the TX message B 706b may fail the decoding check, the sink device may transmit a NACK message 724b to the source device. Accordingly, the source device may transmit a TX message C 706c.

The TX message C 706c may be a retransmission of the TX message A 706a and, therefore, may include a duplicate of at least the payload data of the PDU data of the TX message A 706a. During transmission of TX message C 706c, one or more bit errors 708c may occur in TX message C 706c. Thus, the TX message C 706c may be received by the sink device as RX message C 712c, which may include a set of bits having the one or more bit errors 708c.

Because the sink device may be applying the soft-combining, the sink device may buffer 716c soft values corresponding to the RX messages A, B, C 712a, 712b, 712c. In aspects, each of the set of soft values buffered 716b in association with the RX messages A, B 712a, 712b may be accumulated with a value (e.g., a signed value) that is based on a corresponding bit of PDU data of the RX message C 712c. For example, the three-bit signed soft value in a buffer index i that may be buffered 716b based on a bit at index i of the RX message A 712a and a bit at index i of the RX message B 712b may be accumulated with a signed value that is based on bit i of the PDU data of the RX message C 712c. By way of illustration, a 1 bit value at index i of the PDU data of the RX message C 712c may be accumulated as a −1 signed value (e.g., −'3sd1) with the three-bit signed soft value in buffered 716b at index i. A 0 bit value at index i of the PDU data of the RX message C 712c may be accumulated as a +1 soft value (+3'sd1) with the three-bit signed soft value in buffered 716b at index i.

In some aspects, the sink device may be configured so that each of the set of buffers may be saturated at a minimum value and at a maximum value, which may prevent buffer underflow or overflow. For example, each buffer at index i may be saturated to a maximum value of +3 (+3'sd3) and saturated to a minimum value of −4 (−3'sd4). Accordingly, buffer index i may not exceed the minimum or maximum values, and an additional bit i from additional PDU data of the RX message C 712c may cause the soft value in buffer index i to remain at the saturated minimum value, when the value to be accumulated is a −1 soft value, or the saturated maximum value, when the value to be accumulated is a +1 soft value.

In real time, then, the sink device buffers 716c the soft-combined PDU data of the RX messages A, B, C 712a, 712b, 712c as soft values respectively based on the bits of the PDU data of the RX message C 712c accumulated with the corresponding soft values buffered 716b based on the PDU data of the RX messages A, B 712a, 712b. The sink device may estimate the PDU data of the TX message C 706c based on these soft values accumulated in the set of buffers.

Thus, the sink device may again "hard slice" (e.g., map) each soft value at index i to a one bit value estimated to be the bit value of the TX message C 706c at index i. For example, the sink device may map a three-bit signed soft value at index i that is greater than or equal to 0 (3'sd0) to a bit value of 0 at the index i. When a three-bit signed soft value at index i is less than 0 (3'sd0), then the sink device may map a bit value of 1 at the index i.

From this hard slice, the sink device may obtain a second estimation of the PDU data (e.g., payload and, if applicable, MIC value) of the TX message C 706c. That is, because each bit value derived from the hard slice at index i may be estimated to be the bit value of the TX message C 706c at index i, the sink device may obtain a second set of estimated bit values that represents the PDU data of the TX message C 706c. Thus, the sink device may decode 718c the second set of estimated bit values that represents the PDU data of the TX message C 706c, which may include the hard slice of accumulated soft values buffered 716c for the RX messages A, B, C 712a, 712b, 712c.

With the second set of estimated bit values decoded to represent the PDU data of the TX message C 706c, the sink device may perform the decoding check on the second set of estimated bit values. First, the sink device may perform CRC validation 720c on the second set of estimated bit values that represents the PDU data of the TX message C 706c. For example, the sink device may generate a CRC value based on the second set of estimated bit values that represents the PDU data of the TX message C 706c. The sink device may compare the generated CRC value with a CRC value associated with the RX message C 712c.

If the generated CRC value matches the CRC value associated with the RX message C 712c, then the set of estimated bit values that represents the PDU data of the TX message C 706c may successfully pass the CRC validation 720c of the decoding check. However, the CRC validation 720c of the second set of estimated bit values that represents the PDU data of the TX message C 706c may be unsuccessful because the application of the soft-combining operational mode may still yield one or more bit errors.

In addition, the sink device may perform MIC validation 722c on the second set of estimated bit values that represents the PDU data of the TX message C 706c for the decoding check. For example, the sink device may generate a MIC value based on the second set of estimated bit values that represents the PDU data of the TX message C 706c. The sink device may compare the generated MIC value with a MIC value associated with the RX message C 712c.

If the generated MIC value matches the MIC value associated with the RX message C 712c, then the second set of estimated bit values that represents the PDU data of the TX message C 706c may successfully pass the MIC validation 722c of the decoding check. However, the MIC validation 722c of the second set of estimated bit values that represents the PDU data of the TX message C 706c may be unsuccessful because the application of the soft-combining operational mode may still yield one or more bit errors.

Because the second set of estimated bit values that represents the PDU data of the TX message C 706c may again fail the decoding check, the sink device may transmit a NACK message 724c to the source device. Accordingly, the source device may transmit a TX message D 706d. The TX message D 706d may be a retransmission of the TX message A 706a and, therefore, may include a duplicate of at least the payload data of the PDU data of the TX message A 706a.

During transmission of TX message D 706d, one or more bit errors 708d may occur in TX message D 706d. Thus, the TX message D 706d may be received by the sink device as RX message D 712d, which may include a set of bits having the one or more bit errors 708d.

Similar to the preceding RX messages A, B, C, 712a, 712b, 712c, the sink device may buffer 716d soft values corresponding to the RX messages A, B, C, D 712a, 712b, 712c, 712d. In aspects, each of the set of soft values buffered 716c in association with the RX messages A, B, C 712a, 712b, 712c may be accumulated with a value (e.g., a signed value) that is based on a corresponding bit of PDU data of the RX message D 712d. For example, the three-bit signed soft value in a buffer index i that may be buffered 716c based on respective bits at respective indices i of the RX messages A, B, C 712a, 712b, 712c may be accumulated with a signed value that is based on the bit value at index i of the PDU data of the RX message D 712d.

By way of illustration, a 1 bit value at index i of the PDU data of the RX message D 712d may be accumulated as a −1 signed value (e.g., −'3sd1) with the three-bit signed soft value buffered 716c at index i. A 0 bit value at index i of the PDU data of the RX message D 712d may be accumulated as a +1 soft value (+3'sd1) with the three-bit signed soft value buffered 716c at index i.

In some aspects, the sink device may be configured so that a buffer at index i may be saturated at a minimum value and at a maximum value (e.g., saturated to a maximum value of +3 (+3'sd3) and saturated to a minimum value of −4 (−3'sd4)). Accordingly, an additional bit i from additional PDU data of the RX message D 712d may cause the soft value in buffer index i to remain at the saturated minimum value or the saturated maximum value, depending upon the soft value to be accumulated based on the PDU data RX message D 712d.

Accordingly, the sink device buffers 716d the soft-combined PDU data of the RX messages A, B, C, D 712a, 712b, 712c, 712d as soft values respectively based on the bits of the PDU data of the RX message D 712d accumulated with the corresponding soft values buffered 716c based on the PDU data of the RX messages A, B, C 712a, 712b, 712c. The sink device may estimate the PDU data of the TX message D 706d based on these soft values accumulated in the set of buffers.

In real time, the sink device may hard slice each soft value at index i to a one bit value estimated to be the bit value of the TX message D 706d at index i. For example, the sink device may map a three-bit signed soft value at index i that is greater than or equal to 0 (3'sd0) to a bit value of 0 at the index i. When a three-bit signed soft value at index i is less than 0 (3'sd0), then the sink device may map a bit value of 1 at the index i.

From this third hard slice, the sink device may obtain a third estimation of the PDU data (e.g., payload and, if applicable, MIC value) of the TX message D 706d. Thus, because each bit value derived from the hard slice at index i may be estimated to be the bit value of the TX message D 706d at index i, the sink device may obtain a third set of estimated bit values that represents the PDU data of the TX message D 706d. The sink device may decode 718d the third set of estimated bit values that represents the PDU data of the TX message D 706d, which may include the hard slice of accumulated soft values buffered 716d based on the RX messages A, B, C, D 712a, 712b, 712c, 712d.

With the third set of estimated bit values decoded to represent the PDU data of the TX message D 706d, the sink device may perform the decoding check by first performing CRC validation 720d on the third set of estimated bit values that represents the PDU data of the TX message D 706d. For example, the sink device may generate a CRC value based on the third set of estimated bit values that represents the PDU data of the TX message D 706d. The sink device may compare the generated CRC value with a CRC value associated with the RX message D 712d.

If the generated CRC value matches the CRC value associated with the RX message D 712d, then the third set of estimated bit values that represents the PDU data of the TX message D 706d may successfully pass the CRC validation 720d of the decoding check. Here, the CRC validation 720d of the third set of estimated bit values that represents the PDU data of the TX message D 706d may be successful. For example, the bit errors 708a, 708b, 708c, 708d may not occur at the same bit locations and, thus, the soft-combining operational mode may yield a third set of estimated bit values that matches the TX message D 706d after one or more retransmissions (e.g., three retransmissions in the illustrated aspect, although more or fewer retransmissions may yield a set of estimated bit values that successfully passes the decoding check depending upon the number and locations of bit errors).

Further to the decoding check, the sink device may perform MIC validation 722d on the third set of estimated bit values that represents the PDU data of the TX message D 706d. For example, the sink device may generate a MIC value based on the third set of estimated bit values that represents the PDU data of the TX message D 706d. The sink device may compare the generated MIC value with a MIC value associated with the RX message D 712d.

If the generated MIC value matches the MIC value associated with the RX message D 712d, then the third set of estimated bit values that represents the PDU data of the TX message D 706d may successfully pass the MIC validation 722d. Here, the MIC validation 722d of the third set of estimated bit values that represents the PDU data of the TX message D 706d may be successful. For example, from the hard slice, the soft-combining operational mode may yield a third set of estimated bit values that matches the TX message D 706d.

When the CRC validation 720d and the MIC validation 722d are successful, the sink device may transmit an ACK message 724d to the source device. The source device may then cease retransmission of the TX message D 706d, and may proceed to continuing transmissions of further packets.

Responsive to the ACK message 724d, the source device may transmit the next message TX message 2A 746a. In the illustrated aspect, the TX message 2A 746a may not experience sufficient interference or other poor channel conditions to cause bit errors and, therefore, the sink device may receive the RX message 2A 752a with no bit errors 748a sufficient to degrade the message.

Since the sink device may be unaware that no bit errors 748a have substantially degraded the RX message 2A 752a, the sink device may buffer 756a a set of values based on the RX message 2A 752a. For example, the sink device may buffer 756a a set of soft values according to the soft-combining operational mode based on the PDU data of the RX message 2A 752a. Further, the sink device may decode 758a the RX message 2A 752a to perform the decoding check.

Because no bit errors 748a may occur in the RX message 2A 752a sufficient to appreciably degrade the RX message 2A 752a, the RX message 2A 752a may be substantially similar to the TX message 2A 746a so that the decoding check may be successful. Specifically, the sink device may perform CRC validation 760a on the RX message 2A 752a, e.g., by generating a CRC value based on the PDU data of the RX message 2A 752a that matches the CRC value associated with the RX message 2A 752a. If applicable (e.g., if the RX message 2A 752a is encrypted), the sink device may perform MIC validation 762a on the RX message 2A 752a, e.g., by generating a MIC value based on the PDU data (e.g., based on the payload) of the RX message 2A 752a that matches the MIC value associated with the RX message 2A 752a (e.g., indicated in the PDU data following the payload of the RX message 2A 752a).

The error correction techniques described herein may provide an improved approach to error correction in communication systems in which different error correction techniques (e.g., QBm, QBm-H, and/or real-time soft combining) may be differently suited to different types of logical links. As a result of the techniques, data communications over noisy communication mediums may be improved as the techniques may substantially recover from bit error. For data communications involving voice or other streaming audio data, the techniques promote increased audio quality over systems that do not employ the techniques described in the present disclosure.

Figure 8B:
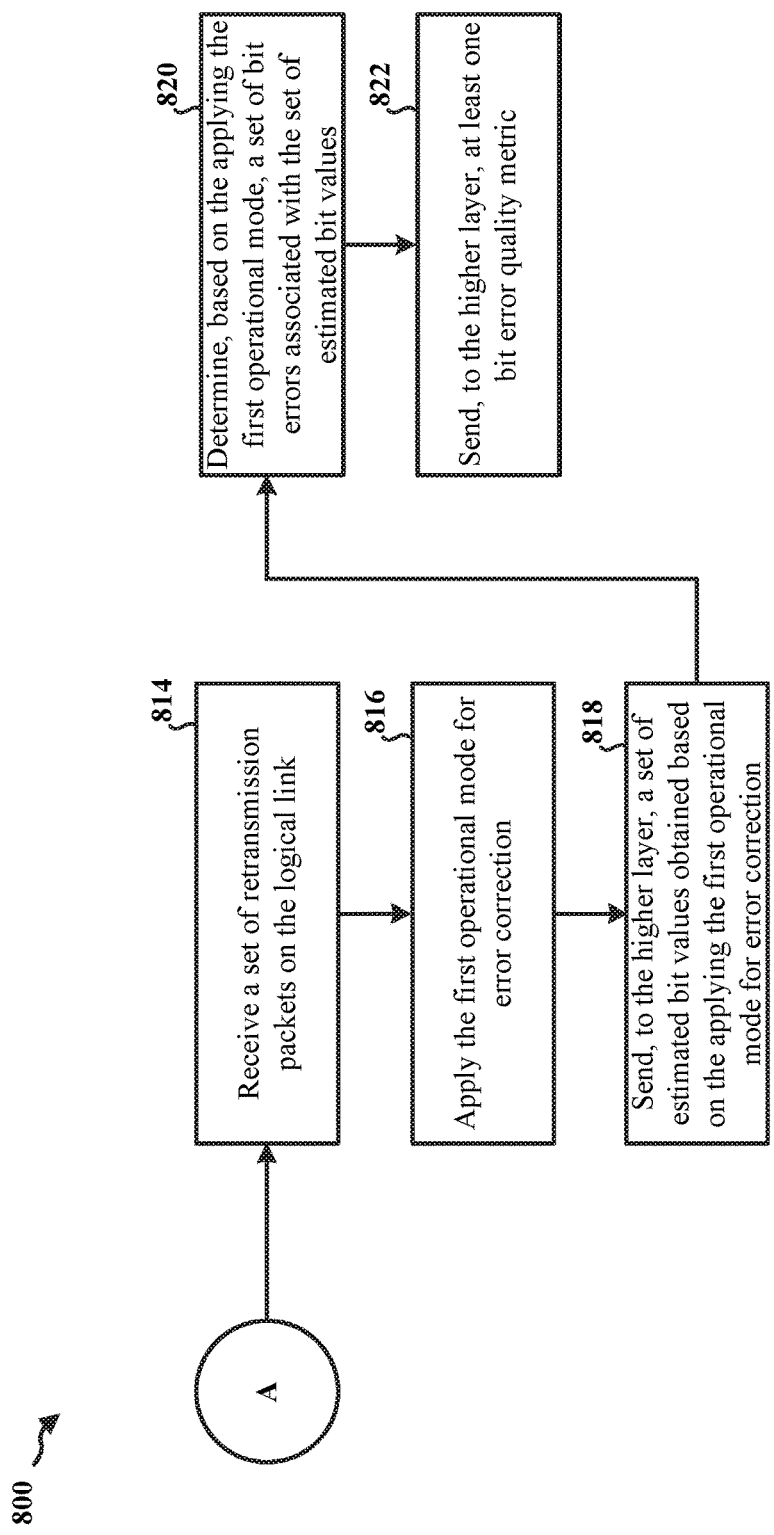

FIGS. 8A and 8B are a flowchart of a method 800 of wireless communication. The method 800 may be performed by a first device (e.g., the wireless device 102, peripheral device 104, 106, 108, 110, 112, 114, wireless device 200, the sink device 502, the apparatus 1302/1302') in communication with a second device (e.g., central wireless device 102, peripheral device 104, 106, 108, 110, 112, 114, wireless device 200, source device 550, second device 1350). In different aspects, one or more illustrated operations may be omitted, transposed, and/or contemporaneously performed.

Referring to FIG. 8A, at operation 802, the first device may establish, with a second device, a logical link associated with short-range communications. For example, the first device and the second device may discover one another, and the first device and the second device may determine a type of communication that is to occur between the first and second devices. The first device and the second device may establish a logical link. The logical link may be one of an ACL link, an AD2P link, an eSCO link, or an ISO link. In some aspects, one of the first device or the second device may send a first packet to the other of the first device or the second device in order to establish the logical link. The first packet may include an access address or header portion that includes an LT_ADDR that is based on the type of the logical link.

For example, referring to FIG. 5, the sink device 502 may receive the first packet 560 (e.g., at the RF interface 510) in association with the establishment of the logical link 552 with the source device 550. The first packet 560 may include at least one of an access address or an LT_ADDR that is associated with the type of logical link 552—that is, associated with one of an ACL link, an A2DP link, an eSCO link, or an ISO link.

At operation 804, the first device may determine a type of the logical link. For example, the first device may receive the first packet from the second device, and the first device may detect an address portion of the packet. From the address portion, the first device may identify one of an access address or an LT_ADDR. For example, the first device may detect an access address following a preamble and before a PDU of a BLE packet or the first device may detect an LT_ADDR in a header portion of a BT packet. Based on the identified access address or LT_ADDR, the first device may determine the type of the logical link.

For example, referring to FIG. 5, the sink device 502 may receive the first packet 560 (e.g., at the RF interface 510) in association with the logical link 552 with the source device 550. The first packet 560 may include at least one of an access address or an LT_ADDR that is associated with the type of logical link 552—that is, associated with one of an ACL link, an A2DP link, an eSCO link, or an ISO link. Based on the identified access address or LT_ADDR included in the header portion of the first packet 560, the sink device 502 (e.g., the error correction component 520) may determine the type of the logical link 552.

At operation 806, the first device may select, based on the logical link, a first operational mode from a plurality of operational modes for error correction. For example, the first device may identify an association between each operational mode and each type of logical link, and the first device may select a first operational mode from a plurality of operational modes that is identified to be associated with the determined type of logical link. In one aspect, the first device may select a soft-combining operational mode based on a logical link that includes an ACL link or an A2DP link. In another aspect, the first device may select a QBm operational mode based on a logical link that includes an eSCO link. In another aspect, the first device may select a QBm-H operational mode based on a logical link that includes an ISO link.

For example, referring to FIG. 5, the sink device 502 (e.g., the error correction component 520) may select the operational mode 526 from a plurality of operational modes based on the logical link 552.

At operation 808, the first device may receive a first packet carried on the logical link. For example, the first device may receive a first packet from the second device, and the first packet may include data in a payload (e.g., audio data, video data, etc.). For example, referring to FIG. 5, the sink device 502 may receive the initial data packet 562 (e.g., at the RF interface 510) from the source device 550 over the logical link 552.

At operation 810, the first device may perform a decoding check to determine whether first PDU data included in the first packet passes the decoding check (e.g., the decoding check is successful) or fails the decoding check (e.g., the decoding check is unsuccessful). For example, the first device may perform CRC validation on the first PDU data included in the first packet. If the first packet is encrypted, the first device may perform MIC validation on the first PDU data included in the first packet. The first device may then determine that the first packet passes the decoding check when the CRC validation is successful and, if applicable, the MIC validation is successful. The first device may then determine that the first packet fails the decoding check when the CRC validation is unsuccessful or, if applicable, the MIC validation is unsuccessful. An aspect of the decoding check is illustrated with respect to FIG. 9.

For example, referring to FIG. 5, the sink device 502 (e.g., the CRC checking component 514 and, if applicable, the decryption component 516) may perform a decoding check on the first PDU data included in the initial data packet 562. If the CRC checking component 514 validates a CRC value associated with the first PDU data included in the initial data packet 562 and, if applicable, the decryption component 516 validates a MIC value associated with the first PDU data included in the initial data packet 562, then the initial data packet 562 may successfully pass the decoding check. If the CRC checking component 514 does not validate a CRC value associated with the first PDU data included in the initial data packet 562 or, if applicable, the decryption component 516 does not validate a MIC value associated with the first PDU data included in the initial data packet 562, then the initial data packet 562 may fail the decoding check and the decoding check for the initial data packet 562 may be unsuccessful.

If the decoding check is successful, the first device may sent at least a portion of the first PDU data included in the first packet to a higher layer, as shown at operation 812. For example, the first device may extract a payload from the first packet, and the payload may be provided to a CODEC. The CODEC may cause the payload to be output by the first device, e.g., as audio, as video, etc.

For example, referring to FIG. 5, if the CRC checking component 514 validates a CRC value associated with the first PDU data included in the initial data packet 562 and, if applicable, the decryption component 516 validates a MIC value associated with the first PDU data included in the initial data packet 562, then a payload of initial data packet 562 may be provided to a higher layer of the sink device 502 (e.g., a CODEC). The sink device 502 may then output the payload, e.g., as audio, as video, etc.

Referring to FIG. 8B, if the decoding check is unsuccessful, the first device may receive a set of retransmission packets on the logical link. Specifically, the first device may transmit a NACK message to the second device based on the unsuccessful decoding check for the first packet. Based on the NACK message, the first device may receive a first retransmission packet of the set of retransmission packets from the second device on the logical link.

For example, referring to FIG. 5, the sink device 502 may receive a first retransmission data packet of the set of retransmission data packets 564 (e.g., at the RF interface 510). In some aspects, the sink device 502 may transmit a feedback message 582 indicating a NACK when the initial data packet 562 fails the CRC validation by the CRC checking component 514 or when the initial data packet 562 fails the MIC validation by the decryption component 516.

At operation 816, the first device may apply the first operational mode for error correction based on first PDU data of the first packet and respective PDU data included in each of the set of retransmission packets. For example, the first device may buffer a first set of bits based on the first PDU data of the first packet. Further, the first device may buffer at least one other set of bits based on the respective PDU data included in each of the set of retransmission packets (e.g., based on the first retransmission PDU data included in the first retransmission packet when only the first retransmission packet of the set of retransmission packets has been received).

In aspects, the first device may determine the first operational mode from the plurality of operational modes based on the logical link when the first PDU data included in the first packet fails the decoding check—e.g., the first operational mode may be selected when the type of logical link is determined (e.g., as described with respect to operation 804 and operation 806). In one aspect, the first device may determine that the first operational mode is the soft-combining operational mode when the type of the logical link includes one of an ACL link or an A2DP link. In another aspect, the first device may determine that the first operational mode is the QBm operational mode when the type of the logical link includes an eSCO link. In another aspect, the first device may determine that the first operational mode is the QBm-H operational mode when the type of the logical link includes an ISO link. The first device may apply one of the soft-combining operational mode, the QBm operational mode, or the QBm-H operational mode based on at least one set of bits buffered based on the first PDU data included in the first packet and the respective PDU data included in each of the set of retransmission packets.

For example, referring to FIG. 5, the sink device 502 (e.g., the error correction component 520) may determine the operational mode 526 for error correction based on the logical link 552. The sink device 502 (e.g., the error correction component 520) may apply the operational mode 526 for error correction based on the first PDU data included in the initial data packet 562 and based on the respective PDU data included in each of the set of retransmission data packets 564.

According to some aspects, when the first packet is associated with a first nonce for decryption that matches a respective nonce for decryption of each of the set of retransmission packets and when the first operational mode for error correction includes the soft-combining operational mode, then the first operational mode for error correction (including the soft-combining operational mode) may be applied based on the first PDU data of the first packet that includes first payload data and a first MIC value and further based on the respective PDU data of each of the set of retransmission packets that includes respective payload data and a respective MIC value. In one such aspect, the first PDU data of the first packet and the respective PDU data of each of the set of retransmission packets may be decrypted when the first operational mode for error correction is applied.

According to some other aspects, when the first packet is associated with a first nonce for decryption that is different from a respective nonce for decryption of at least one of the set of retransmission packets and when the first operational mode for error correction includes the soft-combining operational mode, then the first operational mode for error correction (including the soft-combining operational mode) may be applied based on the first payload data included in the first PDU data of the first packet and further based on respective payload data included in the respective PDU data of each of the set of retransmission packets. In one such aspect, when the first PDU data of the first packet may include a first MIC value and when the respective PDU data of each of the set of retransmission packets includes a respective MIC value, then the first operational mode for error correction may be applied without the first MIC value and without each of the respective MIC values (e.g., the bits corresponding to the MIC values may be omitted from application of the first operational mode for error correction). In another such aspect, the first PDU data of the first packet and the respective PDU data of each of the set of retransmission packets may be decrypted when the first operational mode for error correction is applied.

In various aspects, the first device may perform a decoding check (e.g., similar to the decoding check described with respect to operation 810) for each retransmission packet of the set of retransmission packets. When a retransmission packet of the set of retransmission packets successfully passes the decoding check, then the first device may provide respective PDU data (e.g., a payload) of that retransmission packet to the higher layer of the first device (e.g., as described with respect to operation 812), and the first device may transmit an ACK message to the second device. Further, when that retransmission packet of the set of retransmission packets successfully passes the decoding check, then the first device may refrain from applying or continuing to apply the selected operational mode for error correction, e.g., because error correction may be unnecessary when a retransmission packet successfully passes the decoding check.

At operation 818, the first device may send, to the higher layer, a set of estimated bit values obtained based on the applying the first operational mode for error correction. For example, the first device may calculate a set of estimated bit values based on the applying the first operational mode for error correction. In various aspect, the set of estimated bit values may be estimated to include PDU data of a most recently received retransmission packet (the payload of which may be the same as the payload of the first packet). The first device may then provide the set of estimated bit values to at least one higher layer of the first device, such as a CODEC. The first device may then cause data to be output based on the set of estimated bit values—e.g., the first device may output audio and/or video based on the set of estimated bit values.

For example, referring to FIG. 5, the sink device 502 (e.g., the error correction component 520) may calculate a set of estimated bit values based on the application of the operational mode 526. The set of estimated bit values may be estimated to include respective PDU data of a most recently received retransmission data packet of the set of retransmission data packets 564 (e.g., the respective PDU data may include a payload that matches the payload of the initial data packet 562).

In various aspects, the first device may perform a decoding check (e.g., similar to the decoding check described with respect to operation 810) for the set of estimated bit values. For example, the set of estimated bit values may be provided as PDU data (e.g., a payload and, if applicable, a MIC value) for CRC validation and, if applicable, MIC validation. When the set of estimated bit values successfully passes the decoding check (e.g., as described with respect to operation 812), then the first device may provide the set of estimated bit values to the higher layer as PDU data (e.g., a payload) intended to be included in the first packet and each of the set of retransmission packets to the higher layer of the first device. Further, the first device may transmit an ACK message to the second device in association with a most recently received one of the set of retransmission packets. When the set of estimated bit values fails the decoding check (e.g., as described with respect to operation 812), then the first device may transmit a NACK message to the second device in association with a most recently received one of the set of retransmission packets. In some aspect, the first device may then receive another retransmission packet of the set of retransmission packets based on the NACK message, and the first device may continue applying the first operational mode for error correction with the other retransmission packet added to the set of retransmission packets.

At operation 820, the first device may determine, based on the applying the first operational mode for error correction, a set of bit errors associated with the set of estimated bit values. For example, the first device may identify one or more bits that correspond across the first PDU data of the first packet and the respective PDU data of each of the set of retransmission packets that are different across at least two of the first PDU data of the first packet and each of the respective PDU data of each of the set of retransmission packets. In other words, the first device may determine a bit value at index i that is different between the PDU data of the first packet and the respective PDU data of at least one of the set of retransmission packets or is different between respective PDU data of at least two of the set of retransmission packets. The first device may then calculate a number of the one or more bits and/or may detect a location of the one or more bits (e.g., an respective index of each of the one or more bits).

For example, referring to FIG. 5, the sink device 502 (e.g., the error correction component 520) may determine, based on the application of the operational mode 526 for error correction, a set of bit errors associated with the set of estimated bit values. The set of bit errors may include a number and/or location(s) of one or more bits that are different across at least two of the first PDU data of the initial data packet 562 and each of the respective PDU data of each of the set of retransmission data packets 564.

At operation 822, the first device may sent, to the higher layer, at least one bit error quality metric indicating at least one of a set of locations of the set of bit errors or a number of the set of bit errors. For example, the first device may generate a message indicating the at least one bit error quality metric, and the first device may provide the generated message to a higher layer of the first device (e.g., a CODEC). The first device may then cause data to be output based on the at least one bit error quality metric. For example, the first device may attempt to correct the one or more bit errors based on the at least one bit error quality metric. The first device may output audio and/or video, e.g., if the correction is successful. If the correction is unsuccessful or if the first device does not correct the bit errors, then the first device may output data (e.g., audio and/or video) that conceals or drops data that was otherwise to be output (e.g., data estimated to be contained in the payload of the first packet).

For example, referring to FIG. 5, the sink device 502 (e.g., the error correction component 520) may send, to a higher layer of the sink device (e.g., a CODEC), at least one bit error quality metric. The at least one bit error quality metric may indicate a number and/or location(s) of one or more bit errors identified by the error correction component 520.

Figure 9:
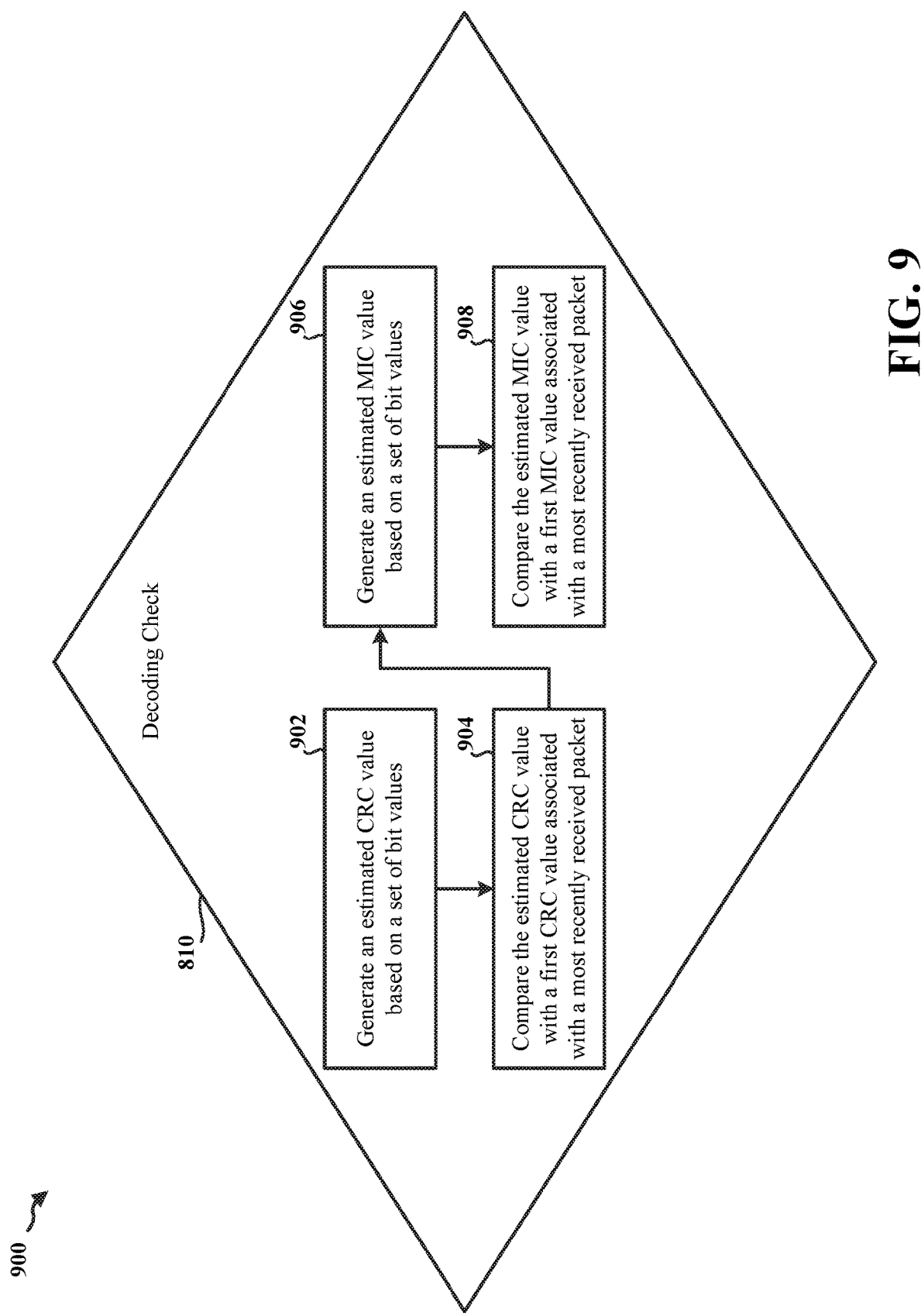
FIG. 9 is a flowchart of a method of performing a decoding check in a short-range wireless communications system in accordance with certain aspects of the disclosure.

With reference to FIG. 9, a flowchart illustrates a method 900 of the decoding check described with respect to operation 810 of the method 800. Beginning with operation 902, the first device may generate an estimated CRC value based on the set of bit values. For example, the first device may generate an estimated CRC value based on first PDU data (e.g., a payload and, if applicable, a MIC value) of the first packet. The first device may identify a set of bit values corresponding to the first PDU data of the first packet, and the first device may calculate the estimated CRC value based on the identified set of bits. In another example, the first device may identify the set of estimated bit values obtained based on the applying the first operational mode, and the first device may calculate the estimated CRC value based on the set of estimated bit values.

For example, referring to FIG. 5, the sink device 502 (e.g., the CRC checking component 514) may calculate an estimated CRC value based on a set of bit values. In one aspect, the set of bit values may correspond to PDU data of the initial data packet 562 or PDU data of at least one of the set of retransmission data packets 564. In another aspect, the set of bit values may correspond to a set of estimated bit values generated by the sink device 502 (e.g., the error correction component 520) obtained based on application of the operational mode 526.

At operation 904, the first device may compare the generated CRC value to a CRC value indicated by a packet. For example, the first device may compare the generated CRC value to a CRC value indicated by a most recently received packet, and the first device may determine whether the generated CRC value matches the CRC value indicated by the most recently received data packet based on the comparison.

For example, referring to FIG. 5, the sink device 502 (e.g., the CRC checking component 514) may compare an estimated CRC value to a CRC value indicated by a most recently received one of the initial data packet 562 or retransmission data packet of the set of retransmission data packets 564.

At operation 906, if the first packet is encrypted, the first device may generate an estimated MIC value based on the set of bit values. For example, the first device may generate an estimated MIC value based on a first payload of the first packet. The first device may identify a set of bit values corresponding to the first payload of the first packet, and the first device may calculate the estimated MIC value based on the identified set of bits. In another example, the first device may identify the set of estimated bit values obtained based on the applying the first operational mode, and the first device may calculate the estimated MIC value based on the set of estimated bit values.

For example, referring to FIG. 5, the sink device 502 (e.g., the decryption component 516) may calculate an estimated MIC value based on a set of bit values. In one aspect, the set of bit values may correspond to a payload of the initial data packet 562 or a payload of at least one of the set of retransmission data packets 564. In another aspect, the set of bit values may correspond to a set of estimated bit values generated by the sink device 502 (e.g., the error correction component 520) obtained based on application of the operational mode 526.

At operation 908, the first device may compare the generated MIC value to a MIC value indicated by a packet. For example, the first device may compare the generated MIC value to a MIC value indicated by a most recently received packet, and the first device may determine whether the generated MIC value matches the MIC value indicated by the most recently received data packet based on the comparison.

For example, referring to FIG. 5, the sink device 502 (e.g., the decryption component 516) may compare an estimated MIC value to a MIC value indicated by a most recently received one of the initial data packet 562 or retransmission data packet of the set of retransmission data packets 564.

Figure 10:
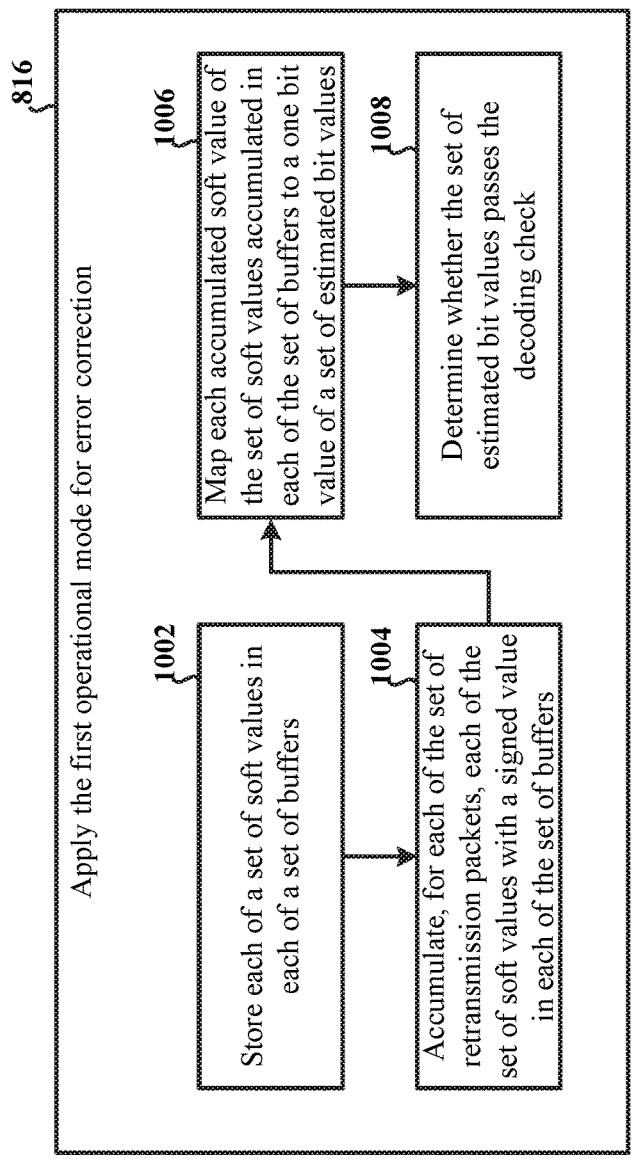
FIG. 10 is a flowchart illustrating a first aspect of a method of applying an operational mode for error correction in a short-range wireless communications system in accordance with certain aspects of the disclosure.

With reference to FIG. 10, a flowchart illustrates a method 1000 of the application of the first operational mode for error correction described with respect to operation 816 of the method 800. The method 1000 may be implemented when the logical link includes one of an ACL link or an A2DP link.

The first operational mode may be selected to be the soft-combining operational mode.

At operation 1002, the first device may store each of a set of soft values in each of a set of buffers. In an aspect, each of the set of soft values may be a three-bit signed soft value that is based on a respective bit of the first PDU data of the first packet. For example, for a packet size of n, each bit having an index i (where $0 \leq i \leq n-1$), the first device may identify a first soft value when a bit i of the first PDU data is equal to 0 and the first device may store the first soft value in buffer index i. Further, the first device may identify a second soft value when a bit i of the first PDU data is equal to 1 and the first device may store the first soft value in buffer index i.

For example, referring to FIG. 5, the sink device 502 (e.g., error correction component 520) may store each of a set of soft values in each of a set of buffers. In an aspect, each of the set of soft values may be a three-bit signed soft value that is based on a respective bit of the first PDU data of the initial data packet 562.

At operation 1004, the first device may accumulate, for each of the set of retransmission packets, each of the set of soft values with a signed value in each of the set of buffers. In aspects, each of the signed values may be based on a corresponding bit of the respective PDU data of each retransmission packet of the set of retransmission packets. For example, the first device may identify a first signed value when a bit i of the respective PDU data is equal to 0 and the first device may add the first signed value to the soft value in buffer index i. Further, the first device may identify a second signed value when a bit i of the respective PDU data is equal to 1 and the first device may add the first signed value to the soft value in buffer index i.

For example, referring to FIG. 5, the sink device 502 (e.g., error correction component 520) may accumulate, for each of the set of retransmission data packets 564, each of the set of soft values with a signed value in each of the set of buffers. In aspects, each of the signed values may be based on a corresponding bit of the respective PDU data of each retransmission data packet of the set of retransmission data packets 564.

In some aspects, each of the set of buffers may be bound with a minimum threshold and a maximum threshold. Accordingly, each accumulated soft value of the set of soft values accumulated in each of the set of buffers may not exceed the minimum threshold and may not exceed the maximum threshold.

At operation 1006, the first device may map each accumulated soft value of the set of soft values accumulated in each of the set of buffers to a one bit value of a set of estimated bit values. That is, the first device may hard slice each of the accumulated soft values to obtain a set of estimated bit values. For example, for a packet size of n, a soft value at buffer index i (where $0 \leq i \leq n-1$) may be mapped to 0 bit value when the soft value is within a first range and may be mapped to a 1 bit value when the soft value is within a second range different from the first range. Each of the mapped bit values may be stored in a set of estimated bit values, which may be estimated to be PDU data of a most recently received data packet.

For example, referring to FIG. 5, the sink device 502 (e.g., the error correction component 520) may map each accumulated soft value of the set of soft values accumulated in each of the set of buffers to a one bit value of a set of estimated bit values. The sink device 502 (e.g., the error correction component 520) may provide the set of estimated bit values for CRC validation (e.g., at the CRC checking component 514) and, if applicable, MIC validation (e.g., at the decryption component 516).

At operation 1008, the first device may determine whether the set of estimated bit values passes the decoding check (e.g., as described with respect to operation 810 of the method 800). For example, the first device may perform CRC validation and, if applicable, MIC validation based on the set of estimated bit values. If the CRC validation or the MIC validation (if applicable) fails, then the first device may transmit a NACK message to the second device. If the CRC validation and the MIC validation (if applicable) are successful, then the first device may transmit an ACK message to the second device, and may provide the set of estimated bit values to a higher layer of the first device.

Figure 11:
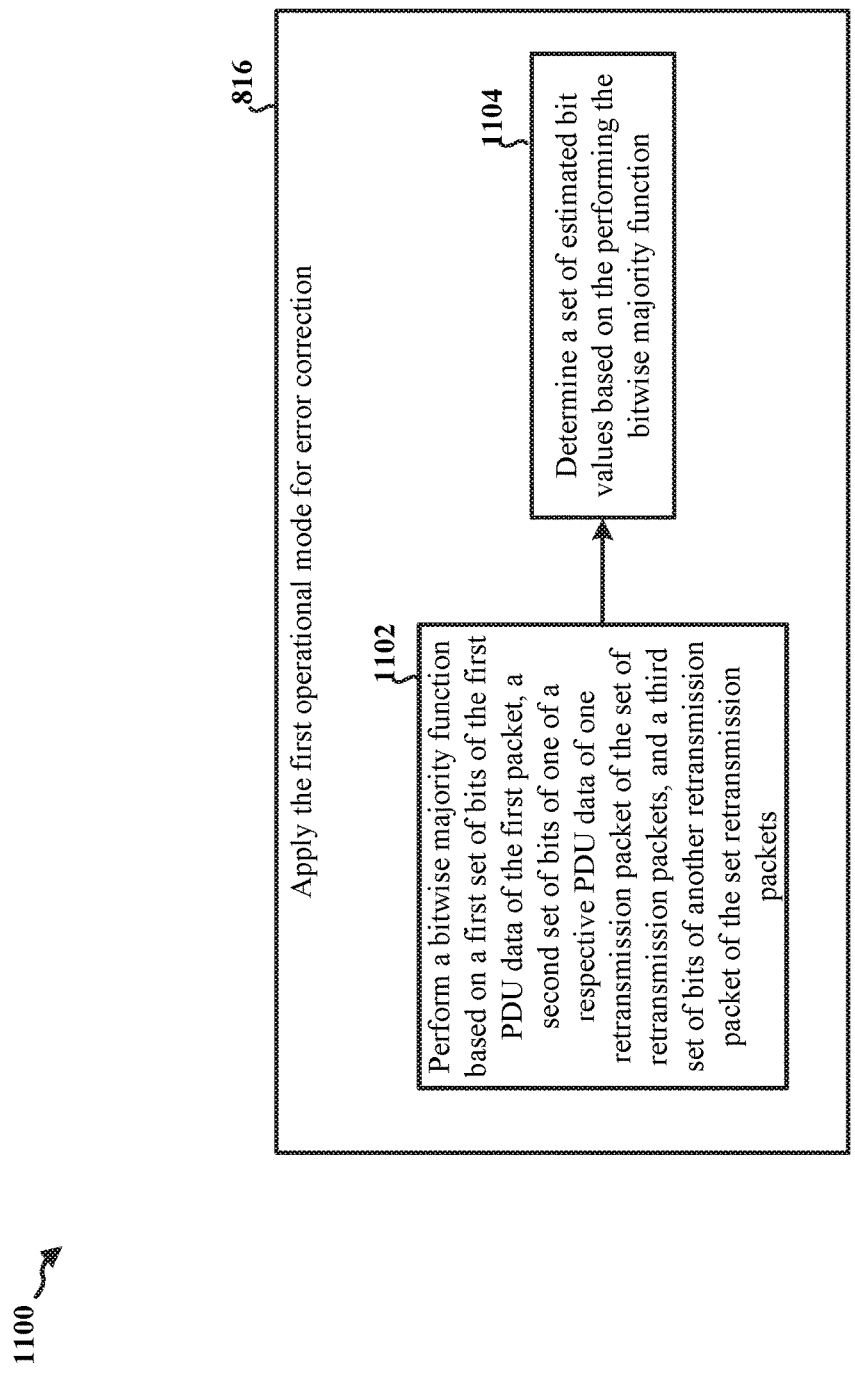
FIG. 11 is a flowchart illustrating a second aspect of a method of applying an operational mode for error correction in a short-range wireless communications system in accordance with certain aspects of the disclosure.

With reference to FIG. 11, a flowchart illustrates a method 1100 of the application of the first operational mode for error correction described with respect to operation 816 of the method 800. The method 1100 may be implemented when the logical link includes an eSCO link. The first operational mode may be selected to be the QBm operational mode.

At operation 1102, the first device may perform a bitwise majority function based on a first set of bits of the first PDU data of the first packet, a second set of bits of one respective PDU data of one retransmission packet of the set of retransmission packets, and a third set of bits of another respective PDU data of another retransmission packet of the set of retransmission packets. For example, for a packet size of n, each bit having an index i (where $0 \leq i \leq n-1$), the first device may perform a plurality of XOR operations based on the first set of bits, the second set of bits, and the third set of bits. The first device may then determine a bit value at index i based on the plurality of XOR operations. Accordingly, the first device may determine, for an index i, which bit value (between 0 and 1) occurs over at least two of the first packet, the one retransmission packet, and the other retransmission packet.

For example, referring to FIG. 5, the sink device 502 (e.g., the error correction component 520) may perform a bitwise majority function based on a first set of bits of the first PDU data of the initial data packet 562, a second set of bits of one respective PDU data of one retransmission data packet of the set of retransmission data packets 564, and a third set of bits of another respective PDU data of another retransmission data packet of the set of retransmission data packets 564.

At operation 1104, the first device may determine a set of estimated bit values based on the performing the bitwise majority function. For example, the first device may identify each of the bit values for each index i, and the first device may store each of the identified bit values as PDU data corresponding to a most recently received packet. In some aspects, the first device may further determine a set of bit error quality metrics based on the set of estimated bit values, and the first device may attempt to correct one or more bits based on the set of bit error quality metrics. For example, referring to FIG. 5, the sink device 502 (e.g., the error correction component 520) may determine a set of estimated bit values based on the performing the bitwise majority function.

Figure 12:
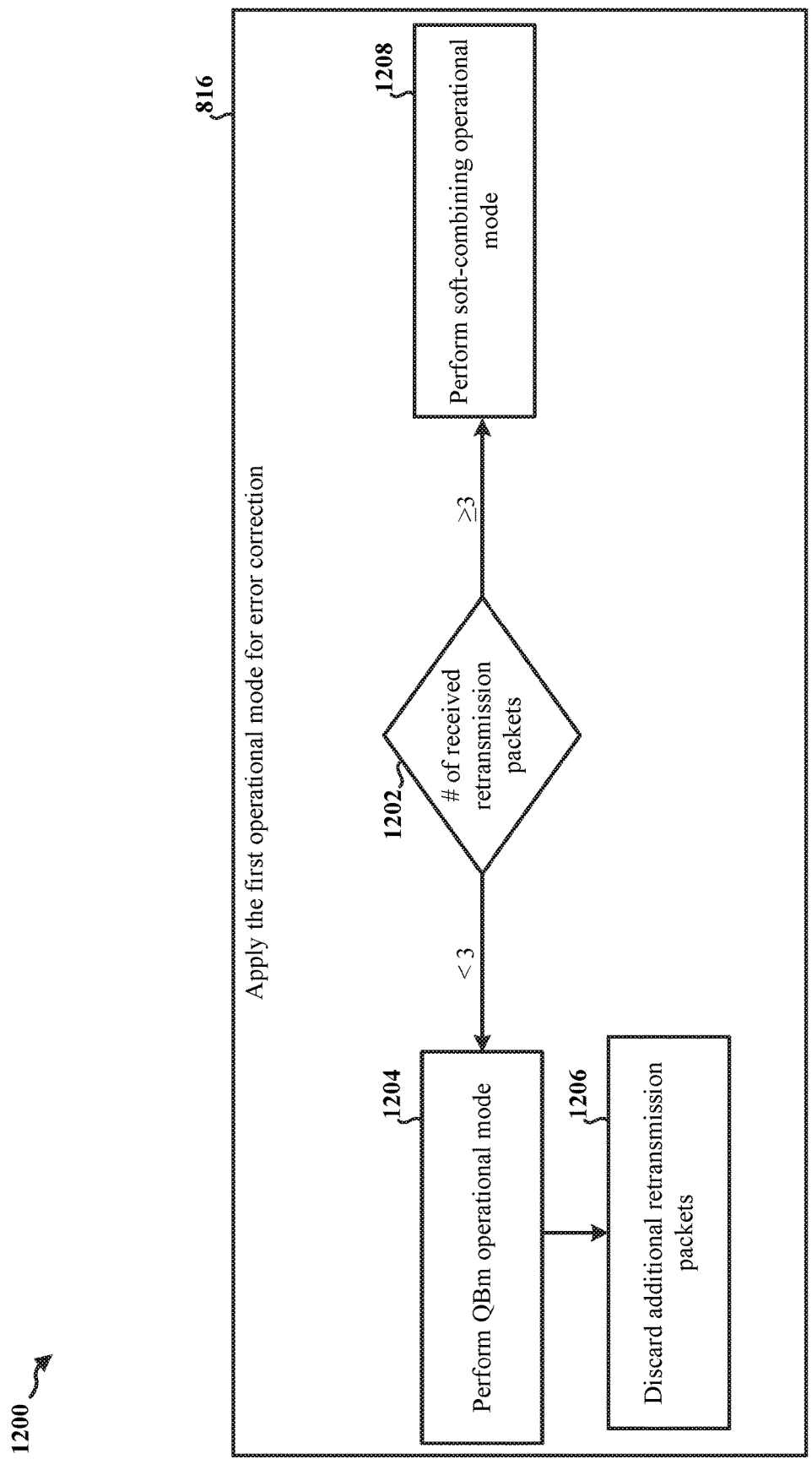
FIG. 12 is a flowchart illustrating a third aspect of a method of applying an operational mode for error correction in a short-range wireless communications system in accordance with certain aspects of the disclosure.

With reference to FIG. 12, a flowchart illustrates a method 1200 of the application of the first operational mode for error correction described with respect to operation 816 of the method 800. The method 1200 may be implemented when the logical link includes one of an ISO link. The first operational mode may be selected to be the QBm-H operational mode.

At operation 1202, the first device may determine the number of retransmission packets received in the set of retransmission packets. For example, the first device may count the number of retransmission packets in the set of retransmission packets, and the first device may compare the number to a threshold number, such as three. For example, referring to FIG. 5, the sink device (e.g., the error correction component 520) may determine the number of retransmission data packets received in the set of retransmission data packets 564.

If the number of the retransmission packets is less than three (e.g., only two), then the first device may perform the QBm operational mode, as shown at operation 1204. The operations of the QBm operational mode may be described with respect to the method 1100 of FIG. 11. If first device is able to obtain a set of estimated bit values that passes the decoding check, then the first device may transmit an ACK message, and the first device may send the set of estimated bit values to a higher layer of the first device.

For example, referring to FIG. 5, the sink device 502 (e.g., the error correction component 520) may determine the number of the set of retransmission data packets 564. If the number of the retransmission data packets is less than three (e.g., only two), then the sink device 502 (e.g., the error correction component 520) may perform the QBm operational mode.

At operation 1206, the first device may discard additional retransmission packets received after the determined set of estimated bit values when the additional retransmission packets are retransmissions of the first packet. For example, if first device is able to obtain a set of estimated bit values that passes the decoding check and/or provides the set of bit error quality metrics to the higher layer (in other words, if the first device has moved on from attempting to process the payload of the first packet), then the first device may transmit an ACK message, and the first device may discard additional retransmission packets received after the set of estimated bit values passes the decoding check and/or the set of bit error quality metrics is provided to the higher layer. For example, referring to FIG. 5, the sink device 502 (e.g., the error correction component 520) may discard additional retransmission data packets received after the determined set of estimated bit values.

If the number of the retransmission packets is greater than or equal to three, then the first device may perform the soft-combining operational mode, as shown at operation 1208. The operations of the soft-combining operational mode may be described with respect to the method 1000 of FIG. 10. If first device is unable to obtain a set of estimated bit values that passes the decoding check, then the first device may continue to receive retransmission packets that number greater than or equal to three, and so the first device may switch from the QBm operational mode to the soft-combining operational mode in order to attempt to obtain a set of estimated bit values that passes the decoding check. For example, referring to FIG. 5, the sink device 502 (e.g., the error correction component 520) may determine the number of the set of retransmission data packets 564. If the number of the retransmission data packets is greater than or equal to three, then the sink device 502 (e.g., the error correction component 520) may perform the soft-combining operational mode.

Figure 13:
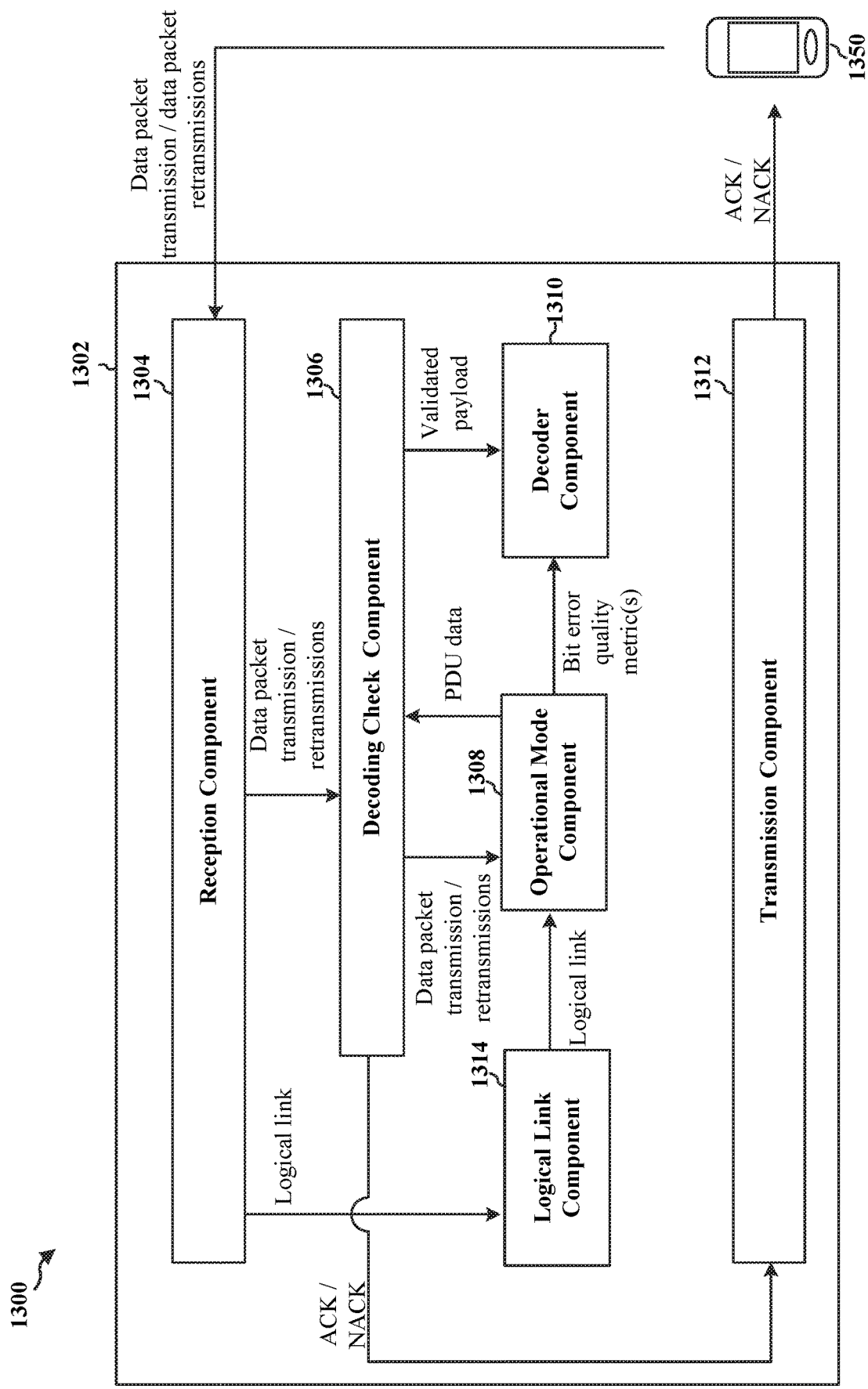
FIG. 13 is a conceptual data flow diagram illustrating the data flow between different means/components in an exemplary apparatus.

FIG. 13 is a conceptual data flow diagram 1300 illustrating the data flow between different means/components in an exemplary apparatus 1302. The apparatus may be a first device (e.g., a wireless device 102, a peripheral device 104, 106, 108, 110, 112, 114, wireless device 200, the sink device 502) in communication with a second device 1350 (e.g., a wireless device 102, a peripheral device 104, 106, 108, 110, 112, 114, wireless device 200, the source device 550).

The apparatus 1302 may include a reception component 1304 may be configured to receive signals from a second device 1350 over a logical link. Further, the apparatus 1302 may include a transmission component 1312 configured to transmit signals to the second device 1350 over the logical link.

The apparatus 1302 may include a logical link component 1314. The logical link component 1314 may establish, with the second device 1350, a logical link associated with short-range communications. The logical link component 1314 may determine the type of the logical link. For example, the logical link component 1314 may determine the type of the logical link based on of an access address or an LT_ADDR indicated by at least one header of at least one packet received on the logical link. The logical link may include one an ACL link, an A2DP link, an eSCO link, or an A2DP link.

The apparatus 1302 may include an operational mode component 1308. The operational mode component 1308 may receive the type of logical link from the logical link component 1314. The operational mode component 1308 may select a first operational mode for error correction from a plurality of operational modes for error correction based on the logical link. For example, the operational mode component 1308 may select a soft-combining operational mode when the logical link includes an ACL or an A2DP link. In another example, the operational mode component 1308 may select a QBm operational mode when the logical link includes an eSCO link. In another example, the operational mode component 1308 may select a QBm-H mode when the logical link includes an ISO link.

The apparatus 1302 may include a decoding check component 1306. The reception component 1304 may receive a first packet over the logical link, and the first packet may be provided to the decoding check component 1306. The decoding check component 1306 may be configured to perform CRC validation and, if applicable, MIC validation on the first packet.

In aspects, the decoding check component 1306 may be configured to perform CRC validation for a set of bits (e.g., obtained from PDU data of the first packet or a retransmission packet, obtained as an estimated set of bits from the operational mode component 1308). For the CRC validation, the decoding check component 1306 may generate a CRC value based on a set of bits. The decoding check component 1306 may compare the generated CRC value to a CRC value indicated by a most recently received packet (e.g., the first packet, a retransmission packet). The decoding check component 1306 may determine that the set of bits at least partially passes the decoding check when the generated CRC value matches the CRC value indicated by a most recently received packet. The decoding check component 1306 may determine that the set of bits fails the decoding check when the generated CRC value does not match the CRC value indicated by a most recently received packet (corresponding to the set of bits or upon which the set of bits is based).

When the first packet is encrypted, the decoding check component 1306 may be configured to perform MIC validation for a set of bits (e.g., obtained from PDU data of the first packet or a retransmission packet, obtained as an estimated set of bits from the operational mode component 1308). For the MIC validation, the decoding check component 1306 may generate a MIC value based on a set of bits. The decoding check component 1306 may compare the generated MIC value to a MIC value indicated by a most recently received packet (e.g., the first packet, a retransmission packet). The decoding check component 1306 may determine that the set of bits at least partially passes the decoding check when the generated MIC value matches the MIC value indicated by a most recently received packet. The decoding check component 1306 may determine that the set of bits fails the decoding check when the generated MIC value does not match the MIC value indicated by a most recently received packet (corresponding to the set of bits or upon which the set of bits is based).

When the first packet passes the decoding check, then the decoding check component 1306 may transmit an ACK message to the second device 1350. Further, the decoding check component 1306 may provide the payload of the first packet to a decoding component 1310 of the apparatus 1302. The decoding component 1310 may decode the payload, and may cause the apparatus to output audio and/or video based on the decoded payload.

When the first packet fails the decoding check, then the decoding check component 1306 may transmit a NACK message to the second device 1350. The reception component 1304 may receive, from the second device 1350, at least one of a set of retransmission packets (e.g., based on the NACK message). Each time the operational mode component 1308 fails to obtain a set of estimated bits that passes the decoding check, the decoding check component 1306 may transmit another NACK message, and the reception component may receive another retransmission packet of the set of retransmission packets.

The decoding check component 1306 may perform the decoding check on each retransmission packet of the set of retransmission packets. Further, the operational mode component 1308 may apply, based on the first PDU data included in the first packet and the respective PDU data included in each of the set of retransmission packets, the first operational mode for error correction. The operational mode component 1308 may determine the first operational mode for error correction.

When the logical link is one of an ACL link or an A2DP link and the first operational mode includes the soft-combining operational mode, the operational mode component 1308 may store each of a set of soft values in each of a set of buffers, and each of the set of soft values may be a three-bit signed soft value that is based on a respective bit of the first PDU data of the first packet. Further, the operational mode component 1308 may accumulate, for each of the set of retransmission packets, each of the set of soft values with a signed value in each of the set of buffers, and each of the signed values may be based on a corresponding bit of the respective PDU data of each retransmission packet of the set of retransmission packets. The operational mode component 1308 may map each accumulated soft value of the set of soft values accumulated in each of the set of buffers to a one bit value of a set of estimated bit values. In one aspect, each of the set of buffers is bound with a minimum threshold and a maximum threshold, and each accumulated soft value of the set of soft values in each of the set of buffers does not exceed the minimum threshold and does not exceed the maximum threshold.

In one aspect, when the first packet is associated with a first nonce for decryption that matches a respective nonce for decryption of each of the retransmission packets and when the first operational mode for error correction includes the soft-combining mode, the operational mode component 1308 may apply the first operational mode for error correction based on the first PDU data of the first packet that includes first payload data and a first MIC value and further based on the respective PDU data of each of the set of retransmission packets that includes respective payload data and a respective MIC value. In one aspect, the first PDU data of the first packet and the respective PDU data of each of the set of retransmission packets are decrypted when the first operational mode for error correction is applied. In another aspect, the first PDU data of the first packet and the respective PDU data of each of the set of retransmission packets remain encrypted when the first operational mode for error correction is applied.

In one aspect, when the first packet is associated with a first nonce for decryption that is different from a respective nonce associated with decryption of at least one of the set of retransmission packets and when the first operational mode for error correction comprises the soft-combining mode, the operational mode component 1308 may apply the first operational mode for error correction based on first payload data included in the first PDU data of the first packet and further based on respective payload data included in the respective PDU data of each of the set of retransmission packets. In an aspect, when the first PDU data of the first packet includes a first MIC value and when the respective PDU data of each of the set of retransmission packets includes a respective MIC value, the first operational mode for error correction is applied without the first MIC value and without each of the respective MIC values. In one aspect, the first PDU data of the first packet and the respective PDU data of each of the set of retransmission packets are decrypted when the first operational mode for error correction is applied.

The operational mode component 1308 may provide the set of estimated bit values to the decoding check component 1306. The decoding check component 1306 may determine whether the set of estimated bit values passes the decoding check. When the set of estimated bit values passes the decoding check, the decoding check component 1306 may provide at least a portion of the set of estimated bit values to the decoding component 1310, which may decode the set of estimated bit values as if it were the payload of the first packet. Further, the decoding check component 1306 may transmit an ACK message to the second device 1350.

When the set of estimated bit values fails the decoding check, the decoding check component 1306 may transmit a NACK message to the second device 1350, and the reception component 1304 may receive another retransmission packet of the set of retransmission packets. The operational mode component 1308 may continue to apply the first operational mode for error correction based on the first packet and the set of retransmission packets.

When the logical link includes the eSCO link and the first operational mode includes the QBm mode, the operational mode component 1308 may perform a bitwise majority function based on a first set of bits of the first PDU data of the first packet, a second set of bits of one respective PDU data of one retransmission packet of the set of retransmission packets, and a third set of bits of another respective PDU data of another retransmission packet of the set of retransmission packets. The operational mode component 1308 may determine a set of estimated bit values based on the performance of the bitwise majority function. The operational mode component 1308 may additionally determine a set of bit error quality metrics based on the set of estimated bit values.

When the logical link includes the ISO link and the first operational mode includes the QBm-H mode, the operational mode component 1308 may perform the QBm operational mode when the set of retransmission packets is less than three. The operational mode component 1308 may discard additional retransmission packets that are retransmissions of the first packet after the QBm operational mode is applied and a set of estimated bit values is obtained (e.g., that passes the decoding check). When the number of the set of retransmission packets is greater than or equal to three, the operational mode component 1308 may perform the soft-combining operational mode for error correction based on the first packet and the set of retransmission packets.

In applying the first operational mode, the operational mode component 1308 may determine a set of bit errors associated with the set of estimated bit values based on application of the first operational mode for error correction. The operational mode component 1308 may attempt to correct the bit errors of the determined set and/or may provide at least one bit error quality metric indicating at least one of a set of locations of the set of bit errors or a number of the set of bit errors to the decoding component 1310 (e.g., to be corrected, concealed, or dropped).

The apparatus may include additional components that perform each of the blocks of the algorithm in the aforementioned flowchart of FIGS. 6, 8A-8B, and 9-12. As such, each block in the aforementioned flowcharts of FIGS. 6, 8A-8B, and 9-12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
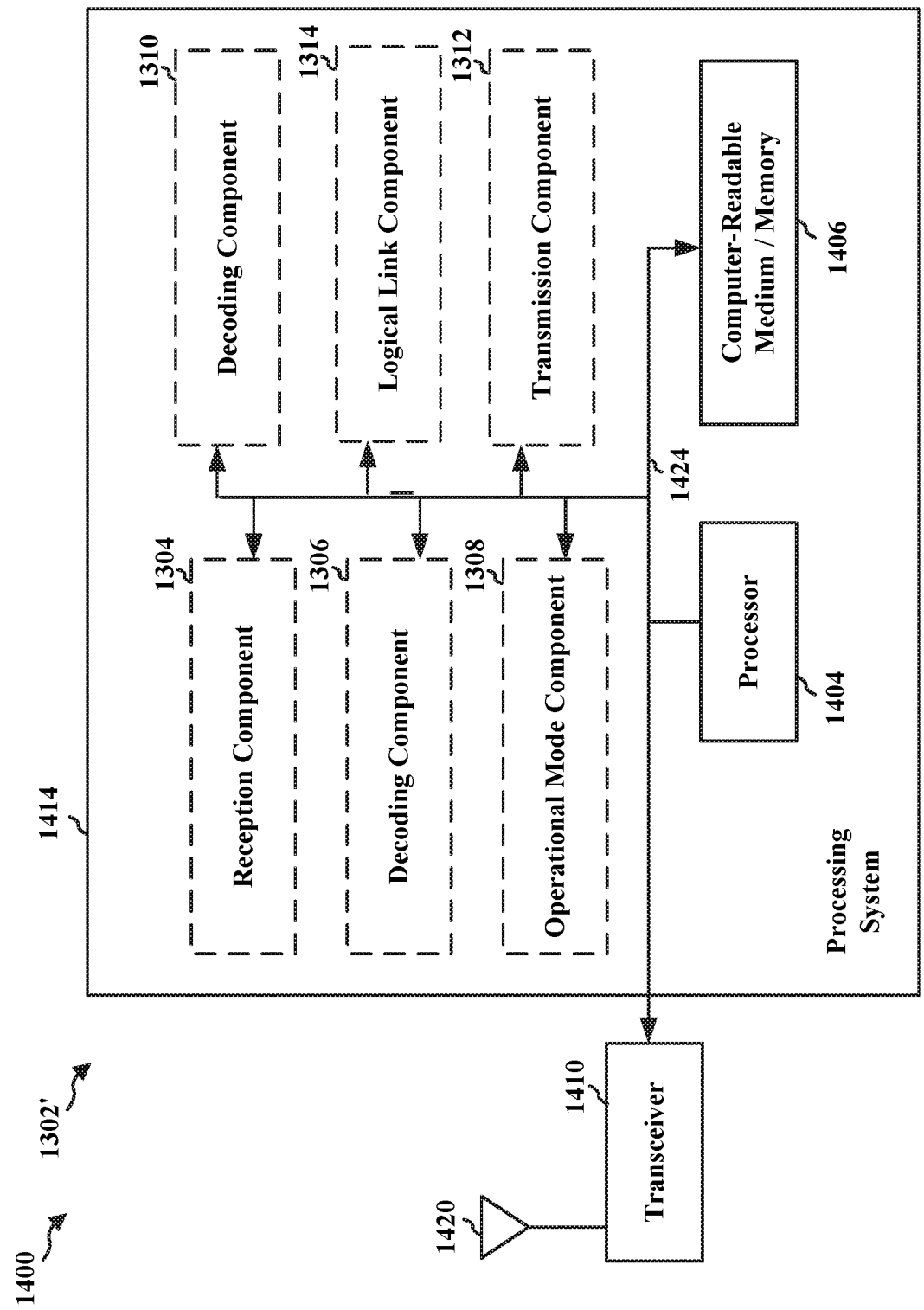
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1304, 1306, 1308, 1310, 1312, 1314 and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1304. In addition, the transceiver 1410 receives information from the processing system 1414, specifically the transmission component 1312, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system 1414 further includes at least one of the components 1304, 1306, 1308, 1310, 1312, 1314. The components may be software components running in the processor 1404, resident/stored in the computer readable medium/memory 1406, one or more hardware components coupled to the processor 1404, or some combination thereof.

In one configuration, the apparatus 1302/1302' for wireless communication may include means for establishing, with a second device, a logical link associated with short-range communications. The apparatus 1302/1302' may include means for receiving a first packet carried on the logical link. The apparatus 1302/1302' may include means for sending at least a portion of first PDU data included in the first packet to a higher layer of the first device when the first PDU data passes a decoding check. When the first PDU data fails the decoding check: the apparatus 1302/1302' may include means for determining, based on the logical link, a first operational mode from a plurality of operational modes for error correction; means for receiving a set of retransmission packets on the logical link, each of the set of retransmission packets including respective PDU data that is a retransmission of the first PDU data; and means for applying, based on the first PDU data included in the first packet and the respective PDU data included in each of the set of retransmission packets, the first operational mode for error correction.

The apparatus 1302/1302' may include means for determining a type of the logical link, wherein the first operational mode for error correction is determined based on the type of the logical link. In an aspect, the type of logical link is determined based on at least one of an access address or an LT_ADDR indicated by at least one header of at least one packet received on the logical link.

In an aspect, the logical link comprises one of an ACL link or an A2DP link, and the first operational mode comprises a soft-combining mode based on the ACL link or the A2DP link. In an aspect, when the first packet is associated with a first nonce for decryption that matches a respective nonce for decryption of each of the retransmission packets and when the first operational mode for error correction comprises the soft-combining mode, the first operational mode for error correction is applied based on the first PDU data of the first packet that includes first payload data and a first MIC value and further based on the respective PDU data of each of the set of retransmission packets that includes respective payload data and a respective MIC value. In an aspect, the first PDU data of the first packet and the respective PDU data of each of the set of retransmission packets are decrypted when the first operational mode for error correction is applied. In another aspect, the first PDU data of the first packet and the respective PDU data of each of the set of retransmission packets remain encrypted when the first operational mode for error correction is applied.

In an aspect, when the first packet is associated with a first nonce for decryption that is different from a respective nonce associated with decryption of at least one of the set of retransmission packets and when the first operational mode for error correction comprises the soft-combining mode, the first operational mode for error correction is applied based on first payload data included in the first PDU data of the first packet and further based on respective payload data included in the respective PDU data of each of the set of retransmission packets. In an aspect, when the first PDU data of the first packet includes a first MIC value and when the respective PDU data of each of the set of retransmission packets includes a respective MIC value, the first operational mode for error correction is applied without the first MIC value and without each of the respective MIC values. In an aspect, the first PDU data of the first packet and the respective PDU data of each of the set of retransmission packets are decrypted when the first operational mode for error correction is applied.

In an aspect, when the first operational mode for error correction comprises the soft-combining mode, the means for applying the first operational mode for error correction is configured to: store each of a set of soft values in each of a set of buffers, each of the set of soft values being a three-bit signed soft value that is based on a respective bit of the first PDU data of the first packet; accumulate, for each of the set of retransmission packets, each of the set of soft values with a signed value in each of the set of buffers, each of the signed values being based on a corresponding bit of the respective PDU data of the each retransmission packet of the set of retransmission packets; map each accumulated soft value of the set of soft values accumulated in each of the set of buffers to a one bit value of a set of estimated bit values; and determine whether the set of estimated bit values passes the decoding check. In an aspect, each of the set of buffers is bound with a minimum threshold and a maximum threshold, and each accumulated soft value of the set of soft values accumulated in each of the set of buffers does not exceed the minimum threshold and does not exceed the maximum threshold.

In an aspect, the logical link comprises an eSCO link, and the first operational mode comprises a QBm mode based on the eSCO link. In an aspect, when the first operational mode for error correction comprises the QBm mode, the means for applying the first operational mode for error correction is configured to: perform a bitwise majority function based on a first set of bits of the first PDU data of the first packet, a second set of bits of one respective PDU data of one retransmission packet of the set of retransmission packets, and a third set of bits of another respective PDU data of another retransmission packet of the set of retransmission packets; determine a set of estimated bit values based on the performing the bitwise majority function; and determine a set of bit error quality metrics based on the set of estimated bit values.

In an aspect, the logical link comprises an ISO link, and the first operational mode for error correction comprises a QBm-H mode based on the ISO link. In an aspect, when the first operational mode for error correction comprises the QBm-H mode, the means for applying the first operational mode for error correction is configured to: perform a bitwise majority function based on a first set of bits of the first PDU data of the first packet, a second set of bits of one respective PDU data of one retransmission packet of the set of retransmission packets, and a third set of bits of another respective PDU data of another retransmission packet of the set of retransmission packets; determine a set of estimated bit values based on the performing the bitwise majority function; determine a set of bit error quality metrics based on the set of estimated bit values; and discard one or more additional retransmission packets received after the one retransmission packet and the other retransmission packets of the set of retransmission packets when the one or more additional retransmission packets comprise a retransmission of the first PDU data of the first packet. In an aspect, when the first operational mode for error correction comprises the QBm-H mode, and when the set of retransmission packets includes three or more retransmission packets, the means for apply the first operational mode for error correction is configured to: store each of a set of soft values in each of a set of buffers, each of the set of soft values being a three-bit signed soft value that is based on a respective bit of the first PDU data of the first packet; accumulate, for each of the set of retransmission packets, each of the set of soft values with a signed value in each of the set of buffers, each of the signed values being based on a corresponding bit of the respective PDU data of the each retransmission packet of the set of retransmission packets; map each accumulated soft value of the set of soft values accumulated in each of the set of buffers to a one bit value of a set of estimated bit values; and determine whether the set of estimated bit values passes the decoding check.

In an aspect, the apparatus 1302/1302' includes means for generating an estimated CRC value based on a set of estimated bit values obtained based on the applying the first operational mode for error correction, the set of estimated bit values estimated to be included in the first PDU data; and means for comparing the estimated CRC value with a first CRC value included in a most recently received retransmission packet of the set of retransmission packets, wherein the set of estimated bit values passes the decoding check based on the comparing the estimated CRC value with the first CRC value, and wherein the set of estimated bit values fails the decoding check when the generated CRC value is different from the first CRC value.

In an aspect, the apparatus 1302/1302' includes means for generating an estimated message integrity code (MIC) value based on the set of estimated bit values; and comparing the estimated MIC value with a first MIC value included in the a most recently received retransmission packet of the set of retransmission packets, wherein the set of estimated bit values passes the decoding check when the estimated CRC value matches the first CRC value and the estimated MIC value matches the first MIC value, and wherein the set of estimated bit values fails the decoding check when the estimated CRC value is different from the first CRC value or when the estimated MIC value is different from the first MIC value.

In an aspect, the apparatus 1302/1302' includes means for sending, to the higher layer of the first device, a set of estimated bit values obtained based on the applying the first operational mode for error correction, the set of estimated bit values estimated to be the at least the portion of first PDU data. In an aspect, the apparatus 1302/1302' includes means for determining, based on the applying the first operational mode for error correction, a set of bit errors associated with the set of estimated bit values; means for sending, to the higher layer of the first device, at least one bit error quality metric indicating at least one of a set of locations of the set of bit errors or a number of the set of bit errors.

The aforementioned means may be one or more of the aforementioned processor(s) 202, short-range communications controller 252, and/or radio 230 in FIG. 2, components of the apparatus 1302 and/or the processing system 1414 of the apparatus 1302' configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communications by a first device, the method comprising:
    establishing, with a second device, a logical link associated with short-range communications, the short-range communications providing connectivity to devices within a threshold distance from the first device;
    receiving a first packet carried on the logical link;
    sending at least a portion of first packet data unit (PDU) data included in the first packet to a higher layer of the first device when the first PDU data passes a decoding check; and
    when the first PDU data fails the decoding check:
        determining, based on a type of the logical link, a first operational mode from a plurality of operational modes for error correction;
        receiving a set of retransmission packets on the logical link, each of the set of retransmission packets including respective PDU data that is a retransmission of the first PDU data; and
        applying, based on the first PDU data included in the first packet and the respective PDU data included in each of the set of retransmission packets, the first operational mode for error correction.

2. The method of claim 1, further comprising:

determining the type of the logical link, wherein the first operational mode for error correction is determined based on the type of the logical link.

3. The method of claim 2, wherein the type of logical link is determined based on at least one of an access address (AA) or a logical transport address (LT_ADDR) indicated by at least one header of at least one packet received on the logical link.

4. The method of claim 1, wherein the logical link comprises one of an asynchronous connection-less (ACL) link or an advanced audio distribution profile (A2DP) link, and the first operational mode comprises a soft-combining mode based on the ACL link or the A2DP link.

5. The method of claim 4, wherein when the first packet is associated with a first nonce for decryption that matches a respective nonce for decryption of each of the retransmission packets and when the first operational mode for error correction comprises the soft-combining mode, the first operational mode for error correction is applied based on the first PDU data of the first packet that includes first payload data and a first message integrity code (MIC) value and further based on the respective PDU data of each of the set of retransmission packets that includes respective payload data and a respective MIC value.

6. The method of claim 5, wherein the first PDU data of the first packet and the respective PDU data of each of the set of retransmission packets are decrypted when the first operational mode for error correction is applied.

7. The method of claim 4, wherein when the first packet is associated with a first nonce for decryption that is different from a respective nonce associated with decryption of at least one of the set of retransmission packets and when the first operational mode for error correction comprises the soft-combining mode, the first operational mode for error correction is applied based on first payload data included in the first PDU data of the first packet and further based on respective payload data included in the respective PDU data of each of the set of retransmission packets.

8. The method of claim 7, wherein when the first PDU data of the first packet includes a first message integrity code (MIC) value and when the respective PDU data of each of the set of retransmission packets includes a respective MIC value, the first operational mode for error correction is applied without the first MIC value and without each of the respective MIC values.

9. The method of claim 7, wherein the first PDU data of the first packet and the respective PDU data of each of the set of retransmission packets are decrypted when the first operational mode for error correction is applied.

10. The method of claim 4, wherein when the first operational mode for error correction comprises the soft-combining mode, the applying the first operational mode for error correction comprises:
storing each of a set of soft values in each of a set of buffers, each of the set of soft values being a three-bit signed soft value that is based on a respective bit of the first PDU data of the first packet;
accumulating, for each of the set of retransmission packets, each of the set of soft values with a signed value in each of the set of buffers, each of the signed values being based on a corresponding bit of the respective PDU data of the each retransmission packet of the set of retransmission packets;
mapping each accumulated soft value of the set of soft values accumulated in each of the set of buffers to a one bit value of a set of estimated bit values; and
determining whether the set of estimated bit values passes the decoding check.

11. The method of claim 10, wherein each of the set of buffers is bound with a minimum threshold and a maximum threshold, and each accumulated soft value of the set of soft values accumulated in each of the set of buffers does not exceed the minimum threshold and does not exceed the maximum threshold.

12. The method of claim 1, wherein the logical link comprises an extended synchronous connection oriented (eSCO) link, and the first operational mode comprises a quality bit mask (QBm) mode based on the eSCO link.

13. The method of claim 12, wherein when the first operational mode for error correction comprises the QBm mode, the applying the first operational mode for error correction comprises:
performing a bitwise majority function based on a first set of bits of the first PDU data of the first packet, a second set of bits of one respective PDU data of one retransmission packet of the set of retransmission packets, and a third set of bits of another respective PDU data of another retransmission packet of the set of retransmission packets;
determining a set of estimated bit values based on the performing the bitwise majority function; and
determining a set of bit error quality metrics based on the set of estimated bit values.

14. The method of claim 1, wherein the logical link comprises an isochronous (ISO) link, and the first operational mode for error correction comprises a quality bit mask hybrid (QBm-H) mode based on the ISO link.

15. The method of claim 14, wherein when the first operational mode for error correction comprises the QBm-H mode, the applying the first operational mode for error correction comprises:
performing a bitwise majority function based on a first set of bits of the first PDU data of the first packet, a second set of bits of one respective PDU data of one retransmission packet of the set of retransmission packets, and a third set of bits of another respective PDU data of another retransmission packet of the set of retransmission packets;
determining a set of estimated bit values based on the performing the bitwise majority function;
determining a set of bit error quality metrics based on the set of estimated bit values; and
discarding one or more additional retransmission packets received after the one retransmission packet and the other retransmission packets of the set of retransmission packets when the one or more additional retransmission packets comprise a retransmission of the first PDU data of the first packet.

16. The method of claim 14, wherein when the first operational mode for error correction comprises the QBm-H mode, and when the set of retransmission packets includes three or more retransmission packets, the applying the first operational mode for error correction comprises:
storing each of a set of soft values in each of a set of buffers, each of the set of soft values being a three-bit signed soft value that is based on a respective bit of the first PDU data of the first packet;
accumulating, for each of the set of retransmission packets, each of the set of soft values with a signed value in each of the set of buffers, each of the signed values being based on a corresponding bit of the respective PDU data of the each retransmission packet of the set of retransmission packets;

mapping each accumulated soft value of the set of soft values accumulated in each of the set of buffers to a one bit value of a set of estimated bit values; and
determining whether the set of estimated bit values passes the decoding check.

17. The method of claim 1, further comprising:
generating an estimated cyclic redundancy check (CRC) value based on a set of estimated bit values obtained based on the applying the first operational mode for error correction, the set of estimated bit values estimated to be included in the first PDU data; and
comparing the estimated CRC value with a first CRC value included in a most recently received retransmission packet of the set of retransmission packets,
wherein the set of estimated bit values passes the decoding check based on the comparing the estimated CRC value with the first CRC value, and wherein the set of estimated bit values fails the decoding check when the generated CRC value is different from the first CRC value.

18. The method of claim 17, further comprising:
generating an estimated message integrity code (MIC) value based on the set of estimated bit values; and
comparing the estimated MIC value with a first MIC value included in the a most recently received retransmission packet of the set of retransmission packets,
wherein the set of estimated bit values passes the decoding check when the estimated CRC value matches the first CRC value and the estimated MIC value matches the first MIC value, and wherein the set of estimated bit values fails the decoding check when the estimated CRC value is different from the first CRC value or when the estimated MIC value is different from the first MIC value.

19. The method of claim 1, further comprising:
sending, to the higher layer of the first device, a set of estimated bit values obtained based on the applying the first operational mode for error correction, the set of estimated bit values estimated to be the at least the portion of first PDU data.

20. The method of claim 19, further comprising:
determining, based on the applying the first operational mode for error correction, a set of bit errors associated with the set of estimated bit values;
sending, to the higher layer of the first device, at least one bit error quality metric indicating at least one of a set of locations of the set of bit errors or a number of the set of bit errors.

21. An apparatus for wireless communication by a first device, the apparatus comprising:
a memory; and
at least one processor coupled to the memory and configured to:
establish, with a second device, a logical link associated with short-range communications, the short-range communications providing connectivity to devices within a threshold distance from the first device;
receive a first packet carried on the logical link;
send at least a portion of first packet data unit (PDU) data included in the first packet to a higher layer of the first device when the first PDU data passes a decoding check; and
when the first PDU data fails the decoding check:
determine, based on a type of the logical link, a first operational mode from a plurality of operational modes for error correction;
receive a set of retransmission packets on the logical link, each of the set of retransmission packets including respective PDU data that is a retransmission of the first PDU data; and
apply, based on the first PDU data included in the first packet and the respective PDU data included in each of the set of retransmission packets, the first operational mode for error correction.

22. The apparatus of claim 21, wherein the at least one processor is further configured to:
determine the type of the logical link, wherein the first operational mode for error correction is determined based on the type of the logical link.

23. The apparatus of claim 22, wherein the type of logical link is determined based on at least one of an access address (AA) or a logical transport address (LT_ADDR) indicated by at least one header of at least one packet received on the logical link.

24. The apparatus of claim 21, wherein the logical link comprises one of an asynchronous connection-less (ACL) link or an advanced audio distribution profile (A2DP) link, and the first operational mode comprises a soft-combining mode based on the ACL link or the A2DP link.

25. The apparatus of claim 24, wherein when the first packet is associated with a first nonce for decryption that matches a respective nonce for decryption of each of the retransmission packets and when the first operational mode for error correction comprises the soft-combining mode, the first operational mode for error correction is applied based on the first PDU data of the first packet that includes first payload data and a first message integrity code (MIC) value and further based on the respective PDU data of each of the set of retransmission packets that includes respective payload data and a respective MIC value.

26. The apparatus of claim 25, wherein the first PDU data of the first packet and the respective PDU data of each of the set of retransmission packets are decrypted when the first operational mode for error correction is applied.

27. The apparatus of claim 24, wherein when the first packet is associated with a first nonce for decryption that is different from a respective nonce associated with decryption of at least one of the set of retransmission packets and when the first operational mode for error correction comprises the soft-combining mode, the first operational mode for error correction is applied based on first payload data included in the first PDU data of the first packet and further based on respective payload data included in the respective PDU data of each of the set of retransmission packets.

28. The apparatus of claim 27, wherein when the first PDU data of the first packet includes a first message integrity code (MIC) value and when the respective PDU data of each of the set of retransmission packets includes a respective MIC value, the first operational mode for error correction is applied without the first MIC value and without each of the respective MIC values.

29. The apparatus of claim 27, wherein the first PDU data of the first packet and the respective PDU data of each of the set of retransmission packets are decrypted when the first operational mode for error correction is applied.

30. The apparatus of claim 24, wherein when the first operational mode for error correction comprises the soft-combining mode, the application of the first operational mode for error correction comprises to:
store each of a set of soft values in each of a set of buffers, each of the set of soft values being a three-bit signed soft value that is based on a respective bit of the first PDU data of the first packet;

accumulate, for each of the set of retransmission packets, each of the set of soft values with a signed value in each of the set of buffers, each of the signed values being based on a corresponding bit of the respective PDU data of the each retransmission packet of the set of retransmission packets;

map each accumulated soft value of the set of soft values accumulated in each of the set of buffers to a one bit value of a set of estimated bit values; and determine whether the set of estimated bit values passes the decoding check.

31. The apparatus of claim 30, wherein each of the set of buffers is bound with a minimum threshold and a maximum threshold, and each accumulated soft value of the set of soft values accumulated in each of the set of buffers does not exceed the minimum threshold and does not exceed the maximum threshold.

32. The apparatus of claim 21, wherein the logical link comprises an extended synchronous connection oriented (eSCO) link, and the first operational mode comprises a quality bit mask (QBm) mode based on the eSCO link.

33. The apparatus of claim 32, wherein when the first operational mode for error correction comprises the QBm mode, the application of the first operational mode for error correction comprises to:
perform a bitwise majority function based on a first set of bits of the first PDU data of the first packet, a second set of bits of one respective PDU data of one retransmission packet of the set of retransmission packets, and a third set of bits of another respective PDU data of another retransmission packet of the set of retransmission packets;
determine a set of estimated bit values based on the performing the bitwise majority function; and
determine a set of bit error quality metrics based on the set of estimated bit values.

34. The apparatus of claim 21, wherein the logical link comprises an isochronous (ISO) link, and the first operational mode for error correction comprises a quality bit mask hybrid (QBm-H) mode based on the ISO link.

35. The apparatus of claim 34, wherein when the first operational mode for error correction comprises the QBm-H mode, the application of the first operational mode for error correction comprises to:
perform a bitwise majority function based on a first set of bits of the first PDU data of the first packet, a second set of bits of one respective PDU data of one retransmission packet of the set of retransmission packets, and a third set of bits of another respective PDU data of another retransmission packet of the set of retransmission packets;
determine a set of estimated bit values based on the performing the bitwise majority function;
determine a set of bit error quality metrics based on the set of estimated bit values; and
discard one or more additional retransmission packets received after the one retransmission packet and the other retransmission packets of the set of retransmission packets when the one or more additional retransmission packets comprise a retransmission of the first PDU data of the first packet.

36. The apparatus of claim 34, wherein when the first operational mode for error correction comprises the QBm-H mode, and when the set of retransmission packets includes three or more retransmission packets, the application of the first operational mode for error correction comprises to:

store each of a set of soft values in each of a set of buffers, each of the set of soft values being a three-bit signed soft value that is based on a respective bit of the first PDU data of the first packet;

accumulate, for each of the set of retransmission packets, each of the set of soft values with a signed value in each of the set of buffers, each of the signed values being based on a corresponding bit of the respective PDU data of the each retransmission packet of the set of retransmission packets;

map each accumulated soft value of the set of soft values accumulated in each of the set of buffers to a one bit value of a set of estimated bit values; and determine whether the set of estimated bit values passes the decoding check.

37. The apparatus of claim 21, wherein the at least one processor is further configured to:
generate an estimated cyclic redundancy check (CRC) value based on a set of estimated bit values obtained based on the applying the first operational mode for error correction, the set of estimated bit values estimated to be included in the first PDU data; and
compare the estimated CRC value with a first CRC value included in a most recently received retransmission packet of the set of retransmission packets,
wherein the set of estimated bit values passes the decoding check based on the comparison of the estimated CRC value with the first CRC value, and wherein the set of estimated bit values fails the decoding check when the generated CRC value is different from the first CRC value.

38. The apparatus of claim 37, wherein the at least one processor is further configured to:
generate an estimated message integrity code (MIC) value based on the set of estimated bit values; and
compare the estimated MIC value with a first MIC value included in the a most recently received retransmission packet of the set of retransmission packets,
wherein the set of estimated bit values passes the decoding check when the estimated CRC value matches the first CRC value and the estimated MIC value matches the first MIC value, and wherein the set of estimated bit values fails the decoding check when the estimated CRC value is different from the first CRC value or when the estimated MIC value is different from the first MIC value.

39. The apparatus of claim 21, wherein the at least one processor is further configured to:
send, to the higher layer of the first device, a set of estimated bit values obtained based on the application of the first operational mode for error correction, the set of estimated bit values estimated to be the at least the portion of first PDU data.

40. The apparatus of claim 39, wherein the at least one processor is further configured to:
determine, based on the applying the first operational mode for error correction, a set of bit errors associated with the set of estimated bit values;
send, to the higher layer of the first device, at least one bit error quality metric indicating at least one of a set of locations of the set of bit errors or a number of the set of bit errors.

41. An apparatus for wireless communication by a first device, the apparatus comprising:
means for establishing, with a second device, a logical link associated with short-range communications, the short-range communications providing connectivity to devices within a threshold distance from the first device;
means for receiving a first packet carried on the logical link;
means for sending at least a portion of first packet data unit (PDU) data included in the first packet to a higher layer of the first device when the first PDU data passes a decoding check; and
when the first PDU data fails the decoding check:
means for determining, based on a type of the logical link, a first operational mode from a plurality of operational modes for error correction;
means for receiving a set of retransmission packets on the logical link, each of the set of retransmission packets including respective PDU data that is a retransmission of the first PDU data; and
means for applying, based on the first PDU data included in the first packet and the respective PDU data included in each of the set of retransmission packets, the first operational mode for error correction.

42. The apparatus of claim 41, further comprising:
means for determining the type of the logical link, wherein the first operational mode for error correction is determined based on the type of the logical link.

43. The apparatus of claim 42, wherein the type of logical link is determined based on at least one of an access address (AA) or a logical transport address (LT_ADDR) indicated by at least one header of at least one packet received on the logical link.

44. The apparatus of claim 41, wherein the logical link comprises one of an asynchronous connection-less (ACL) link or an advanced audio distribution profile (A2DP) link, and the first operational mode comprises a soft-combining mode based on the ACL link or the A2DP link.

45. The apparatus of claim 44, wherein when the first packet is associated with a first nonce for decryption that matches a respective nonce for decryption of each of the retransmission packets and when the first operational mode for error correction comprises the soft-combining mode, the first operational mode for error correction is applied based on the first PDU data of the first packet that includes first payload data and a first message integrity code (MIC) value and further based on the respective PDU data of each of the set of retransmission packets that includes respective payload data and a respective MIC value.

46. The apparatus of claim 45, wherein the first PDU data of the first packet and the respective PDU data of each of the set of retransmission packets are decrypted when the first operational mode for error correction is applied.

47. The apparatus of claim 44, wherein when the first packet is associated with a first nonce for decryption that is different from a respective nonce associated with decryption of at least one of the set of retransmission packets and when the first operational mode for error correction comprises the soft-combining mode, the first operational mode for error correction is applied based on first payload data included in the first PDU data of the first packet and further based on respective payload data included in the respective PDU data of each of the set of retransmission packets.

48. The apparatus of claim 47, wherein when the first PDU data of the first packet includes a first message integrity code (MIC) value and when the respective PDU data of each of the set of retransmission packets includes a respective MIC value, the first operational mode for error correction is applied without the first MIC value and without each of the respective MIC values.

49. The apparatus of claim 47, wherein the first PDU data of the first packet and the respective PDU data of each of the set of retransmission packets are decrypted when the first operational mode for error correction is applied.

50. The apparatus of claim 44, wherein when the first operational mode for error correction comprises the soft-combining mode, the means for applying the first operational mode for error correction is configured to:
store each of a set of soft values in each of a set of buffers, each of the set of soft values being a three-bit signed soft value that is based on a respective bit of the first PDU data of the first packet;
accumulate, for each of the set of retransmission packets, each of the set of soft values with a signed value in each of the set of buffers, each of the signed values being based on a corresponding bit of the respective PDU data of the each retransmission packet of the set of retransmission packets;
map each accumulated soft value of the set of soft values accumulated in each of the set of buffers to a one bit value of a set of estimated bit values; and
determine whether the set of estimated bit values passes the decoding check.

51. The apparatus of claim 50, wherein each of the set of buffers is bound with a minimum threshold and a maximum threshold, and each accumulated soft value of the set of soft values accumulated in each of the set of buffers does not exceed the minimum threshold and does not exceed the maximum threshold.

52. The apparatus of claim 41, wherein the logical link comprises an extended synchronous connection oriented (eSCO) link, and the first operational mode comprises a quality bit mask (QBm) mode based on the eSCO link.

53. The apparatus of claim 52, wherein when the first operational mode for error correction comprises the QBm mode, the means for applying the first operational mode for error correction is configured to:
perform a bitwise majority function based on a first set of bits of the first PDU data of the first packet, a second set of bits of one respective PDU data of one retransmission packet of the set of retransmission packets, and a third set of bits of another respective PDU data of another retransmission packet of the set of retransmission packets;
determine a set of estimated bit values based on the performing the bitwise majority function; and
determine a set of bit error quality metrics based on the set of estimated bit values.

54. The apparatus of claim 51, wherein the logical link comprises an isochronous (ISO) link, and the first operational mode for error correction comprises a quality bit mask hybrid (QBm-H) mode based on the ISO link.

55. The apparatus of claim 54, wherein when the first operational mode for error correction comprises the QBm-H mode, the means for applying the first operational mode for error correction is configured to:
perform a bitwise majority function based on a first set of bits of the first PDU data of the first packet, a second set of bits of one respective PDU data of one retransmission packet of the set of retransmission packets, and a third set of bits of another respective PDU data of another retransmission packet of the set of retransmission packets;

determine a set of estimated bit values based on the performing the bitwise majority function;

determine a set of bit error quality metrics based on the set of estimated bit values; and discard one or more additional retransmission packets received after the one retransmission packet and the other retransmission packets of the set of retransmission packets when the one or more additional retransmission packets comprise a retransmission of the first PDU data of the first packet.

56. The apparatus of claim 54, wherein when the first operational mode for error correction comprises the QBm-H mode, and when the set of retransmission packets includes three or more retransmission packets, the means for applying the first operational mode for error correction is configured to:

store each of a set of soft values in each of a set of buffers, each of the set of soft values being a three-bit signed soft value that is based on a respective bit of the first PDU data of the first packet;

accumulate, for each of the set of retransmission packets, each of the set of soft values with a signed value in each of the set of buffers, each of the signed values being based on a corresponding bit of the respective PDU data of the each retransmission packet of the set of retransmission packets;

map each accumulated soft value of the set of soft values accumulated in each of the set of buffers to a one bit value of a set of estimated bit values; and determine whether the set of estimated bit values passes the decoding check.

57. The apparatus of claim 41, further comprising:

means for generating an estimated cyclic redundancy check (CRC) value based on a set of estimated bit values obtained based on the applying the first operational mode for error correction, the set of estimated bit values estimated to be included in the first PDU data; and means for comparing the estimated CRC value with a first CRC value included in a most recently received retransmission packet of the set of retransmission packets, wherein the set of estimated bit values passes the decoding check based on the comparing the estimated CRC value with the first CRC value, and wherein the set of estimated bit values fails the decoding check when the generated CRC value is different from the first CRC value.

58. The apparatus of claim 57, further comprising:

means for generating an estimated message integrity code (MIC) value based on the set of estimated bit values; and means for comparing the estimated MIC value with a first MIC value included in the a most recently received retransmission packet of the set of retransmission packets, wherein the set of estimated bit values passes the decoding check when the estimated CRC value matches the first CRC value and the estimated MIC value matches the first MIC value, and wherein the set of estimated bit values fails the decoding check when the estimated CRC value is different from the first CRC value or when the estimated MIC value is different from the first MIC value.

59. The apparatus of claim 41, further comprising:

means for sending, to the higher layer of the first device, a set of estimated bit values obtained based on the applying the first operational mode for error correction, the set of estimated bit values estimated to be the at least the portion of first PDU data.

60. The apparatus of claim 59, further comprising:

means for determining, based on the applying the first operational mode for error correction, a set of bit errors associated with the set of estimated bit values; and means for sending, to the higher layer of the first device, at least one bit error quality metric indicating at least one of a set of locations of the set of bit errors or a number of the set of bit errors.

61. A non-transitory computer-readable medium storing computer-executable code for wireless communication by a first device, comprising code to:

establish, with a second device, a logical link associated with short-range communications, the short-range communications providing connectivity to devices within a threshold distance from the first device;

receive a first packet carried on the logical link;

send at least a portion of first packet data unit (PDU) data included in the first packet to a higher layer of the first device when the first PDU data passes a decoding check; and when the first PDU data fails the decoding check:

determine, based on a type of the logical link, a first operational mode from a plurality of operational modes for error correction;

receive a set of retransmission packets on the logical link, each of the set of retransmission packets including respective PDU data that is a retransmission of the first PDU data; and apply, based on the first PDU data included in the first packet and the respective PDU data included in each of the set of retransmission packets, the first operational mode for error correction.

* * * * *